US012017855B2

(12) United States Patent
Stevens et al.

(10) Patent No.: US 12,017,855 B2
(45) Date of Patent: Jun. 25, 2024

(54) AUTOMATED VEHICLE FOR USE IN INVENTORY MANAGEMENT SYSTEM

(71) Applicant: OPEX Corporation, Moorestown, NJ (US)

(72) Inventors: Alex Stevens, Moorestown, NJ (US); Joseph Valinsky, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 16 days.

(21) Appl. No.: 17/983,151

(22) Filed: Nov. 8, 2022

(65) Prior Publication Data

US 2023/0174307 A1    Jun. 8, 2023

Related U.S. Application Data

(63) Continuation of application No. 16/993,933, filed on Aug. 14, 2020, now Pat. No. 11,535,452.

(Continued)

(51) Int. Cl.
*G06F 7/00* (2006.01)
*B25J 9/16* (2006.01)
(Continued)

(52) U.S. Cl.
CPC .......... *B65G 1/1375* (2013.01); *B25J 9/1687* (2013.01); *B65G 1/0471* (2013.01);
(Continued)

(58) Field of Classification Search
CPC .. B65G 1/1375; B65G 1/0471; B65G 1/0492; B65G 1/065; B65G 1/10; B65G 1/1371;
(Continued)

(56) References Cited

U.S. PATENT DOCUMENTS

| 7,101,139 | B1 | 9/2006 | Benedict |
| 9,952,589 | B1 * | 4/2018 | Brazeau ................. B66F 9/063 |

(Continued)

FOREIGN PATENT DOCUMENTS

| JP | H01289760 | 11/1989 |
| JP | H02158433 A | 6/1990 |
| WO | 2016196815 | 12/2016 |

OTHER PUBLICATIONS

Extended Search Report issued in Europe for Application No. 20852893.5 dated Aug. 7, 2023.

(Continued)

*Primary Examiner* — Yolanda R Cumbess
(74) *Attorney, Agent, or Firm* — Brian K. Dinicola

(57) ABSTRACT

A vehicle for use in an inventory management system having a plurality of destination areas and a guide system includes a platform for receiving and transporting items to and from the destination areas, a plurality of motors, a first drive system, a second drive system, a transfer mechanism, and a clutch mechanism. The transfer system is configured to transfer and retrieve items to and from the destination areas, and the clutch mechanism is configured to engage and disengage the transfer mechanism from at least one of the motors, whereby the second drive system drives movement of the vehicle independently of the transfer mechanism.

14 Claims, 38 Drawing Sheets

Related U.S. Application Data

(60) Provisional application No. 62/886,602, filed on Aug. 14, 2019.

(51) Int. Cl.
  *B65G 1/04* (2006.01)
  *B65G 1/06* (2006.01)
  *B65G 1/10* (2006.01)
  *B65G 1/137* (2006.01)
  *G05D 1/00* (2006.01)
  *G06Q 10/087* (2023.01)

(52) U.S. Cl.
  CPC ............ *B65G 1/0492* (2013.01); *B65G 1/065* (2013.01); *B65G 1/10* (2013.01); *B65G 1/1371* (2013.01); *B65G 1/1373* (2013.01); *B65G 1/1376* (2013.01); *B65G 1/1378* (2013.01); *G05D 1/0027* (2013.01); *G06Q 10/087* (2013.01)

(58) Field of Classification Search
  CPC .. B65G 1/1373; B65G 1/1376; B65G 1/1378; B65G 1/04; B65G 1/08; B25J 9/1687; G05D 1/0027; G05D 1/0225; G05D 1/0297; G06Q 10/087
  USPC .......................................... 700/213–214, 216
  See application file for complete search history.

(56) References Cited

U.S. PATENT DOCUMENTS

| | | |
|---|---|---|
| 11,535,452 B2 | 12/2022 | Stevens |
| 2007/0065258 A1 | 3/2007 | Benedict |
| 2016/0121913 A1 | 5/2016 | Lim et al. |
| 2016/0375723 A1* | 12/2016 | Jochim .................. B60B 19/12 280/30 |
| 2017/0158430 A1 | 6/2017 | Raizer |
| 2018/0305126 A1 | 10/2018 | Moulin et al. |
| 2018/0346247 A1 | 12/2018 | DeWitt et al. |
| 2020/0319219 A1 | 10/2020 | Vansickler |
| 2020/0338741 A1* | 10/2020 | Voorhies ................ B25J 9/1692 |
| 2021/0139259 A1 | 5/2021 | Uriarte |
| 2022/0048709 A1 | 2/2022 | Valinsky |

OTHER PUBLICATIONS

International Search Report for International application No. PCT/US2020/046418 dated Jan. 19, 2021.

Examination Report issued in China for Application No. 202080071238.7 on Jan. 29, 2024.

Examination Report issued in Singapore for Application No. 11202201190T on Feb. 27, 2024.

\* cited by examiner

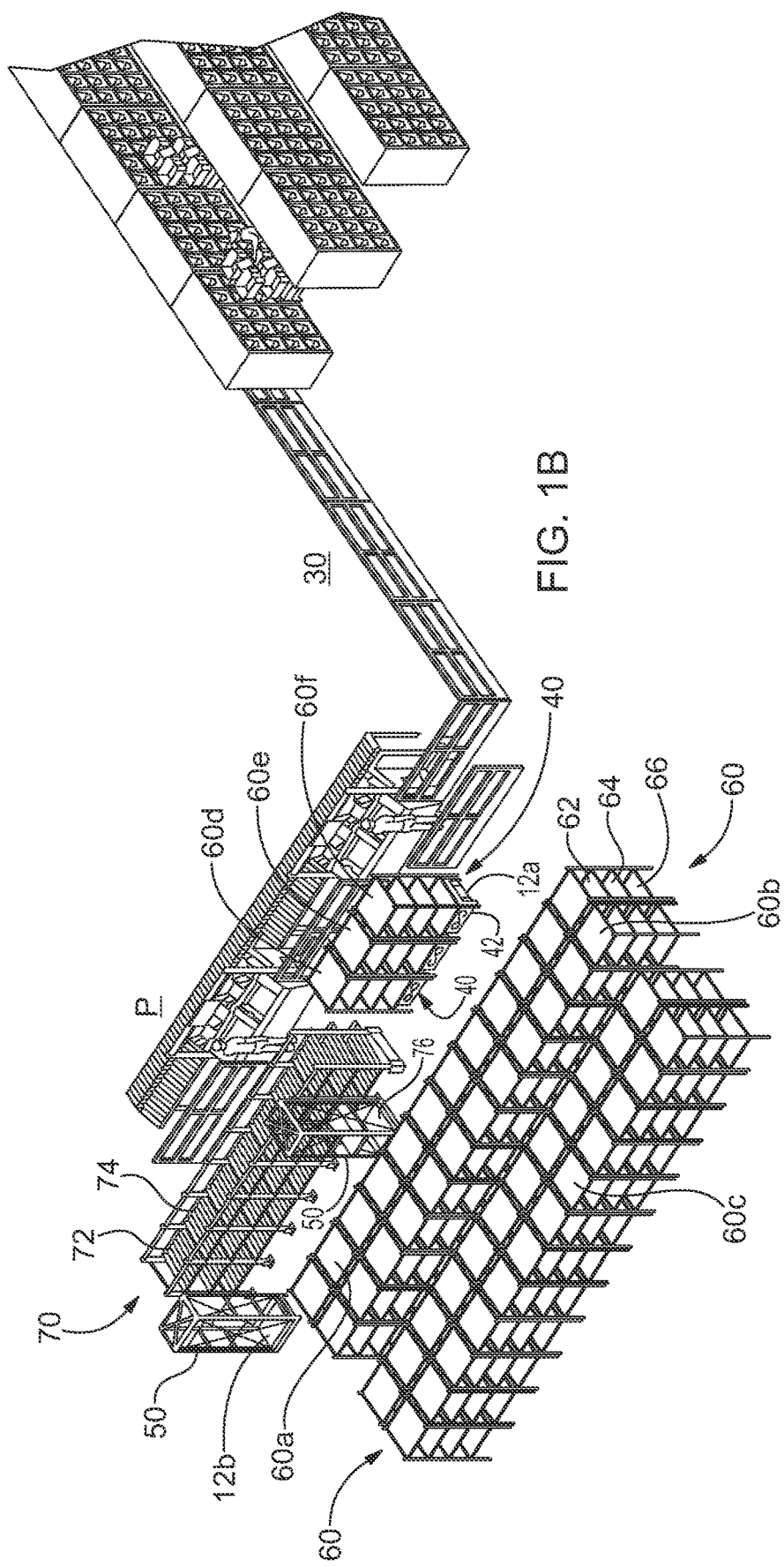

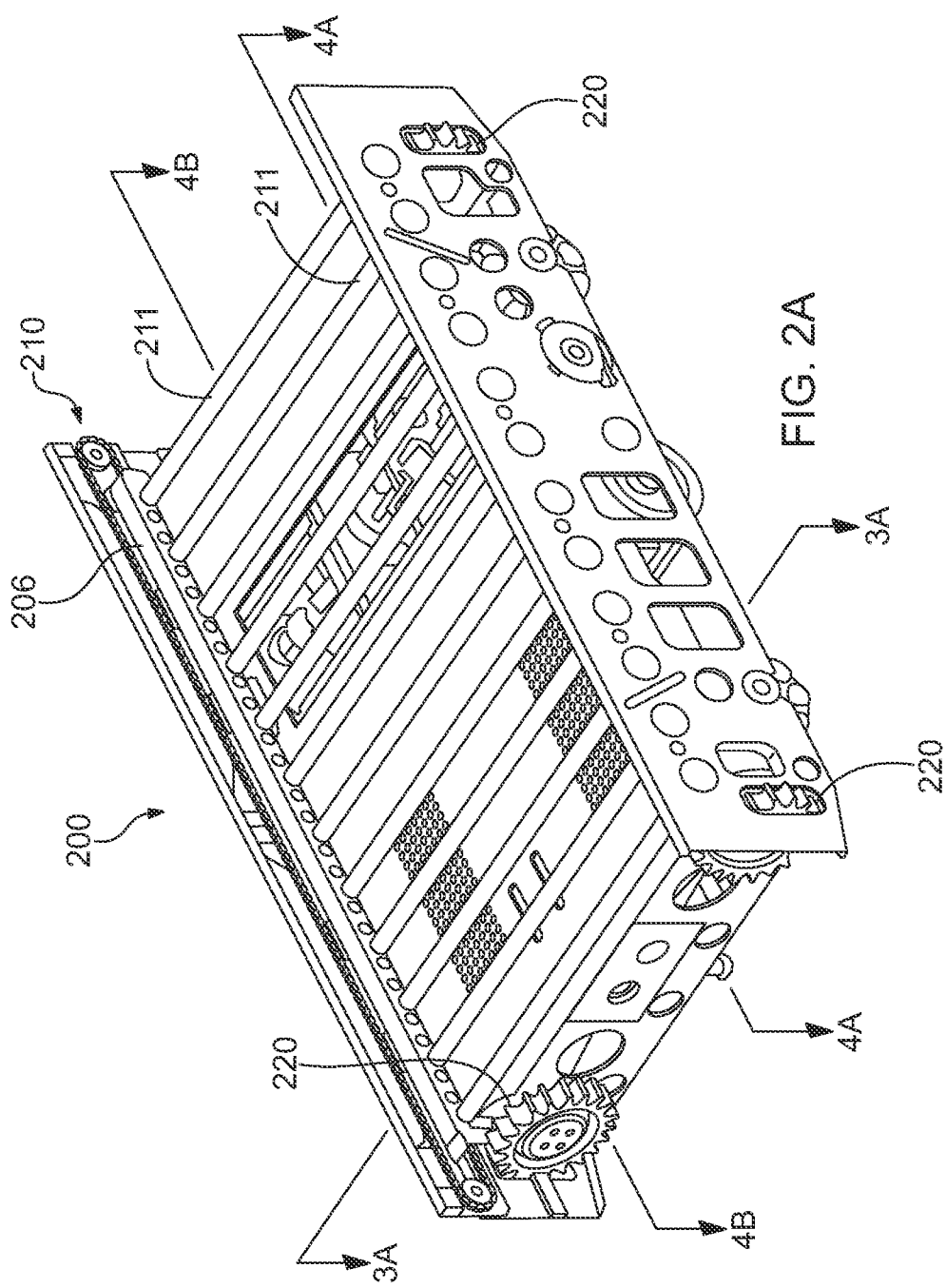

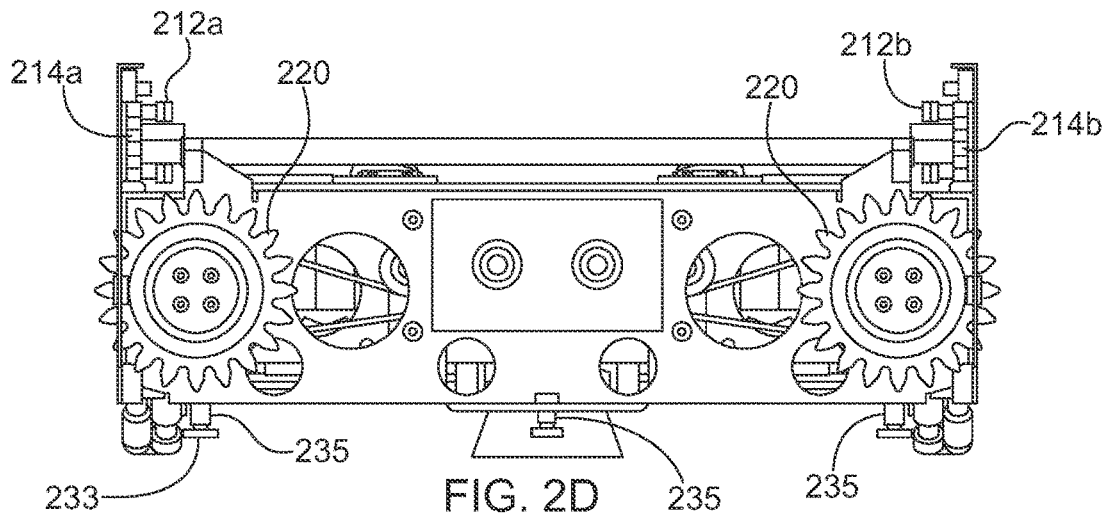
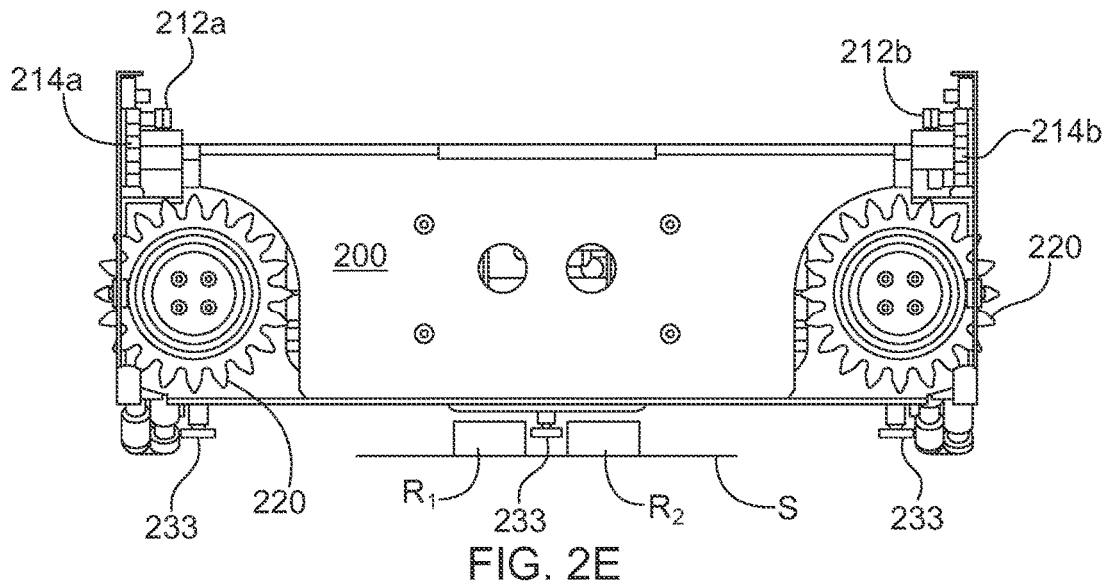
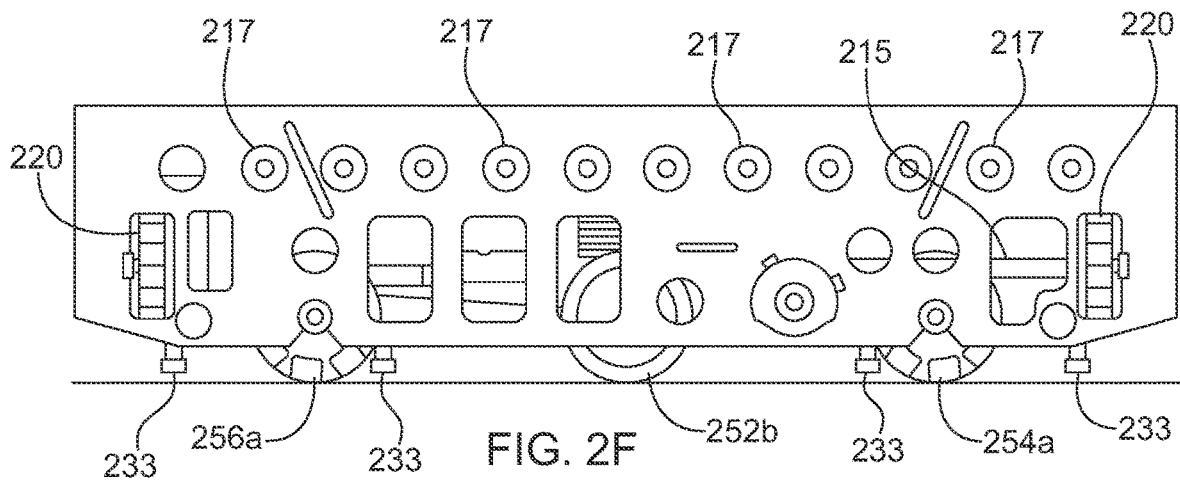

AUTOMATED VEHICLE FOR USE IN INVENTORY MANAGEMENT SYSTEM

REFERENCE TO RELATED APPLICATIONS

The present application is a continuation of co-pending U.S. patent application Ser. No. 16/993,933 filed on Aug. 14, 2020, which claims priority to U.S. Provisional Patent Application No. 62/886,602 filed on Aug. 14, 2019. The present application claims priority to each of the foregoing applications and the entire disclosure of each of the foregoing applications is hereby incorporated by reference.

BACKGROUND OF THE INVENTION

Field of the Invention

Embodiments of the present invention generally relate to automated vehicles configured to perform inventory management tasks in a warehouse, storage and/or distribution environment.

Description of the Related Art

Modern material handling systems, such as those used in mail-order warehouses, supply chain distribution centers, and custom-order manufacturing facilities, face significant challenges in responding to requests for inventory articles. In their incipiency, enterprises will generally invest in a level of automation that is at least adequate for current needs. As the scale of an inventory management system expands to accommodate a greater number and variety of articles, however, so too does the cost and complexity of operating it to simultaneously complete the packing, storing, replenishment, and other inventory management tasks for which it is intended.

Failure to efficiently utilize resources such as space, equipment, and manpower in an inventory management facility results in lower throughput, longer response times, and a growing backlog of unfinished tasks. Greater efficiency may often be achieved, for a time, by incrementally expanding the capacity of the facility's existing automation infrastructure, particularly when that expansion follows a well-conceived plan for growth. Sooner or later, however, a point of diminishing returns is encountered. That is, the achievement of further gains in capacity and/or functionality eventually becomes cost prohibitive as compared to available alternatives, if such gains can be realized at all. When that point of diminishing returns is reached, a facility operator may be forced to abandon pre-existing material handling infrastructure and to replace that infrastructure with a completely new automation platform.

SUMMARY OF THE INVENTION

In accordance with embodiments of the present disclosure, the disadvantages and problems associated with conventional warehouse automation approaches have been substantially reduced or eliminated by one or more vehicles configurable to perform a variety of tasks relevant to an inventory management operation. In embodiments, each vehicle is configured and operable to perform a first set of one or more inventory management tasks. Examples of tasks each vehicle is configured to perform utilizing onboard resources include operating a transfer mechanism of the vehicle to retrieve an inventory item to, and/or retrieve an inventory item from, a destination area of a vertical array of storage areas. For such tasks, each vehicle is configured to travel vertically—along a guide system bringing the vehicle to the appropriate destination area—as well as horizontally upon, for example, a substantially planar surface which extends between an array of storage areas and a remote location such, for example, as a pick station, a packing station, or even a second vertically array of storage areas.

In an embodiment, a vehicle configured to perform inventory management tasks comprises a vehicle configured to perform inventory management tasks in an inventory management handling system having a plurality of destination areas and a guide system, the vehicle comprising a platform dimensioned and arranged to receive an item to be at least one of transferred to or received from one of the destination areas; a plurality of motors; a first drive system having a first plurality of drive elements configured to engage the guide system, by operation of a first subset of the plurality of motors, to move the vehicle along a vertical path segment extending between a support surface underlying the vehicle and one of the destination areas; a second drive system having a first plurality of drive elements configured, by operation of a second subset of the plurality of motors, to engage the underlying support surface and drive movement of the vehicle in a non-vertical direction; a transfer mechanism configured to at least one of transfer an item from the platform to one of the plurality of destination areas or retrieve an item from one of the plurality of destination areas; and a clutch mechanism configured to engage and disengage the transfer mechanism from the second subset of motors, whereby the second drive system drives movement of the vehicle independently of the transfer mechanism.

In some embodiments, the first subset of one or more motors comprises a single motor configured to rotate the first plurality of drive elements of the first drive system. In an embodiment, the second subset of motors comprises a plurality of motors, wherein a first motor of the second subset drives rotation of a first drive element of the second drive system and a second motor of the second subset drives rotation of a second drive element of the second drive system.

In some embodiments, the first plurality of drive elements of the first drive system includes a plurality of gears dimensioned and arranged to interact with complementary teeth of the guide system to control the position of the vehicle along the guide system. In such an embodiment, the first drive system may include a pair of drive axles, wherein the driven gears are fixed to the drive axles so that the gears are synchronously driven to drive the vehicle along the guide system.

In some embodiments, the second drive system includes a first drive element driven by a first motor of the second subset to rotate about a first axis of rotation, and a drive element driven by a second motor of the second subset to rotate about a second axis of rotation, wherein each of the first and second drive elements is dimensioned and arranged to engage a respective portion of the underlying support surface for movement of the vehicle thereupon. In one such embodiment, the clutch mechanism comprises: a first pivotable carrier movable between a first angular orientation relative to the platform and a second angular orientation relative to the platform. wherein the first drive element is rotatably coupled to the first pivotable carrier for angular movement therewith; and a second pivotable carrier movable between the first angular orientation and the second angular orientation, wherein the second drive element is coupled to the second pivotable carrier for angular movement therewith. The first and second axes of rotation are co-axial while the first and second pivotable carriers have a common angular orientation.

Optionally, the second drive system further includes a first driven element rotatably coupled to the first pivotable carrier and a first endless loop element for transferring rotary power to the first driven element; and a second driven element rotatably coupled to the second pivotable carrier and a second endless loop element for transferring rotary power to the second driven element. Each of the first endless loop element and the second endless loop element may include a belt. In such an embodiment, the second drive system further comprises a first pulley, the first pulley and first drive element being driven by the first motor of the second subset, wherein the first pulley is dimensioned and arranged to engage the first endless loop element to thereby drive the first driven element; and a second pulley, the second pulley and second drive element being driven by a second motor of the second subset of motors such that the pulley is dimensioned and arranged to engage the second endless loop element to thereby drive the second driven element.

In the preceding embodiment, the clutch mechanism may further include a third driven element rotatably coupled to the first driven element and coaxial therewith, the third driven element being dimensioned and arranged to drivingly engage a first portion of the transfer mechanism and thereby transfer power from the first motor of the second subset while the first pivotable carrier is in the first angular orientation, as well as a fourth driven element rotatably coupled to the second driven element and coaxial therewith, the fourth driven element being dimensioned and arranged to drivingly engage a second portion of the transfer mechanism and thereby transfer power from the second motor of the second subset while the second pivotable carrier is in the first angular orientation.

In embodiments, the second drive system further includes a plurality of omnidirectional wheels dimensioned and arranged to frictionally engage respective portions of the underlying surface to thereby support the vehicle. In one such embodiment, the second first drive system further includes a plurality of drive axles, wherein at least a pair of the omnidirectional wheels is driven by at least one of the second subset of motors.

In any of the preceding embodiments, the vehicle may further comprise an onboard controller for directing operation of the plurality of motors, the controller including a processor and a memory containing instructions, executable by the processor, to operate the motors of the second subset to drive the first and second drive elements of the second drive system to thereby displace the vehicle along a substantially horizontal path upon the support surface. In one such embodiment, the memory contains instructions executable by the processor to operate the second subset of motors to bring respective portions of the first drive system into facing alignment with corresponding portions of the guide system and/or to initiate driving engagement of respective portions of the first drive system with corresponding aligned portions of the guiding system and thereby cause elevation or descent of the vehicle relative to a datum plane.

In the preceding embodiment, the clutch mechanism may be configured to enable transmission of power, from the motors of the second subset, to the transfer mechanism responsive to elevation of the vehicle to a position above the datum plane. To this end, the memory further containing instructions executable by the processor for operating a motor of the second subset of one or motors to cause the transfer mechanism to one of transfer an item from the platform to a destination area adjacent the vehicle or to retrieve an item from the destination area to the platform. In such embodiment, the clutch mechanism is configured to disable actuation of the transfer mechanism responsive to descent of the vehicle to a position below the datum plane.

Another embodiment of a vehicle operable in an inventory management system having a plurality of destination areas and a guide system comprises: a first motorized drive system configured to engage the guide system to guide movement of the vehicle along a vertical path segment; a second motorized drive system dimensioned and arranged to maneuver the vehicle upon a surface while the first drive system is out of engagement with the guide system; a clutch mechanism operative to engage and to disengage transmission of power to the transfer mechanism, whereby each of the first drive system and second drive system is operable independently of the transfer mechanism; and a transfer mechanism operative to transfer an item between the vehicle and one of the plurality of destination areas; wherein the first motorized drive system includes first and second pairs of motor driven rotary elements, the rotary elements of each pair being configured to interact with the guide system to control the position of the vehicle along the guide system.

In the preceding embodiment, each rotary drive element, of the first and second pairs of rotary drive elements, may be a gear having teeth dimensioned and arranged to engage complementary teeth of the guide system as the vehicle changes elevation along the guide system. In one such embodiment, the first drive system further includes a pair of synchronous drive axles, wherein the driven gears are fixed to the axles so that the gears are synchronously driven to drive the vehicle along the guide system. Optionally, the clutch mechanism is dimensioned and arranged to disengage the transfer mechanism as the vehicle descends to a position beyond the datum plane, thereby disabling actuation of the transfer mechanism by the controller. In such an embodiment, the clutch mechanism may be configured to engage with the transfer mechanism as the vehicle ascends to a position above the datum plane, thereby enabling actuation of the transfer mechanism by the controller.

A vehicle operable in an inventory management system according to a further embodiment comprises a first motor and a second motor, a first pair of omnidirectional rollers and a second pair of omnidirectional rollers, wherein a first omnidirectional roller of each pair is dimensioned and arranged to rotate about a first axis of rotation and wherein a second omnidirectional roller of each pair is driven by the first motor or the second motor for rotation about a second axis of rotation; a fifth roller driven by the first motor or the second motor; and an actuator having an actuation surface configured to move from a first position to a second position to selectively urge the fifth roller in a direction toward an underlying support surface; wherein a surface of each of the first and second pairs of omnidirectional rollers, and a surface of the fifth roller are dimensioned and arranged to contact the underlying support surface while the actuator is maintained in the first position, and wherein movement of the actuator into the second position causes a transfer of load from one or more of the omnidirectional rollers to the fifth roller.

In some embodiments, the pair of motor driven omnidirectional rollers are driven independently of the second pair of motor driven omnidirectional rollers.

In some embodiments, the actuator is a first actuator, wherein the vehicle further includes a sixth roller and a second actuator movable from a third position to a fourth position, and wherein movement of the first and second actuators into the second and fourth positions, respectively, causes a transfer of load from one or more of the omnidirectional rollers to the fifth and sixth rollers.

In the preceding embodiment, the vehicle further includes a platform and a transfer mechanism operative to at least one of transfer an item from the platform to a target surface or to retrieve an item from a target surface. Optionally, the vehicle of the preceding embodiment may further include a clutch mechanism operative to engage and disengage the transfer mechanism.

A method of operating an automated vehicle, according to any of the preceding embodiments, in an inventory management system having a rack structure defining a plurality of destination areas and a guide system comprises operating a first motor to control rotation of a first plurality of drive elements of the automated vehicle to move the automated vehicle upon an underlying support surface and into a pre-climb position wherein a second plurality of drive elements of the automated vehicle are aligned with and engage the guide system; operating a second motor to control rotation of the second plurality of drive elements to advance the automated vehicle vertically along the guide system and into an elevated position of alignment with a first destination area of the plurality of destination areas; and engaging a clutch mechanism of the automated vehicle while operating the first motor to transmit power from the first motor to a transfer mechanism of the automated vehicle and thereby to transfer a container of inventory items from the first destination area onto a support surface of the automated vehicle for subsequent transport of the container.

In addition or alternatively, a method of operating an automated vehicle according to any of the preceding embodiments comprises operating a first motor to control rotation of a first plurality of drive elements of the automated vehicle to move the automated vehicle upon an underlying support surface and into a pre-climb position wherein a second plurality of drive elements of the automated vehicle are aligned with and engage the guide system; operating a second motor to control rotation of the second plurality of drive elements to advance the automated vehicle vertically along the guide system and into an elevated position of alignment with a first destination area of the plurality of destination areas; and engaging a clutch mechanism of the automated vehicle while operating the first motor to transmit power from the first motor to a transfer mechanism of the automated vehicle and thereby transfer a container of inventory items from a support surface of the automated vehicle into the first destination area. Other and further embodiments of the present invention are described below.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1B is a perspective view depicting an inventory management system which includes a plurality of automated guided vehicles that are each configurable, by interaction with a functional accessory module of a first group of functional accessory modules, to perform a first subset of inventory management tasks and, by interaction with a functional accessory module of a second group of functional accessory modules, to perform a second subset of inventory management tasks, according to one or more embodiments of the present disclosure;

FIG. 2A is a perspective view depicting an automated guided vehicle constructed in accordance with an exemplary embodiment of the present disclosure and adapted for use in any of the inventory management systems depicted in FIGS. 1A to 1C;

FIG. 2D is a forward elevation view of the exemplary automated guided vehicle depicted in FIG. 2A;

FIG. 2E is a rear elevation view of the exemplary automated guided vehicle depicted in FIG. 2A;

FIG. 2F is a side elevation view of the exemplary automated guided vehicle depicted in FIG. 2A;

Figure 1A:
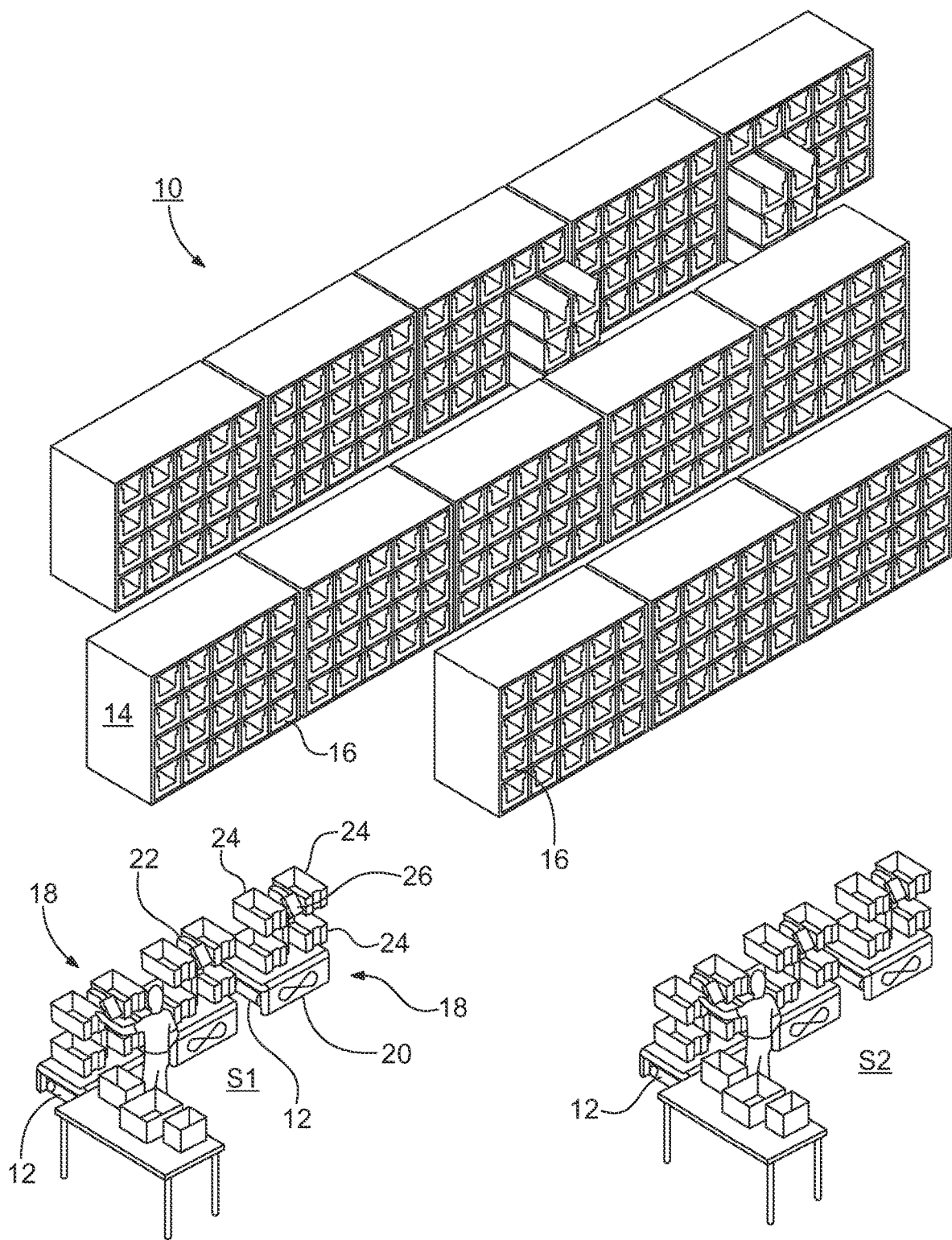
FIG. 1A is a perspective view depicting an inventory management system which includes a plurality of automated guided vehicles that are each configurable, by interaction with one or more functional accessory modules, to perform a subset of inventory management tasks in support of a parts picking process, according to one or more embodiments of the present disclosure.

While the systems and methods are described herein by way of example for several embodiments and illustrative drawings, those skilled in the art will recognize that systems and methods for performing respective subsets of inventory management tasks using corresponding functional accessory modules are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the systems and methods for performing respective subsets of inventory management tasks using corresponding functional accessory modules defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for performing inventory management tasks in an inventory management system are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like may include a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention; examples of which are illustrated in the accompanying drawings. Wherever possible, the same reference numbers will be used throughout the drawings to refer to the same or like parts.

Embodiments consistent with the present disclosure include one or more automated guided vehicles configurable to perform a variety of tasks relevant to an inventory management operation. To maintain a high degree of modularity, vehicles constructed according to some embodiments of the present disclosure are configured and operable to perform a first subset of one or more inventory management tasks and, in order to perform further subsets of one or more inventory management tasks, to interact with any of a plurality of interchangeable, functional accessory modules (FAMs). In embodiments, a subset of the FAMs are vertically and horizontally displaceable, such that they can be moved, as needed, to different locations within an inventory management facility. The facility may be, for example, a distribution center where items of inventory are stored for subsequent shipment to retail store locations and/or a fulfillment center where items of inventory are shipped directly to retail customers.

Each FAM of a group of FAMs has at least one function, capability or physical attribute which is missing in the vehicles and in the FAMs of a different group. In embodiments, the vehicles and the FAM(s) cooperate synergistically to perform various tasks according to the manner in which each vehicle is operated and the specific FAM(s) with which that vehicle is paired at a given time. By replacing one FAM or set of FAMs with one or more other FAMs, any of the vehicles can be readily configured to perform an alternate, or an additional, set of inventory management tasks. Accordingly, the vehicles retain their utility in an inventory management system even as the complexity of that system increases to achieve further inventory differentiation (e.g., accommodate a higher SKU count), higher order picking volumes, and/or greater throughput requirements.

As will be described in greater detail later, an association of indeterminate duration is formed between a vehicle and one or more of the FAMs to enable the performance of a second subset of one or more inventory management tasks. In some cases, all of the functionality required for completion of the second subset of inventory management task(s) is obtained by the combination of a vehicle and a single or first FAM. In embodiments, the association formed between the first FAM and a vehicle is achieved by a direct engagement of one or more components of the vehicle with one or more components of the FAM. In other cases, the performance of the second subset of one or more inventory management tasks further requires the use of an additional or second FAM. In embodiments, the second FAM performs the function of an adaptor between the vehicle and the first FAM. According to embodiments, the association between any or all of a vehicle and any associated FAM(s) is terminated once the assigned subset of inventory management tasks is completed and/or the use of any or all of these components are required for some other task(s).

Order picking systems, be they mail-order or e-commerce warehouses, supply chain distribution centers, cross dock facilities, custom-order manufacturing facilities, or any other type of inventory system, are generally distinguished from one another according to: (i) who and/or what picks the items; (ii) who and/or what moves within the picking area; (iii) whether the different picking zones are connected by conveyors; and (iv) what picking policy is being applied. Available picking systems include picker-to-parts, pick-tobox, pick-and-sort, parts-to-picker, and completely automated picking. The level of automation required for implementation increases gradually as the order picking system moves from picker-to-parts to completely automated picking systems.

The most basic order picking system in use today is the picker-to-parts system. Here, human pickers walk (or drive) along the aisles and manually pick items from the storage locations. In a low-level picking system, the items are stored in storage racks or bins that can be easily reached by the picker. In a high-level picking system, the picker uses a lifting truck or crane to reach items stored in elevated storage racks. Picker-to-parts systems of either type are easy to implement, modify and scale, but their use is usually limited to applications where both the pick volume and the inventory item (e.g., SKU) count are low. This limitation is due to the sharp drop in productivity that comes with increases in travel time.

A zone pick system is similar to the picker-to-parts system in that picking activity is performed by human pickers. However, the area within which these workers conduct their picking is divided into discrete zones. These picking zones are connected by conveyors. Orders are picked sequentially, by zone and then they are sorted according to destination. Each customer order typically corresponds to one picking box, which is passed on to the next zone as soon as all required items are picked in the current zone. An efficient pick-to-box system is one in which the workload is balanced among the various picking zones. Pick-to-box systems are often used in situations where there are many small-sized items in inventory but the orders themselves are typically only a few items in number.

FIG. 1A is a perspective view depicting an inventory management system 10 which includes a plurality of autonomous or automated guided vehicles 12. Each vehicle 12 is configurable, by interaction with one or more functional accessory modules (FAMs), to perform a subset of inventory management tasks in support of a parts picking process, according to one or more embodiments of the present disclosure. In the illustrative embodiment of FIG. 1A, inventory management system 10 implements a "picker-to-parts" scheme or, alternatively, a zone scheme. In either case, items of inventory (not shown) are stored in, and retrieved from, storage racks indicated generally at 14. Storage racks 14 define rows and columns of storage cells which are dimensioned and arranged to receive item-containing bins 16. The bins are at a low enough height that they can be easily reached by human picker $P_1$.

As an incremental advance over a picker-to-parts system or picker-to-box approach which already utilizes low-level storage racks 14 and bins 16, implementation of the inventory management system 10 shown in FIG. 1A may be implemented solely by the addition of vehicles 12, and a plurality of FAMs 18 which, collectively, form a first group of FAMs. Each FAM 18 of the first group includes a base 20, a vertical support or stalk 22 extending in an upward direction from base 20, and a plurality of item storage cells 24 mounted on stalk 22. In the embodiment of FIG. 1A, a user terminal having a touchscreen display 26 is also mounted on stalk 26 to accommodate presentation of various instructions to the picker(s) and permit the entry of confirmatory acknowledgements in accordance with one or inventory management tasks to be performed by each FAM 18. In some embodiments, the same picker who transfers items from one of racks 14 into one of the FAMs 18 accompanies that FAM to a packing station, as station S1 or S2. At the packing station, the items are transferred into a vehicle for shipment.

For implementation of a zone pick scheme utilizing vehicles 12 and FAMs 18, items are removed from inventory and placed in one or more storage cells 24, of a selected FAM 18, by a picker operating in a first storage area. The selected FAM 18 then travels unaccompanied by the picker to a second storage area (not shown). At the second storage area, another picker removes additional items from inventory and transfers the items into the one or more storage cells of the selected FAM 18. FAMs 18 are thus configurable to perform the function of a conveyor connecting different picking zones.

The FAMs 18, in conjunction with vehicles 12, are also operative to perform inventory management tasks consistent with a pick-and-sort approach, also known as a wave picking system. A wave picking arrangement consists of one or more picking area(s) and one or more sorting area(s). Inventory items associated with multiple customer orders are picked in batches. After picking, the batches of items may be put in respective FAMs 18, rather than a transport conveyor, such that the FAMs 18 bring the picked items to a sorting area (not shown). Pick-and-sort systems are normally operated in picking waves, where all orders are sorted before the next wave is released.

Turning now to FIG. 1B, there is shown a perspective view of an inventory management system 30 that, for purposes of illustrative example only, incorporates pre-existing elements of the inventory management system 10 shown in FIG. 1A, according to one or more embodiments. Specifically, the inventory management system 30 retains the vehicles 12 formerly included in the arrangement shown in FIG. 1A and, optionally, further incorporates the storage racks 14, bins 16, and previously acquired FAMs 18 of the first group of FAMs. The inventory management system of 30 of FIG. 1B further includes a plurality of additional FAMs, such as FAMs 40 of a second group of FAMs and FAMs 50 of a third group of FAMs. As will be explained in greater detail later, vehicles 12 are configured to interact with FAMs 40 and 50, respectively, to synergistically perform subsets inventory management tasks which are different from those performed through interactions with one of FAMs 18.

In the picking of articles for order fulfillment, a distinction is made between two types of articles, namely fast moving and slow-moving. Fast-moving articles are those units of inventory which are needed frequently and/or in larger quantities. Slow-moving articles, on the other hand, are those articles of inventory which are needed rarely or in small quantities. It is possible for an article to move from one of these two categories to the other. The movement may be bidirectional due, for example, to a cyclicality in consumer demand according to the time of year (e.g., back-to-school, seasonal items, holiday sales, etc). In some cases, a newly introduced product in inventory may experience such a high rate of growth in demand that the product enters and remains in the fast-moving category for an extended period time. Contrarily, a shift into the slow moving category may portend a permanent decline in the popularity of a mature product. The ability to deploy additional and/or different types of FAMs as needed, as exemplified by the illustrative inventory management system 30 of FIG. 1B, allows a warehouse or distribution center facility operator to dynamically adapt to both short and long term shifts in demand for inventory items.

In the embodiment depicted in FIG. 1B, inventory management system 30 includes a plurality of multi-level storage racks indicated generally at 60. The storage racks 60 define a plurality of storage surfaces indicated generally at 62, 64, and 66. Each of the FAMs 40 includes a base 42 which is dimensioned and arranged to fit under any of the racks 60, and to be placed there by one of the vehicles 12 with which it is docked. In a manner to be described shortly, each vehicle 12 is operable to lift the FAM 40 with which it is docked and, as well, to lift the rack 60 under which that FAM 40 is positioned. A vehicle 12 paired with a FAM 40 is further operable to transport a lifted rack 60, for example, from one of the positions occupied by racks 60a, 60b, or 60c, to one of the positions adjacent picking area P, presently occupied by racks 60d, 60e, and 60f.

With continuing reference to FIG. 1B, it will be seen that vehicle 12a is depicted as being docked with rack 60f where they can be accessed by a picker. Others of the racks 60, as racks 60a, 60b, and 60c, are shown as having been deposited, by execution of appropriate inventory management tasks by vehicles 12 and FAMs 40, into a storage area comprising a symmetrical arrangement of rows separated by aisles through which the vehicles can pass. Arranging racks 60 which already have items of inventory deposited on the storage surfaces thereof in such a compact manner allows any of the racks 60 to be transferred, by one of the vehicles, as vehicle 12a in association with one of the FAMs 40, to a picking or, alternatively, a sortation area (not shown) when they are needed to fulfill a requirement for that item, as in an order fulfillment process. In some embodiments, the rows of racks as racks 60a, 60b and 60c serve as a buffer area from which a steady, and periodically refreshed, flow of inventory containing racks are retrieved and presented to one or more nearby picking and/or sortation areas. The number of racks in such a buffer area may increase or decrease in accordance with fluctuations in order volume. Alternatively, or in addition, additional racks 60 may be arranged in one or more aisle-separated rows at a locations further away from the picking and/or sortation area(s), in accordance with the relative frequency of demand for the items of inventory maintained in such racks.

As noted previously, the illustrative inventory management system 30 depicted in FIG. 1B further includes FAMs of a third group of FAMs, with the FAMs of the third group being indicated generally at 50, as well as a plurality of multi-level storage racks indicated generally at 60. The storage racks 60 define a plurality of storage surfaces indicated generally at 62, 64, and 66. Each of the FAMs 40 includes a base 42 which is dimensioned and arranged to fit under any of the racks 60, and to be placed there by one of the vehicles 12 with which it is docked. In a manner to be described shortly, each vehicle 12 is operable to lift the FAM 40 with which it is docked and, as well, to lift the rack 60 under which that FAM 40 is positioned. A vehicle 12 paired with a FAM 40 is further operable to transport a lifted rack 60, for example, from one of the positions occupied by racks 60a, 60b, or 60c, to one of the positions adjacent picking area P, presently occupied by racks 60d, 60e, and 60f.

In the embodiment depicted in FIG. 1B, inventory management system 30 further includes a multi-level flow rack structure, indicated generally at 70. Flow rack 70 may, for example, be used to accommodate inventory items which are withdrawn from inventory at higher volumes than the items stored in racks 60. In an embodiment, one or more levels of the flow rack structure 70, as upper levels 72 and 74, are configured as conveyors which are selectively actuated as needed to move inventory items forwardly into positions closest to the pick and/or sort station operator(s). As noted previously, the illustrative inventory management system 30 further includes FAMs of a third group of FAMs, with the FAMs of the third group being indicated generally at 50.

In embodiments, and as will be explained in greater detail shortly, the vehicles 12, as vehicle 12b, are dimensioned and arranged to dock with, lift, and transport any of the FAMs 50 for the purpose of replenishing flow rack structure 70. To that end, each FAM 50 defines an interior column dimensioned and arranged to enable any of vehicles 12, while in the position shown occupied by vehicle 12b, to move vertically (up or down) within the FAM 50. Such movement enables the vehicles 12 to climb to a level within any FAM 50 that is aligned within one of the storage levels of the rack structure 70. Once such alignment is achieved, each vehicle is operable, to perform an inventory transfer task wherein a container, or case, of items or, in other embodiments, a pallet load of items, are transferred from a surface of the vehicle 12 to a storage level of the rack structure 70 with which that vehicle surface is aligned. In FIG. 1B, vehicle 12B is shown as being in the process of transporting a first of the FAMs 50 along a path parallel to the rack structure 70. Another of the FAMs 50 is shown in an interlocked alignment with rack structure 70, the vehicle therein ready to initiate the process of lifting and transferring a case 76 into flow rack structure 70.

Figure 1C:
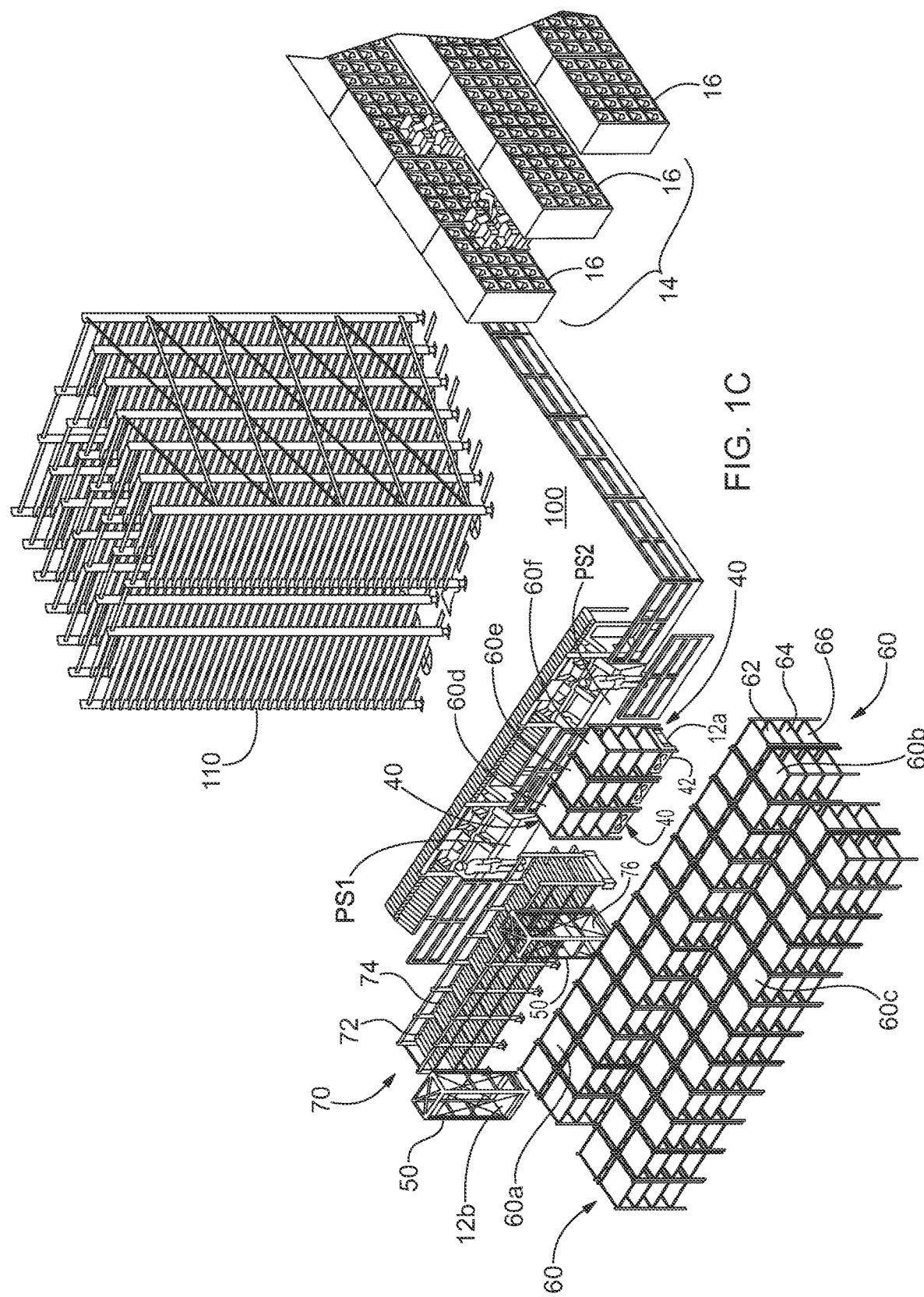
FIG. 1C is a perspective view depicting an inventory management system which includes a plurality of automated guided vehicles that are each configurable, by interaction with one or more functional accessory modules of a first, second or third group of functional accessory modules, to perform a first, second and/or third subset of inventory management tasks, according to one or more embodiments of the present disclosure.

Turning now to FIG. 1C, there is shown a perspective view of an inventory management system 100 that, for purposes of illustrative example only, incorporates pre-existing elements of the inventory management system 30 shown in FIG. 1B, according to one or more embodiments. Specifically, the inventory management system 100 retains the vehicles 12 formerly included in the arrangement shown in FIG. 1A and, optionally, further incorporates the FAMs 40 and 50, the portable storage racks 60, and the flow rack structure 70. Some of the vehicles 12 are utilized as part of a storage and retrieval assembly or SAR which also includes an array of destination areas or storage locations 110. The storage locations 110 are arranged in columns. As will be explained in greater detail later, the SAR of system 100 includes a guiding system such, for example, as a track (not shown), to guide the vehicles vertically in order to reach an intended one of the storage locations.

One of the inventory management tasks assigned to a vehicle 12 operating as part of the SAR portion is to retrieve items from the storage locations 110. This task can be viewed as a series of sub-tasks which include exiting the current or starting location of the vehicle, traversing a path which takes the vehicle between the starting location to an intermediate destination adjacent a point of entry into the array of storage locations and, at the intermediate destination, aligning the vehicle 12 with the point of entry. As a further sub-task of the retrieval task, the aligned vehicle enters the array and maintains its alignment until it reaches the column within which the vehicle is, operated to climb, according to yet another sub-task, until it reaches a target one of the storage areas 110. As further sub-tasks of the retrieval process, a transfer mechanism of the vehicle is operated to retrieve an item, descend within the column until the vehicle rests upon a support surface, and then exit the array of storage location. As a final sub-task of the retrieval operation, the vehicle 12 proceeds along a path to output station 120, where an operator can retrieve the item from the vehicle.

In one or more embodiments, the vehicle may perform a power replenishment task before returning, to a storage area, any remaining items that were not retrieved by the operator. In this regard, the vehicle may merely re-perform the series of subtasks for retrieving an item, except that instead of operating the transfer mechanism of the vehicle to retrieve an item at the target storage location, the transfer mechanism is instead operated to transfer the item from a platform of the vehicle into the target storage location. If sufficient power remains after a transfer, the vehicle may advance to another storage area to obtain the next item to be retrieved. In this way, the system 100 includes a plurality of individually controlled vehicles, as vehicles 12, that move up and down along tracks within any of a plurality of columns to retrieve items from the various storage areas and present the items to an operator before returning any remaining items and then retrieving another item.

For ease of explanation, the vehicles 12 which cooperate as part of the SAR have been described as delivering and/or retrieving items to and from storage areas 110. The items may be configured so that an individual item is stored at a storage location. However, in a typical operation environment, the items are stored in or on a storage mechanism, such as a container or platform. For instance, the items may be stored in a container, referred to as a tote. The tote may be similar to a carton or box without a lid, so that an operator can easily reach into the tote to retrieve an item at the picking station. Although the present system is described as using totes, it should be understood that any of a variety of storage mechanisms can be used, such as pallets or similar platforms.

The storage locations 110, of the illustrative system 100 depicted in FIG. 1C, can be any of a variety of configurations. For instance, the simplest configuration is that of shelves for supporting the items or the container holding the items. Similarly, the storage locations 100 may include one or more brackets that cooperate with the storage mechanism to support the storage mechanism in the storage location. For example, in the present instance, the storage locations include brackets similar to shelf brackets for supporting one of the totes, as depicted in FIG. 1C.

A subset of the vehicles 12 are thus configurable to perform a subset of inventory management tasks relating to the storage and retrieval of item containing totes T from storage areas 110, and to the delivery of the totes T to the delivery station(s) 120 where an operator can retrieve one or more items from the totes. While the preceding description was that of a single vehicle performing all of the sub-tasks which comprise a retrieval task, in accordance with one or more embodiments, it is alternatively possible for sub-tasks of a given task to be distributed among a plurality of vehicles 12. For example, a first vehicle exiting the array of storage areas 110 may transfer an item it has retrieved to a second vehicle which, in turn, completes the retrieval task by delivering the item to the delivery station(s) 120. After the operator retrieves the items, the same vehicle or yet another of vehicles 12 advances the tote T away from delivery station 120 and returns the tote to the same or a different one of the storage locations 110.

From the foregoing high-level description of FIGS. 1A to 1C, it will be appreciated that the vehicles 12 are operable in some modes of operation to synergistically cooperate with one or more FAMs to perform various sets of inventory management tasks and, in other modes of operation, to perform other inventory management tasks which do not require an association with any of the FAMs as FAMs 30, 40 and 50. The manner in which such functionality is realized by will now be described by reference to FIGS. 2A-2I, which depict embodiments of automated guided vehicles consistent with the present disclosure and, thereafter, other figures which depict exemplary configurations of the FAMs themselves.

Vehicles

Referring now to FIGS. 2A to 2I, there is shown an automated guided vehicle 200 constructed in accordance with embodiments of the present disclosure and adapted to perform inventory management tasks in, for example, any of the material handling systems depicted in FIGS. 1A to 1C. Each delivery vehicle is an automated guided vehicle having a first motorized drive system and a second motorized drive system, as well as an onboard power supply. For use with an array of storage areas arranged in columns and accessible by a guide system, as exemplified by storage areas 110 of FIG. 1C, the first motorized drive system of one or more embodiments cooperates with a guide system to guide movement of the vehicle along respective vertical path segments adjacent respective columns of storage areas. In such embodiments, the second motorized drive system is dimensioned and arranged to maneuver the vehicle 200 upon an underlying support surface while the first drive system is out of engagement with the guide system. Typically, the underlying support surface is defined by one or more areas of a warehouse floor and/or one or more elevated platforms within such a warehouse, or some combination of these.

Each vehicle includes a transfer mechanism 210 operative to transfer an item, for example, between a platform surface of the vehicle and one of the plurality of destination areas 110. As best seen in FIG. 2A, the platform surface in this instance is defined by the exterior surfaces of a plurality of rollers, indicated generally at 211. As will be explained in greater detail later by reference to FIGS. 4B and 4C, each vehicle 200 may optionally include a clutch mechanism operative to engage and to disengage transmission of power from a motor of the first or second drive systems to the transfer mechanism such that the transfer mechanism can be operated, as needed, only while the first and second drive systems are not being operated to propel the vehicle.

The vehicle 200 may incorporate any of a variety of mechanisms for loading an item onto the vehicle and for unloading the item from the vehicle into one of the storage areas. Additionally, the transfer mechanism 210 may be specifically tailored for a particular application. In the present instance, the transfer mechanism 210 comprises one or more displaceable element(s) configured to engage an item stored at a storage location and pull the item onto the vehicle. More specifically, in the present instance, the vehicle includes one or more displaceable element(s) configured to move toward a tote in a storage location. After the displaceable element(s) engage the tote, each displaceable element is displaced away from the storage location, thereby pulling the tote onto the vehicle 200.

Figure 2B:
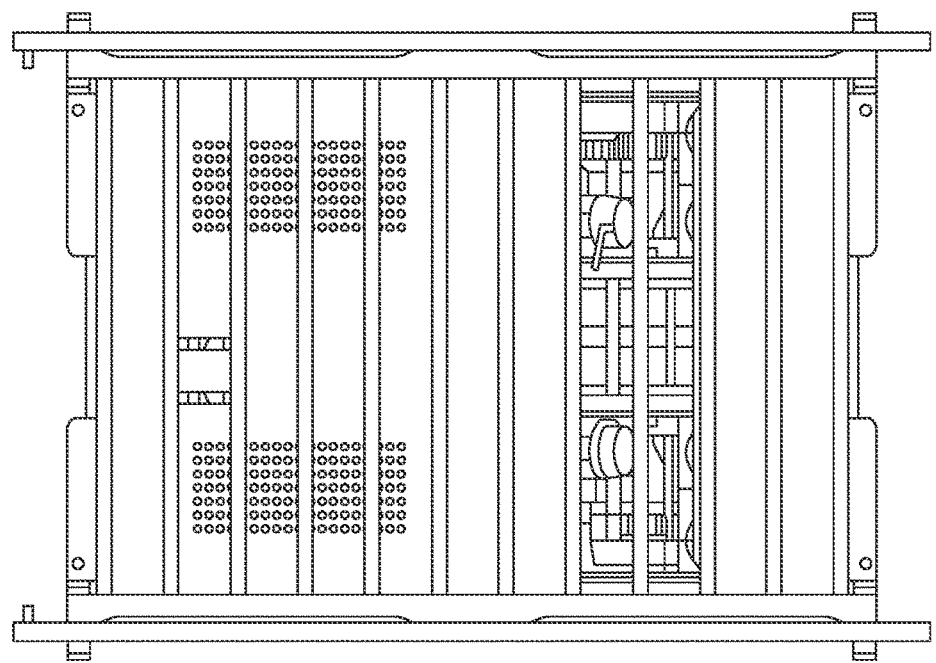
FIG. 2B is a top view of the exemplary automated guided vehicle depicted in FIG. 2A.

Referring to FIGS. 2A, 2B, and 2G to 2I in the present instance, the transfer mechanism 210 comprises two endless carriers such as a drive belt or, as shown, drive chains 214a and 214b1. Along each endless carrier, as chains 214a and 214b, there is mounted a displaceable element in the form of a displaceable pin 212a or 212b (FIGS. 2B, 2D, 2E). Each pin, as pin 212a extends inwardly toward the longitudinal center line of the vehicle. Optionally, a tubular bar element (not shown) may receive each of pins 212a and 212b and extend across the width of the vehicle 200.

Figure 2C:
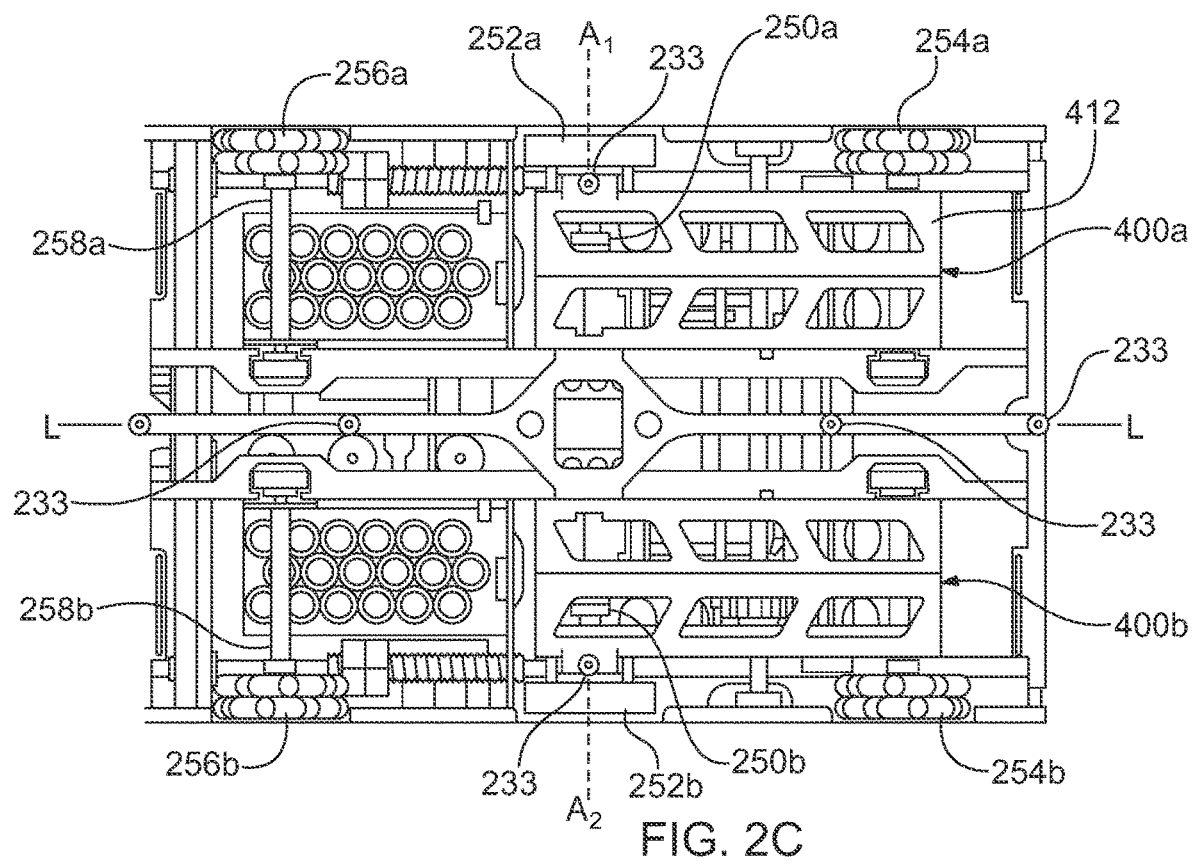
FIG. 2C is a bottom view of the exemplary automated guided vehicle depicted in FIG. 2A.
Figure 2G:
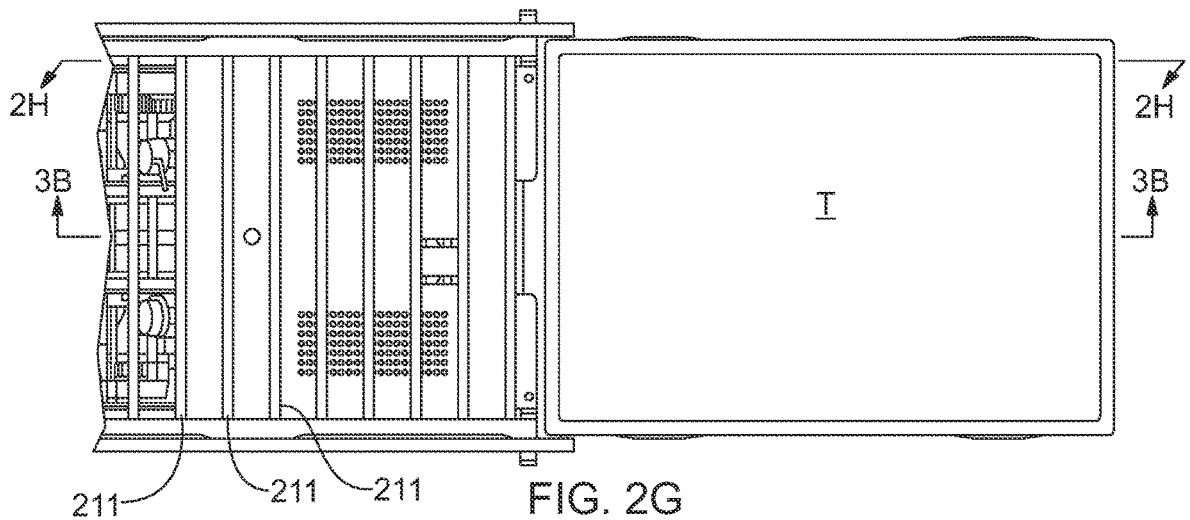
FIG. 2G is a top plan view depicting an automated guided vehicle in the process of retrieving a container of inventory items from a storage area of a plurality of storage areas arranged in a vertical column, according to one or more embodiments.

In this instance, one or more motors of the second drive system drives the chains to selectively move the chains and pins 212a and 212b toward or away from storage locations. For example, as the vehicle approaches a storage location to retrieve a tote T (FIGS. 2G to 2I), the chains may drive the displaceable pins 212a and 212b toward the storage location so that the pins (and bar connecting the pins, if present) underlie a groove or notch in the bottom of the tote. The vehicle travels a small distance upward until the pins 212a and 212b (or bar) are disposed with the groove or notch, as best shown in FIG. 2I. The chain then reverses so that the pins 212a, 212b move away from the storage location 100. Since the pins engage tote T within the notch, as the pins moves away from the storage location, the tote is pulled onto a surface of the vehicle. In this way, the transfer mechanism 210 is operable to retrieve items from a storage location. Similarly, to store an item in a storage location as location 110 in FIG. 1C, the chains 214a, 214b of the transfer mechanism 210 drives the pins 212 toward the storage location until the item is in the storage location. The vehicle then moves downwardly to disengage the pins from the tote, thereby releasing the tote.

In the preceding description, transfer mechanism 210 has been described as comprising endless carriers, in the form of chains 214a and 214b, and corresponding displaceable pin elements 212a and 212b, which may optionally be interconnected by a single tubular element. Such an arrangement is well suited to the retrieval of item-containing totes from storage areas arranged in a vertical column, wherein the tubular elements and/or a rod extending therebetween fits within a notch in an underside of a tote proximate a leading edge thereof. In one or more embodiments, the totes are placed in respective zones of an n-deep storage cell, where n represents a maximum number of totes which can be accommodated one behind another, within a substantially horizontal plane, when all totes are coupled together and disposed in a single n-deep cell. FIG. 1C depicts a vertical array of such storage areas or cells, indicated generally at 110.

Figure 2H:
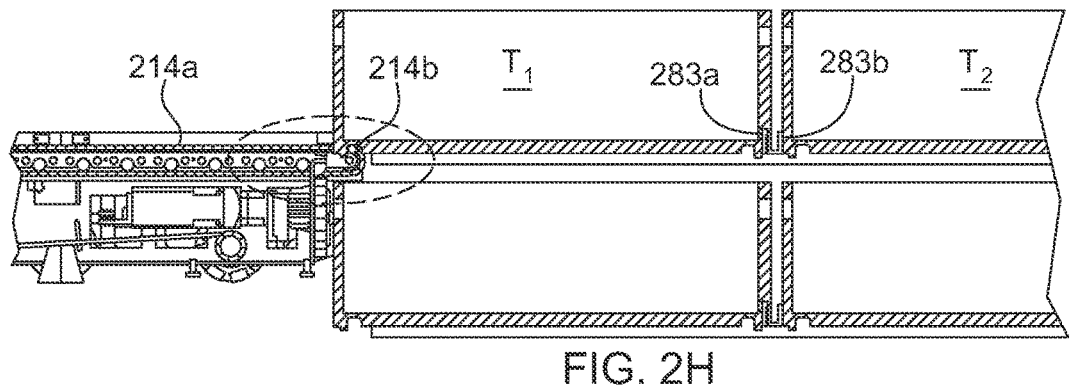
FIG. 2H is a partial side elevation view, taken across line II-H in FIG. 2G, to show actuation of a transfer mechanism in accordance with one or more embodiments.
Figure 2I:
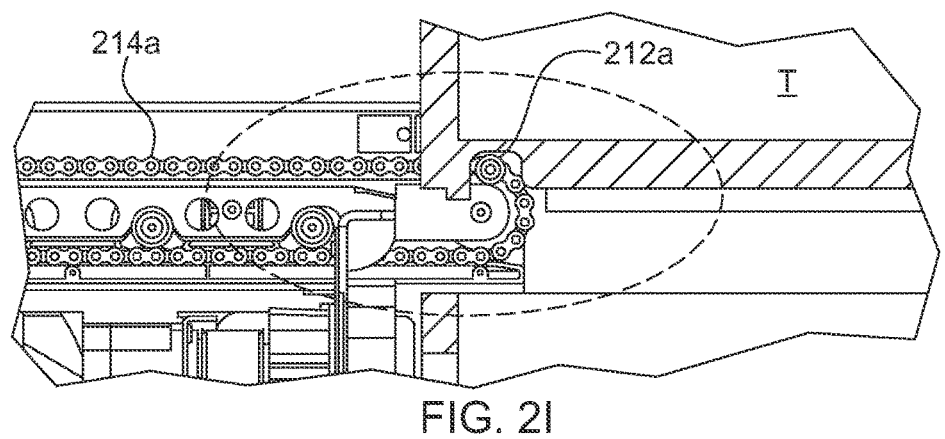
FIG. 2I is an enlarged view of the partial side elevation view of FIG. 2H to reveal a greater level of detail of an illustrative transfer mechanism which may be used to transfer items from or to one of the storage areas.

In this instance, and as best seen in FIG. 2H, two or more totes as totes $T_1$ and $T_2$ are coupled and decoupled from one another using mating connectors indicated generally at 283a and 283b, respectively. Totes $T_1$ and $T_2$ are coupled and decoupled from one another through a series of lifting and separating movements implemented by movement of the vehicle 210. As well, the transfer mechanism 210 is actuated by the second drive mechanism to pull a forward facing ("lead") tote onto rollers 211 (FIG. 2G) so as to be fully supported by vehicle 200. This pulling motion advances the trailing tote (i.e., the one that is immediately behind the lead tote) into the aisle facing location. The first drive mechanism of vehicle 200 is then operated briefly so that the vehicle 200 travels a vertical distance sufficient to uncouple the lead tote from the trailing tote(s). Once decoupling is completed, the second drive system is briefly operated again, this time centering the tote upon the vehicle 200 such that the vehicle and tote is fully maneuverable, vertically, within the column.

In the illustrative embodiment depicted in FIGS. 2A and 2D to 2F, the first drive system of vehicle 200 includes four wheels in the form of gears 220 that are driven to transport the vehicle along tracks disposed, as will be described in greater detail later, along tracks disposed within columns adjacent to the storage areas 110. The wheels 220 are mounted onto two parallel spaced apart axles, as axle 215 depicted in FIG. 2F, so that two of the wheels are disposed along the forward edge of the vehicle and two of the wheels are disposed along the rearward edge of the vehicle.

With particular reference to FIGS. 2C and 2F, FIG. 2C is a bottom view of the vehicle 200 depicted in FIG. 2A, while FIG. 2F is a side elevation view of the vehicle depicted in FIG. 2A. As best seen in FIG. 2C, vehicle 200 further includes a second drive system which is dimensioned and arranged to propel vehicle 200 upon an underlying support surface—such as the floor of a warehouse or distribution center. In the illustrative embodiment of FIG. 2C, the second drive system includes a second motor of vehicle 200, indicated generally at 250a, and a third motor of vehicle 200, indicated generally at 250b. The second motor and third motor, then, are first and second motors of a second subset of a plurality of motors. By dynamically controlling the relative speed and/or direction of rotation of each of motors 250a and 250b, vehicle 200 can be driven in any direction upon an underlying support surface, as surface S depicted in FIG. 2F.

With continued reference to FIG. 2C, it will be seen that the second drive system of vehicle 200 includes a first drive element 252a driven by second motor 250a to rotate about a first axis of rotation $A_1$, and a second drive element 252b driven by third motor 250b to rotate about a second axis of rotation $A_2$. Each of the first and second drive elements 252a and 252b is respectively dimensioned and arranged to engage a respective portion of underlying support surface S for movement of the vehicle thereupon. In embodiments of a vehicle exemplified by FIGS. 2C and 2F, the first axis of rotation $A_1$ and the second axis of rotation $A_2$ are co-axial while drive elements 252a and 252b are supported by a planar, horizontal surface. In this instance, the second drive system of vehicles 200 further includes a plurality of omnidirectional wheels comprising a first pair of wheels 254a and 254b and a second pair of wheels 256a and 256b. The omnidirectional wheels are dimensioned and arranged to frictionally engage respective portions of the underlying surface S (FIG. 2F), with each of wheels 254a, 254b, 256a and 256b being secured to a corresponding drive axle as axles 258a and 258b, respectively.

Figure 12:
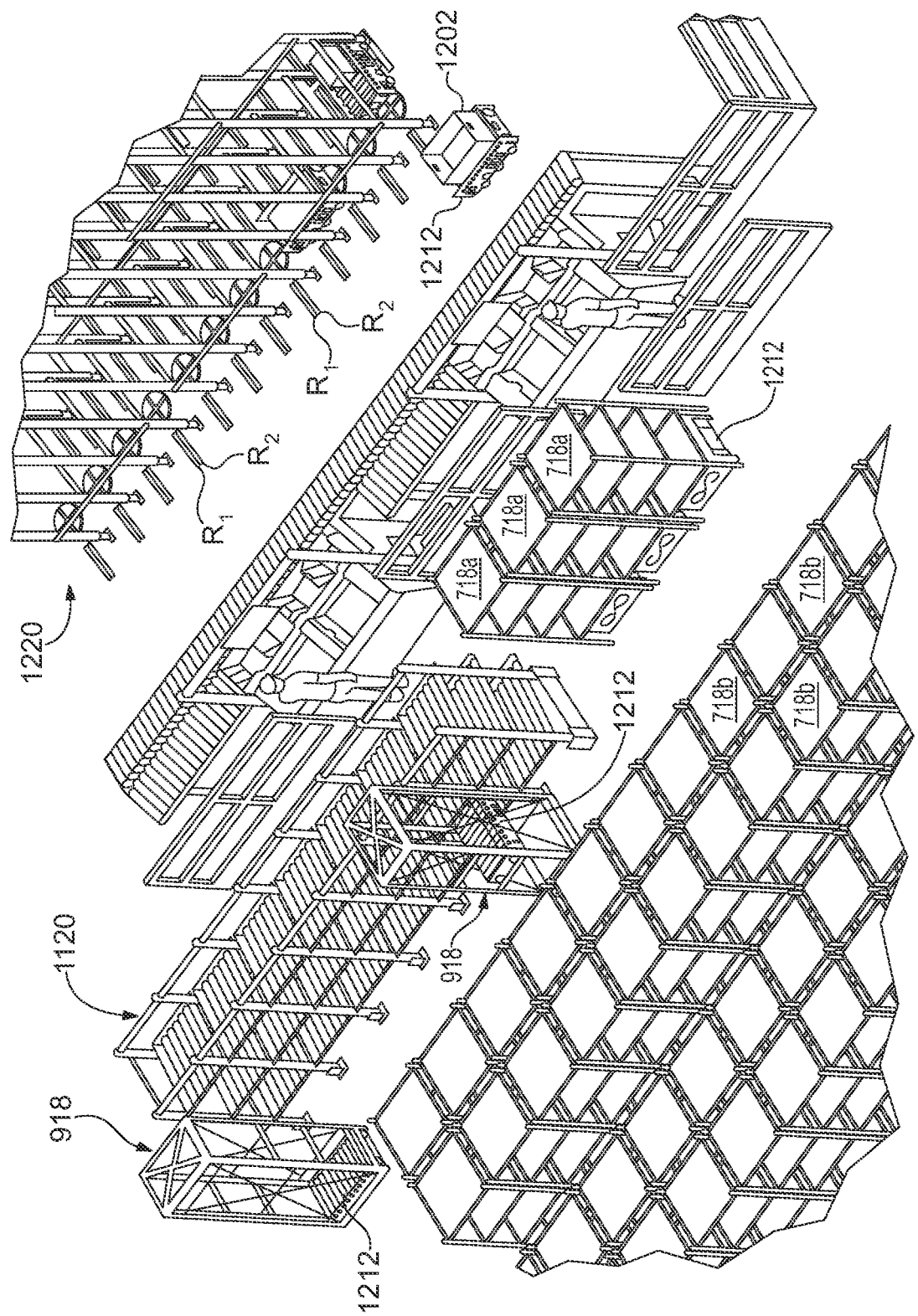
FIG. 12 is a partial perspective view depicting a part of an inventory management system, which may form part of the system shown in FIG. 1C, which utilizes automated guided vehicles to transfer containers of inventory items back and forth between a picking area and a plurality of storage locations, according to one or more embodiments.
Figure 13A:
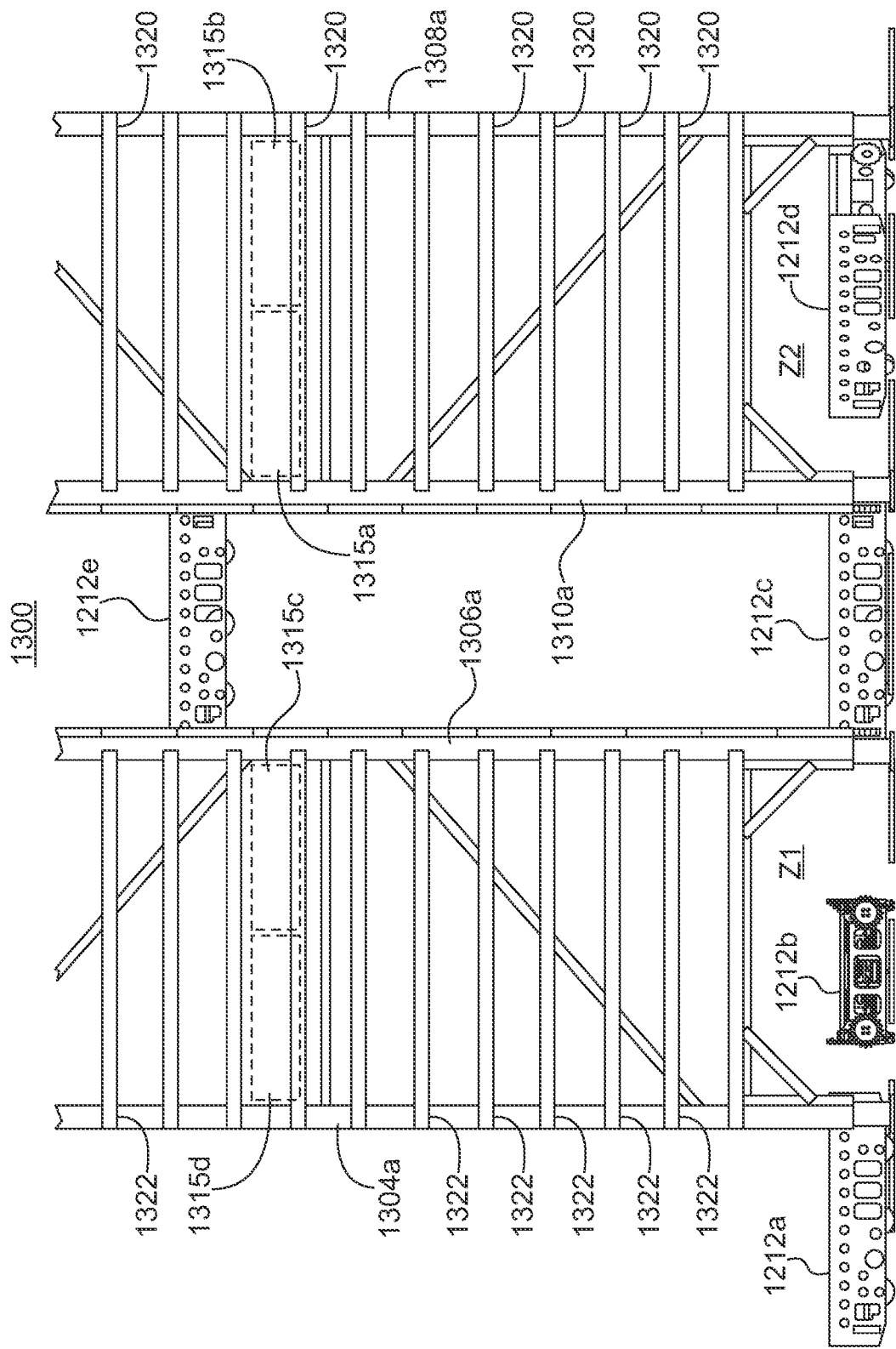
FIG. 13A is a front elevation view depicting a plurality of automated guided vehicles being operated to perform various item replenishment and/or item retrieval tasks as part of the inventory management system of FIG. 12, according to one or more embodiments.

With particular reference to FIGS. 2C and 2D to 2F, it will be seen that the vehicle 200 may also incorporate a series of guides, indicated at 233, which downwardly depend from shafts 235. Each of the guides 233 is rotatably mounted to the lower part of a shaft 235. The inventors herein have determined that in some applications, the guides 233 facilitate alignment of vehicle 212 as it is maneuvered upon an underlying support surface and brought into alignment with one or more other structures it may enter in the course of performing an assigned inventory management task. In FIG. 2C, for example, it can be seen that some of the guides 233 are arranged along a longitudinal center line L of vehicle 200. FIG. 2E depicts alignment of the guides 233 within a pair of parallel rails, shown in cross section and mounted upon underlying support surface S. In an exemplary application, rails $R_1$ and $R_2$ are arranged along a path by which vehicle 200 enters, exits, and/or maneuvers beneath a vertical array of storage cells, as depicted in FIGS. 12 to 13C.

Figure 3A:
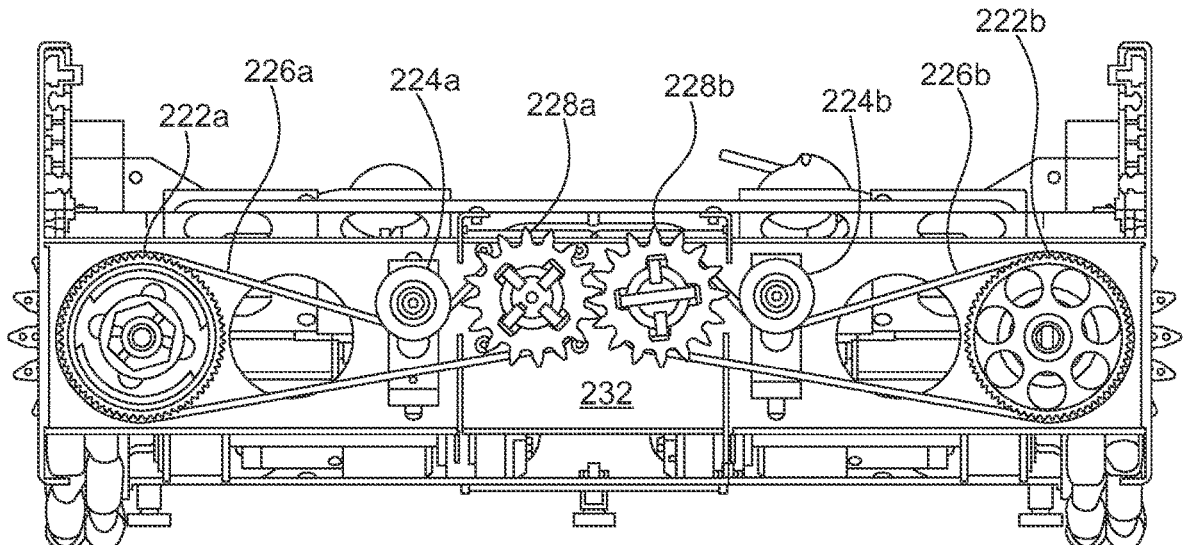
FIG. 3A is a forward elevation of the exemplary automated guided vehicle of FIGS. 2A-2F, taken in cross section across line IIIA-IIIA in FIG. 2A
Figure 3B:
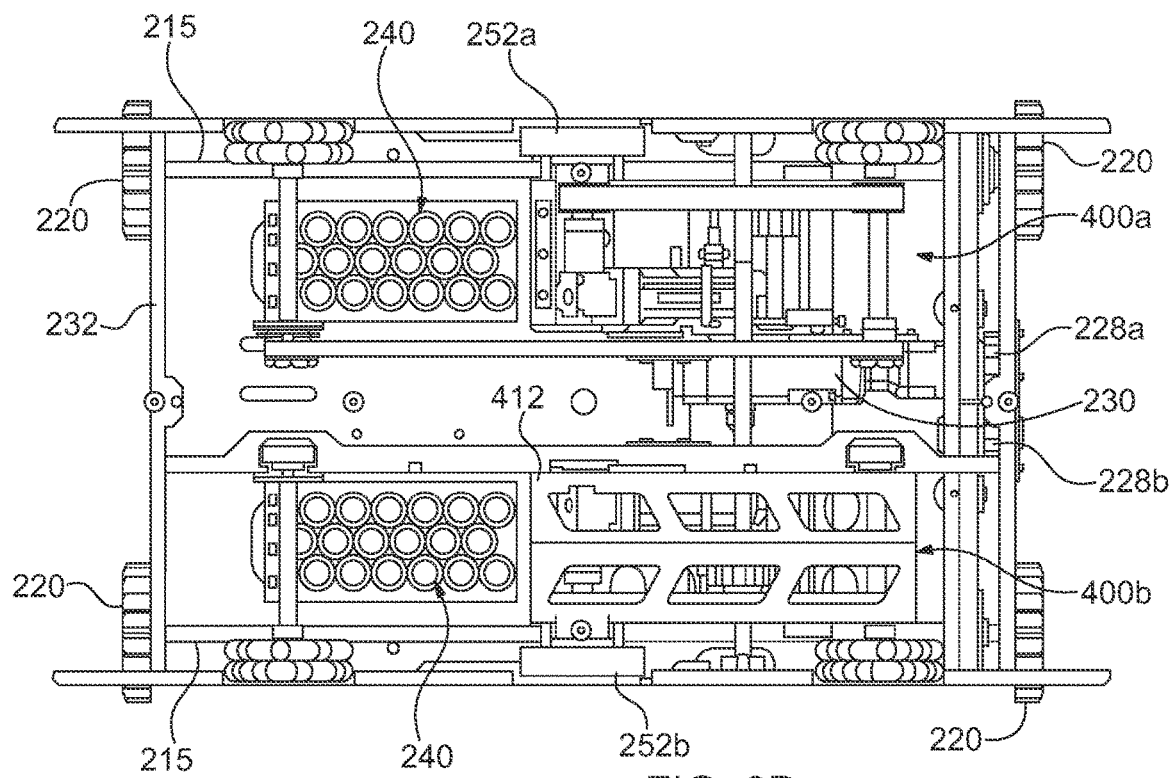
FIG. 3B is bottom plan view of the exemplary automated guided vehicle FIGS. 2A-2F, with a clutch mechanisms thereof being partially disassembled to expose the internal construction thereof.

Turning now to FIGS. 3A and 3B, FIG. 3A is a forward elevation view of the exemplary automated guided vehicle of FIGS. 2A-2F, taken in cross section across line IIIA-IIIA in FIG. 2A, and FIG. 3B is bottom plan view of the exemplary automated guided vehicle FIGS. 2A-2F. As best seen in FIG. 3A, the first drive system further includes a pair of inner idler pulleys 224a, 224b, and a pair of outer pulleys 222a, 222b that, when driven by respective belts 226a, 226b, cause the geared wheel 220 mounted on the same shaft to rotate and thereby propel the vehicle 200 in a vertical direction within a column (along the drive surfaces of the track). The idler pulleys 224a and 224b rotate freely relative to the axles and maintain the tension of the belts 226a and 226b. Each of the outer pulleys 222a and 222b is fixed relative to the axle 215 onto which it is mounted. The first drive system further includes a pair of counter-rotating gears

228a, 228b which are rotated by first onboard motor 230 (FIG. 3B). So driven, belts 226a and 226b drive pulleys 222a and 222b, respectively and this rotary motion of the pulleys 222a and 222b causes rotation of the geared wheels 200 mounted on a corresponding shaft 215. Accordingly, when the vehicle 200 is moving vertically, the geared wheels 220 carry the weight of the vehicle and any item(s) thereon.

In the embodiments of FIGS. 3A and 3B, the drive axles 215 are rotatably mounted within housing 232 such that their spacing remains fixed relative to one another. As will be described shortly, the fixed spacing between axles 215 in accordance with some embodiments necessitates an alignment step with the guiding system (e.g., tracks) before entry of a vehicle into the columns which extend between the vertical arrays of storage areas 115 (FIG. 1C) and within which the guide system is mounted.

In alternate embodiments (not shown), elements of the first drive system, as geared wheels 200 and axles 215 may be mounted within housing 232 in a manner that allows them to move inwardly so as to relax any requirement for precise alignment while also eliminating the risk of any damage to either the geared wheels 200 or to the guiding system. In embodiments of the latter type, vehicles intended to carry substantial loads may require motor driven means for temporarily reducing the spacing between axles 215 and thereby accommodate entry of a vehicle 200 into the column(s) between storage areas.

With continued reference to FIGS. 3A and 3B, it will be seen that first motor 230 is operatively connected with the gears 228a and 228b to drive belts 226a, 226b and rotate both axles 215 and corresponding geared wheels 220 in a synchronous manner. The first drive system for the vehicle 200 is thus configured to synchronously drive the vehicle 200 in a vertical direction relative to a track or other guiding system. Specifically, each geared wheel 200 is connected to an end of one of the axles 215 in a manner that substantially impedes rotation of the gears relative to the axle. In this way each axle drives the attached two gears in a synchronous manner. Additionally, in the present instance, both axles are driven in a synchronous manner so that all four gears are driven in a synchronous manner.

In embodiments, a single drive motor 230 is used to drive both axles. In this instance, pulleys 222a and 222b serve as timing pulleys rigidly connected to the axles 215 to prevent rotation of the pulley relative to the axle. Similarly, timing pulleys (not shown) are connected to the counter rotating gears 228a and 228b driven by motor 230. In this instance, drive belt 226a connects the timing pulley 222a with the timing pulley directly driven, via gear 228a, by motor 230, while the drive belt 226b connects the timing pulley 222b with the timing pulley indirectly driven, via gear 228b, by motor 230. In embodiments, belts 226a and 226b are each timing belts such that rotation of the drive motor 230 is precisely linked to the rotation of the axle.

There are various other mechanisms that can be used to synchronously drive the axles 215 other than the single-motor arrangement exemplified by FIGS. 3A and 3B. For instance, a pair of drive motors can be used to drive the axles, and the drive motors can be synchronized. In embodiments, the drive motor 230 includes a sensor that is operable to detect the rotation of the motor to thereby determine the distance the vehicle has traveled. Since the gears 200 are rigidly connected with the axles, which are in turn synchronously connected with the drive motor 230, the vertical distance that the vehicle moves can be exactly controlled to correlate to the distance that the drive motor 230 is displaced. For instance, the sensor 252 may be a sensor such as a hall sensor. The sensor detects the rotation of the motor and sends a signal to a central processor, which determines how far along the designated path the vehicle 200 has traveled based on the known information regarding the path and the rotation that the sensor detects for the motor.

Figure 4A:
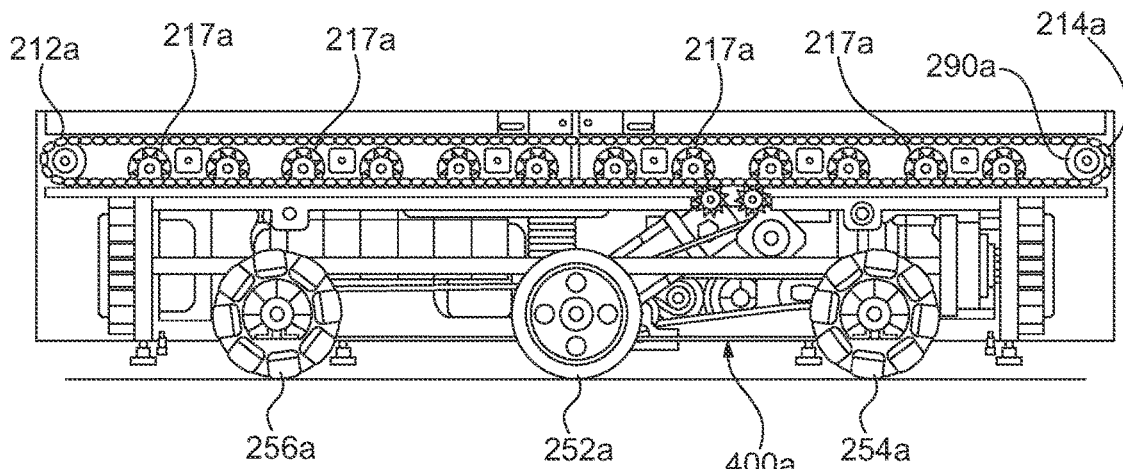
FIG. 4A is a side elevation view of the exemplary automated guided vehicle of FIGS. 2A-2F, taken in cross section across line IVA-IVA in FIG. 2A.
Figure 4B:
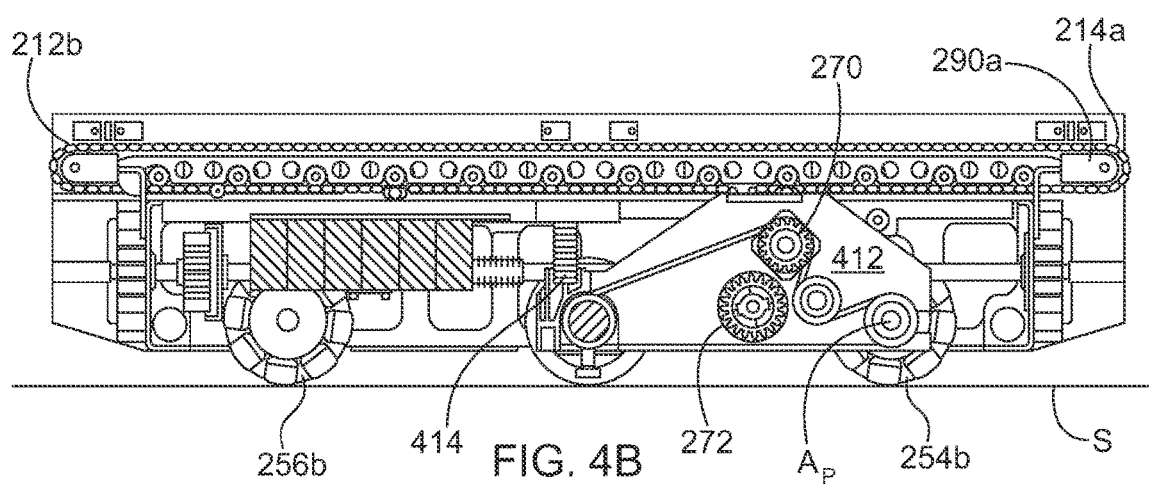
FIG. 4B is a side elevation view of the exemplary automated guided vehicle of FIGS. 2A-2F, taken in cross section across line IVA-IVB in FIG. 2A while the clutch mechanisms thereof are disengaged in accordance with one or more embodiments.
Figure 4C:
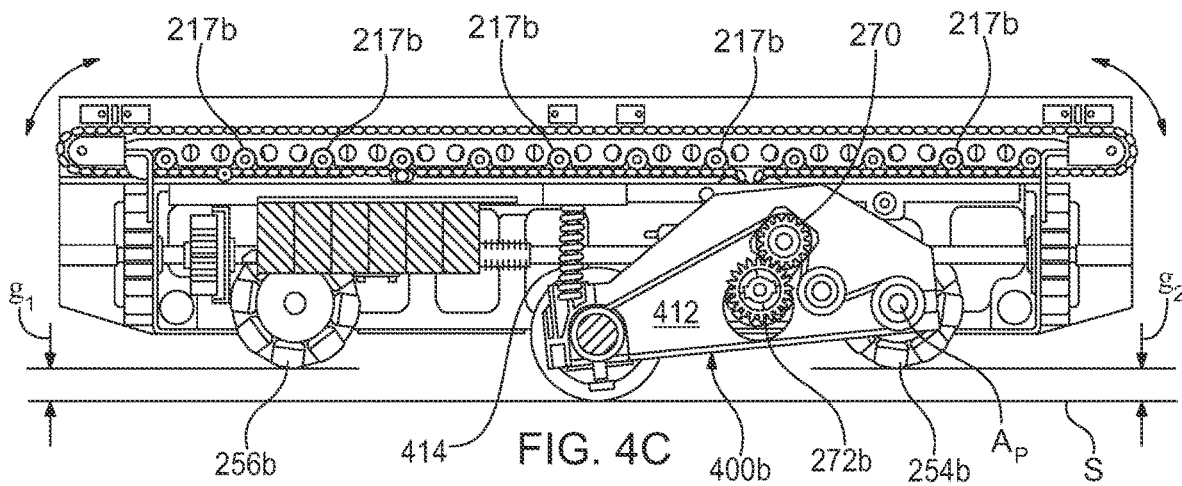
FIG. 4C is a side elevation view of the exemplary automated guided vehicle of FIGS. 2A-2F, taken in cross section across line IVB-IVB in FIG. 2A while the clutch mechanisms thereof are engaged in accordance with one or more embodiments.

With reference now to FIGS. 2C, 3B, and 4A to 4G, there is shown an embodiment of vehicle 200 which further includes a clutch mechanism 400 (FIGS. 4B and 4C) that can be engaged (FIG. 4C) and disengaged (FIG. 4B) to initiate and terminate transmission of power, respectively, from the motor(s) of the second drive system to the transfer mechanism, whereby the second drive system may be operated independently of the transfer mechanism. In this instance, the clutch mechanism 400 is configured as two clutch sub-assemblies which are symmetrically arranged relative to a longitudinal centerline of vehicle 200, with these sub-assemblies being indicated generally at 400a and 400b in FIGS. 2C and 3B. In FIGS. 4B and 4C, only first clutch sub-assembly 400a is visible and includes a first pivotable carrier 410. However, returning briefly to FIG. 3B, it will be seen that second clutch sub-assembly 400b is constructed in the same fashion as sub-assembly 400a and, as such, includes a second pivotable carrier 412.

As best seen in FIG. 4B, each clutch sub-assembly as first clutch assembly 400a includes a pivotable carrier, as first pivotable carrier 410, that is maintained in a first angular orientation, relative to an underlying support surface S while the full weight of vehicle 200 is distributed among wheels 254a, 254b, 256a, 256b, 252a and 252b. Comparing FIG. 4C with FIG. 4B, it will be appreciated that as the vehicle 200 moves vertically in a direction away from underlying surface S, pivotable carriers 410 (and 412) are urged by a compressed coil spring 414 into the second angular position, which is reached when vehicle 200 has reached an elevation above surface S that is of at least dimension gi shown in FIG. 4C. Returning once again to FIG. 3B, it will be seen that a first driven element 270 is rotatably coupled to the first pivotable carrier 410 and that a first endless loop element 274 transfers rotary power to the first driven element 270. Likewise, a second driven element (not shown) of the identically constructed second clutch sub-assembly 400b is rotatably coupled to the second pivotable carrier 412, and a second endless loop element (not shown) transfers rotary power to the second driven element in the same manner as described for the first clutch sub-assembly.

In this instance, each of the endless loop elements as endless loop element 274 is a belt, it being understood that a chain might alternatively be used without departing from the spirit and scope of the present disclosure.

With continued reference to FIGS. 4B and 4C it will be seen that each clutch mechanism sub assembly, as sub-assembly 400a of a vehicle 200 constructed in accordance with one or more embodiments, additionally includes a first pulley 280. The first pulley 280 and first driven element 270 of sub-assembly 400a are driven by the second motor of vehicle 200. Likewise, although not shown, a second pulley and second driven element of sub-assembly 400b are driven by the third motor of vehicle 200. In this instance, the first pulley 280 and second pulley are dimensioned and arranged to engage the first endless loop element 274 and the second endless loop element, respectively, to drive the first and second driven elements whenever the corresponding drive motor is rotated. That is, regardless of whether clutch mechanism sub-assemblies 400a and 400b are engaged to drive the transfer mechanism, the first and second driven elements will rotate as the second and third motors, respectively, are rotated.

As noted previously, and in accordance with one or more embodiments consistent with the present disclosure, the second and third motors are coupled to engage the transfer mechanism only when the vehicle has been elevated, relative to an underlying support surface S, by dimension H (FIG. 4C). Such elevation causes the pivotable carrier 410 to pivot out of the first angular orientation shown in FIG. 4B and into the second angular orientation shown in FIG. 4C. In this instance, coupling of the second motor to the transfer mechanism is achieved, in clutch mechanism subassembly 400a, by a third driven element 272 which pivots into driven engagement with first driven element 270. In like manner, although not shown, coupling of the third motor to the transfer mechanism is achieved, in clutch mechanism subassembly 400b, by a fourth driven element 272 which pivots into driven engagement with the second driven element.

As shown in FIGS. 4A to 4C, rotation of the engaged third and fourth driven elements—of which only fourth driven element 272b is shown in FIG. 4C—causes rotation of first sprocket 290a, 290b which, in turn causes first and second chains 214a, 214b to move pin 212a (FIG. 4A) and pin 212b (FIG. 4B) toward or away from a container to be transferred to or from vehicle 200. When the wheels of vehicle 200 once again rest upon the surface S, as depicted in FIG. 4B, the third and fourth driven elements are again decoupled from the first and second driven elements, respectively. As such, continued operation of the second and third motors of the vehicles as to propel vehicle 200 upon surface S, ceases to have any effect on the transfer mechanism 210.

Figure 4D:
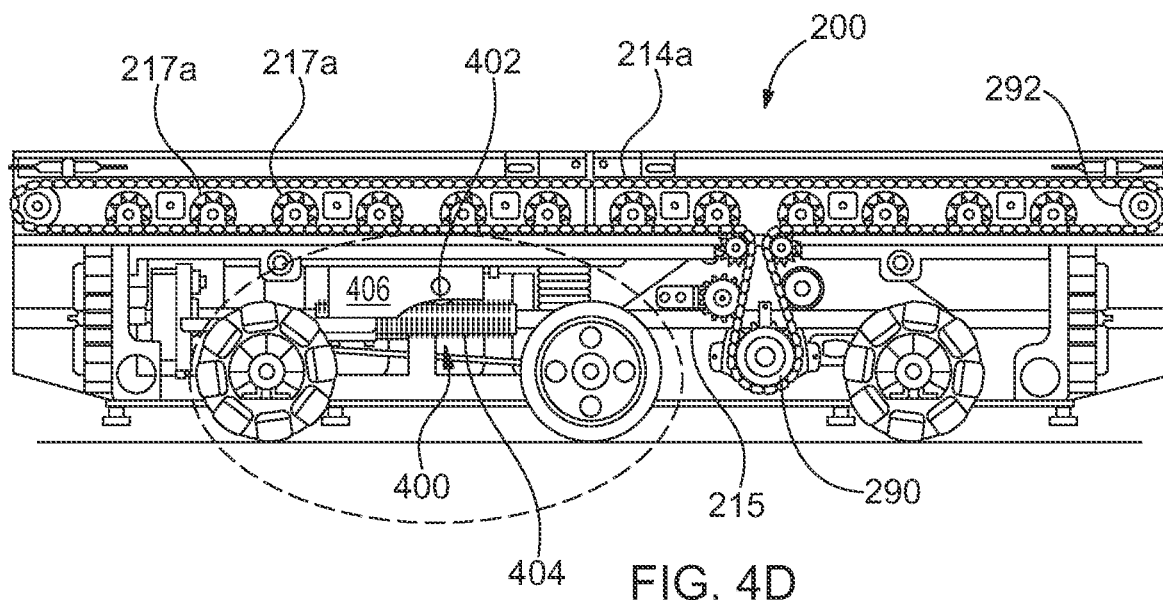
FIGS. 4D and 4E are side elevation views of the exemplary automated guided vehicle of FIGS. 2A-2F, the lateral exterior cover plate being omitted to reveal an optional actuator mechanism having a force imparting member which is selectively movable between a first position (FIG. 4D) and a second position (FIG. 4E)
Figure 4E:
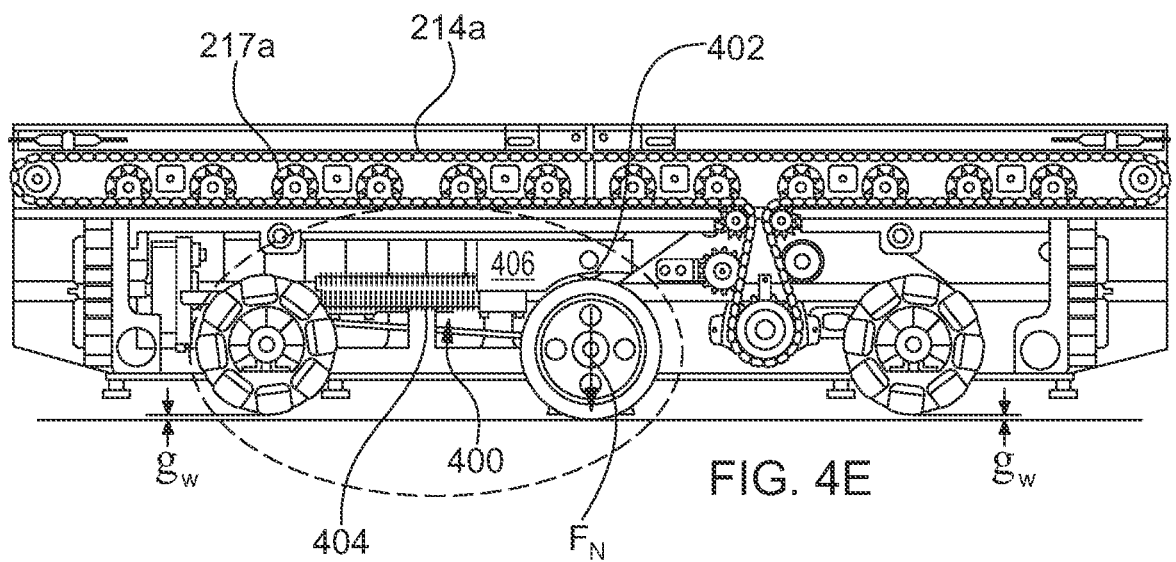
Figure 4F:
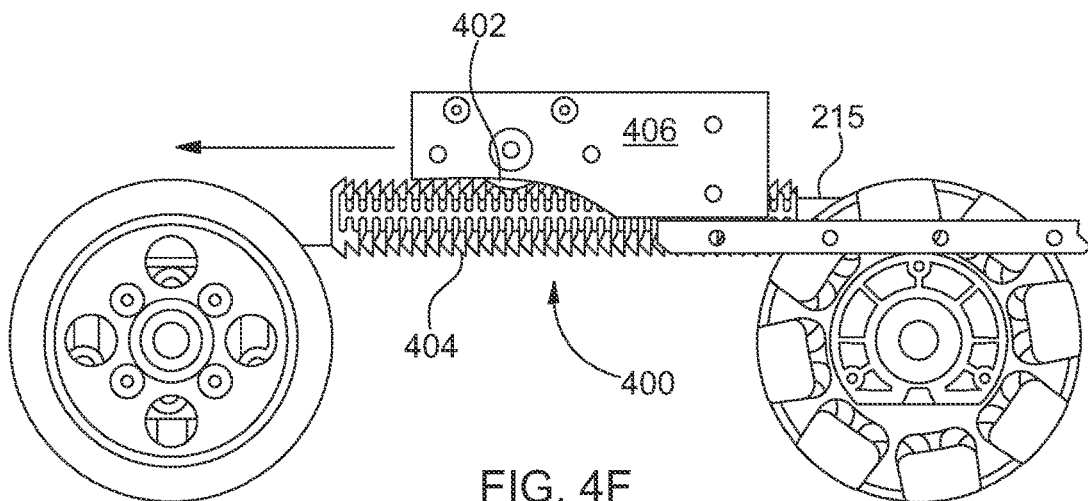
FIG. 4F is an enlarged view of the actuator mechanism depicted in FIGS. 4D and 4E, the force imparting member thereof being shown in the first, non-force imparting position.
Figure 4G:
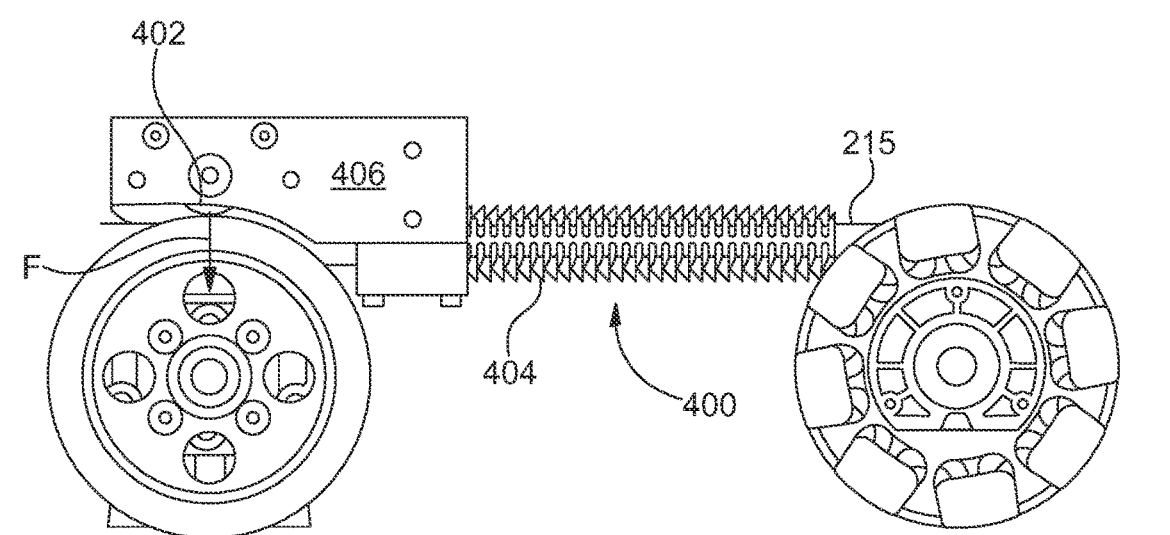
FIG. 4G is an enlarged view of the actuator mechanism depicted in FIGS. 4D to 4F, the force imparting member thereof being shown in the second, force imparting position.

In some applications, it may be desirable that vehicle 200 be capable of loading and unloading other kinds of items than those configured as totes dimensioned and arranged to receive a plurality of inventory items. Such other kinds of items, by way of illustrative example, may include boxes, cartons, trays and the like, or any combination of these, and they may contain one or a plurality of items of inventory. In one or embodiments, such items are accommodated by a transfer mechanism 210 which incorporate an alternative or additional discharge assistant. With particular reference to FIGS. 2G and 4A to 4D, it will be seen that rotation of sprocket 290 causes chains 214a, 214b to drive sprockets 217, wherein each of the driven sprockets causes rotation of a corresponding one of the rollers, as rollers 211 (FIG. 2G). The direction in which the pairs of sprockets 217 are rotated determines whether the rollers of transfer mechanism 210 are operated to assist in loading or in unloading of an item, FIGS. 4D and 4E are side elevation views of the exemplary automated guided vehicle 200 of FIGS. 2A-2F, the lateral exterior cover plate being omitted to reveal an optional actuator mechanism 400 having a force imparting member 402 which is selectively movable between a first position (FIG. 4D) and a second position (FIG. 4E). FIG. 4F is an enlarged view of the actuator mechanism 400 depicted in FIGS. 4D and 4E, the force imparting member 402 being shown in the first, non-force imparting position. FIG. 4G is an enlarged view of the actuator mechanism depicted in FIGS. 4D to 4F, the force imparting 402 thereof being shown in the second, force imparting position.

As noted previously in the discussion of FIG. 4F, the wheels 220 are mounted onto two parallel spaced apart axles, as axle 215 depicted in FIG. 2F, so that two of the wheels are disposed along the forward edge of the vehicle and two of the wheels are disposed along the rearward edge of the vehicle. In one or more embodiments, the optional actuator mechanism 400 includes a threaded portion 404 of each axle 215 and a respective pair of carriers 406. Each respective carrier 406 has a correspondingly threaded bore dimensioned and arranged to receive the threaded portion 404 of an axle 215, and carries one of a pair of force imparting members 402. In one or more embodiments, the force imparting members are rollers which are freely rotatable within carriers 406 about axes of rotation which are transverse to the axes defined by axles 215.

To provide better steering control as can be obtained by differentially driving the forward or rearward pair of omnidirectional wheels, the inventors herein have determined that the force imparting members 402 can be selectively actuated without the need for a dedicated motor. In this instance, rotation of motor 230 (FIG. 3B) causes axles 215 to rotate, which brings carriers 406 forward until they encounter a stop whereupon continuation of the axles 215 produces no further movement of the carriers 406. When positioned as shown in FIG. 4G, each force imparting members exerts a normal force upon a surface of one of the wheels as, for example, while the wheels 252a, 252b are being driven by the second and third motors, respectively. Such actuation of the force imparting members 402 increases frictional contact of wheels 252a and 252b and thereby provides better directional control as the vehicle 200 is moved across underlying surface S (FIG. 4G). As the wheels 252a, 252b are only required while the vehicle is external to the array of storage area 215, motor 230 and axles 215 are able to serve a dual purpose.

Thus, with continuing reference to FIGS. 3B and 4D to 4G, it will be seen that in some embodiments, vehicle 200 includes a first pair of motor driven omnidirectional rollers and a second pair of motor driven omnidirectional rollers, wherein a first omnidirectional roller of each pair is dimensioned and arranged to rotate about a first axis of rotation, wherein a second omnidirectional roller of each pair is driven for rotation about a second axis of rotation, a fifth roller driven by one of the first motor and the second motor; and an actuator movable from a first position to a second position to selectively urge the fifth roller in a direction toward an underlying support surface; wherein a surface of each of the first and second pairs of omnidirectional rollers, and a surface of the fifth roller are dimensioned and arranged to contact the underlying support surface while the actuator is maintained in the first position, and wherein movement of the actuator into the second position causes a transfer of load from one or more of the omnidirectional rollers to the fifth roller.

In one or more embodiments, the vehicle 200 may be powered by an external power supply, such as a contact along a continuous charging rail or, alternatively, using an inductive power transfer coil, either of which serving to provide the electric power needed to drive the vehicle. However, in the present instance, the vehicle 200 includes an onboard power source that provides the requisite power for both the first drive motor 230 and the motors that drive the second drive system. In embodiments, the onboard power supply is rechargeable. In that regard, the power supply may include a power source, such as a rechargeable battery, a bank of ultra-capacitors, as capacitors 240 (FIG. 3B) or a combination of these. For example, ultra-capacitors can accept very high amperage in a recharging operation. By using a high current, the ultra-capacitors can be recharged in a relatively very short period of time, measurable in seconds or minutes as compared to the hours which may be required to charge a suitable battery. On the other hand, provisions can be made, according to one or more embodiments, to automate the process of replacing a discharged battery, with a recharged one, as part of the process of operating one or more of the vehicles.

Where a charging rail is used, each vehicle 200 includes one or more contacts for recharging the power source. In the present instance, the vehicle includes a plurality of brushes, such as copper brushes that are spring-loaded so that the brushes are biased outwardly. The brushes cooperate with a charging rail to recharge the power source, as described further below. For instance, a pair of charging rails (not shown) may be disposed along the columns within which the vehicles 200 move during a sequence one or more storage and/or retrieval tasks. Alternatively, vertical and/or horizontal charging rails may be arranged within charging stations (not shown) disposed in the vicinity of the delivery station 120 (FIG. 1C).

In embodiments, the charging rails are conductive strips connected with an electrical supply. The charging contacts of the vehicle 200 engage the conductive strips to recharge the ultra-capacitors. Specifically, the biasing element of the brushes biases the brushes outwardly toward the charging contacts. The electricity flowing through the charging contact provides a high amperage, low voltage source that allows the ultra-capacitors to recharge in an interval measurable in seconds or minutes, depending upon the amount of power consumed during a sequence of inventory management tasks or subtasks.

Since the power supply provided by the ultra-capacitors may last for only a few minutes, vehicles utilizing ultra-capacitors as a power source may recharge charges each time the vehicles travel within a loading column and/or utilize a charging station disposed along a path taken in the course of performing inventory management tasks requiring an association with one or more FAMs, as FAMs 18 (FIGS. 1A and 1B) or FAMs 40 and 50 (FIGS. 1B and 10).

In one or more embodiments, each vehicle may include a load sensor for detecting that an item is loaded onto the vehicle. The sensor(s) ensure that the item is properly positioned on the vehicle. For instance, the load sensor may include a force detector detecting a weight change or an infrared sensor detecting the presence of an item.

In the embodiments of FIGS. 1A to 1C, the automated guided vehicle or AGV may be semi-autonomous or, alternatively, fully autonomous. In the latter regard, a multitude of non-contact systems have been proposed for the purpose of continuously determining the actual position of an automated guided vehicle in absolute coordinates, and resetting navigational parameters (i.e., X, Y, and heading) to null out accumulated errors, thereby re-referencing the vehicle. Any of these may be utilized in the implementation of position referencing for automated guided vehicles in an inventory management system consistent with embodiments of the present disclosure. Such referencing systems can be ultrasonic, RF, or optical in nature, with ultrasonic and optical being especially suited to indoor scenarios. Of these latter two categories, optical systems are generally more accurate and therefore more widely employed in commercial practice.

Exemplary position sensing systems utilize a scanning mechanism that operates in conjunction with fixed-location references strategically placed at pre-defined surveyed sites. Such scanning mechanisms may include scanning detectors with fixed active-beacon emitters, scanning emitter/detectors with passive retroreflective targets, scanning emitter/detectors with active transponder targets, and rotating emitters with fixed detector targets.

In one or more illustrative embodiments consistent with the present disclosure, automated guided vehicles rely on a scanning laser triangulation scheme (SLTS) to provide positional updates to an onboard dead-reckoning system of the vehicle. A laser emitter rotating at, for example, two rpm illuminates passive retroreflective barcode targets affixed to walls or support columns at known locations one the order of fifteen meters away from the vehicle. The barcodes are used to positively identify the reference target and eliminate ambiguities due to false returns from other specular surfaces within the operating area. An onboard computer of each vehicle calculates X-Y positional updates through simple triangulation to null out accumulated dead-reckoning errors.

By way of additional example, each automated guided vehicle 200 may utilize retroreflective targets, distributed throughout the operating area, in a manner which allows both range and angular orientation to be determined by each vehicle. In an embodiment, a servo-controlled rotating mirror on the AGV pans a near-infrared laser beam through a horizontal arc of 90 degrees at, for example, a 20-Hz update rate. When the beam sweeps across a target of known dimensions, a return signal of finite duration is sensed by the detector. Where the retroreflective targets are all the same size, the signal generated by a close target will be of longer duration than that from a distant one. Angle measurement is initiated when the scanner begins its sweep from right to left, where detection of the reflected signal terminates the timing sequence.

As yet another position reference technique which may be employed in an automated guided vehicle consistent with the present disclosure is a laser-based scanning beacon system computes vehicle position and heading using cooperative electronic transponders with passive reflectors. Such a scanner mechanism includes a rotating mirror attached at, for example, a 45-degree angle to the vertical shaft of an incremental optical encoder. In order to achieve increased azimuthal accuracy, a timer interpolates between encoder counts. The fan-shaped beam is diverges vertically at, for example, a four degree spread angle, to ensure target detection at long range while traversing irregular floor surfaces. Each target is uniquely coded, and many (e.g., 32) targets can be processed in a single Scan, with vehicle X-Y position calculated every 100 milliseconds.

In one or more autonomous embodiments, each AGV maintains, in memory, an internally stored map of its own position within a facility. In addition, each AGV reports its position, speed, angular orientation in the plane of travel, and a selected path of travel data to other vehicles in the facility, and the AGV receives such data from other vehicles. Using the AGV data, each vehicle maintains a dynamically updated map which reflects the position of all vehicles in the particular zone(s) of an inventory management facility to which that vehicle has been assigned. When dynamically updated position data is available locally at each vehicle, a task may be assigned to a vehicle by a central controller as controller 450, in embodiments, the path segments taken by a vehicle to reach the location(s) where elements of the assigned task are to be performed may be selected by the vehicle.

In an embodiment, each vehicle is configured to execute, by a processor local to that vehicle, steps of a navigation process stored in memory which cause the vehicle to follow a shortest path from a current location of the vehicle to a destination where the next subtask(s) of an assigned task are to be performed. In such embodiments, the central controller 450 need not be configured to execute traffic control and collision avoidance functions (unless a backup control scheme is desired) but, instead, central controller 450 may be configured to transmit signals representative of instructions which identify the next task(s) to be assigned to each vehicle and which specify the various locations within the facility where those tasks are to be performed. The vehicles, on the other hand, may be configured to transmit signals to the controller which are representative of task assignment acknowledgements, position updates, status updates (e.g., sub-task completed or in process, current power status, etc.), and other information which the controller may require to assess the relative ability of the vehicles to perform tasks awaiting assignment.

In a fully autonomous scheme according to one or more embodiments, each vehicle may alternatively utilize a local processor to determine speed and direction of movement from sensed indicia placed on an underlying support surface in one or more zones of an inventory management facility, to exchange that positional data with other vehicles within the facility, and to maintain a dynamically updated, local map to achieve a form of decentralized traffic control in manner similar to that described above using other positional sensing approaches.

In semi-autonomous configurations of AGVs consistent with the present disclosure, a central controller, as controller 450, provides traffic control functions needed, for example, to prevent collisions of the vehicles with one another and/or with any potential obstructions to vehicle movement which may be present in the one or more zone(s) of a facility to which a subset of vehicles are assigned. In such embodiments, controller 450 receives current position and bearing data in the form of update signals transmitted from the vehicles 200. In embodiments, the received position and bearing data is compared with estimates that the controller has derived from prior speed and heading instructions transmitted by the controller to the vehicle. Based on the comparison, the controller 450 may determine that corrections to one or more of the speed and direction of one or more vehicles is needed to prevent a collision and, if so, transmit those instructions to the vehicle(s).

In one or more semi-autonomous embodiments consistent with the present disclosure, each vehicle 200 may include a reader for reading indicia placed on a surface upon which the vehicle is traveling and/or in positions within access columns aligned with the array of storage areas 115 (FIG. 1C). In some embodiments, each indicium of a first group of indicia corresponds to a unique location to form a grid of locations. These locations may be stored in a data table in a memory accessible to a processor of the vehicle, of the central controller 450, or a both. By following a path designed to intersect with a particular sequence of these indicia, each vehicle may transmit an identifier of an indicium as it passes over it and confirm it to controller 450 whereupon a semi-autonomous guiding of the vehicle is achieved via instructions transmitted by the controller to the vehicle. From this information and other data reported by each vehicle, controller 450 can confirm the speed, direction, and path of movement for each vehicle. In one or more embodiments, controller 450 utilizes speed and directional data to enforce collision avoidance policies, to assign inventory management tasks according to the location and power reserve status of each vehicle and, in the interest of safety, to maintain an appropriate distance from any personnel permitted in the area.

Additional indicia may be affixed, within the access columns or to stored totes themselves, at positions adjacent to each of storage locations 115 (FIG. 1C). Here, each indicium may bear include a unique bar code, and the reader on each vehicle 200 may scan the area around the storage location 115 at which an item is to be delivered or retrieved. The data that the central processor 450 has regarding the path that a vehicle 200 has to follow and the data regarding the distance the vehicle has traveled based on the data regarding the rotation of the drive motor may be sufficient to determine whether the vehicle 200 is positioned at the appropriate storage location within the storage areas 115. Nonetheless, indicia adjacent the storage areas permits a redundancy check of the location of the vehicle before an item is discharged into or received from the appropriate storage location. Therefore, the scanner may operate to scan and read information regarding the storage location at which the vehicle is stopped. If the scanned data indicates that the storage location is the appropriate storage location, then the vehicle discharges its item into the storage location. Similarly, the vehicle may have a second reader for reading indicia adjacent the rearward edge of the vehicle. The second reader may be used in applications in which the system is set up to utilize a first series of storage locations along the forward side of an access column and a second series of storage locations along the rearward side of an access column, as shown in FIG. 1C.

In some embodiments, functionality for autonomous or semi-autonomous guidance of the vehicles 200 may be integrated into one or more of the FAMs, as for example, FAMs 18 of FIG. 1A. Such an approach may be beneficial where precise position sensing is required in some zones within an inventory management facility, but a less precise position sensing approach may be acceptable in other zones. For example, in embodiments such as that depicted in FIG. 1A, FAMs 18 are depicted as serving a supporting role to warehouse workers and thus may be required to maintain a safe distance but nonetheless remain in proximity to carry out the supporting task(s). It suffices to say, from the foregoing discussion of various non-limiting examples, that a variety of techniques and systems may be employed in order to coordinate the positions of AGVs and associated FAMs in an inventory management system.

In the foregoing description, the vehicles have drive gears 220 that are dimensioned and arranged to interact with teeth of respective, inwardly facing tracks disposed within each access columns. Such interaction can effect raising or lowering of a vehicle, depending upon the direct of rotation of motor 230. As well, one or more of the FAMs may incorporate tracks having teeth so as to permit a vehicle to raise and lower a FAM with which it is associated along with one or more of the structures with which a FAM is docked, as FAM 18 or FAM 50. In addition, the teeth of drive gears 220 may alternatively be actuated to actuate mechanisms which are part of a FAM. As will be explained later, for heavier loads (e.g., on the order of 300 kg or more), multi-shelf FAMs 40 such as those depicted in FIGS. 1B and 1C, may be equipped with an internal, gear driven jack mechanism actuated by rotation of the gears 220 so as to minimize the amount of torque needed by motor 230 to initiate and maintain elevation of FAMs 40 during their movement upon an underlying surface.

In some embodiments, the processor of each vehicle controls the operation of the vehicle in response to signals received from the central processor 450. Additionally, the vehicle includes a wireless transceiver so that the vehicle can continuously communicate with the central processor as it travels along the track. Alternatively, in some applications, it may be desirable to incorporate a plurality of sensors or indicators along paths which the vehicles may traverse. The vehicle may include a reader for sensing the sensor signals and/or the indicators, as well as a central processor for controlling the operation of the vehicle in response to the sensors or indicators.

Figure 5A:
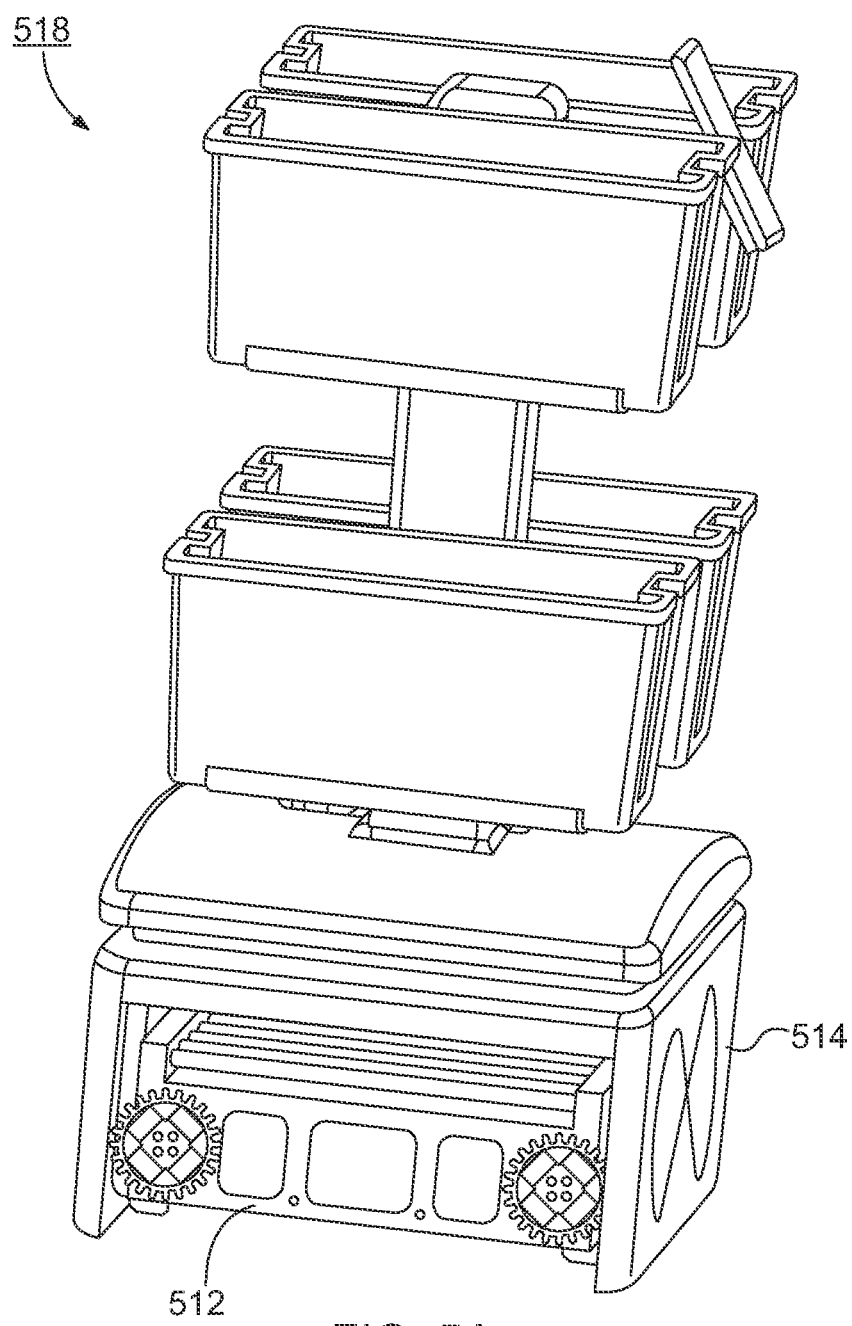
FIG. 5A is a front perspective view depicting the use of an automated guided vehicle in conjunction with a functional accessory module of a first group of functional accessory modules, according to one or more embodiments.
Figure 5B:
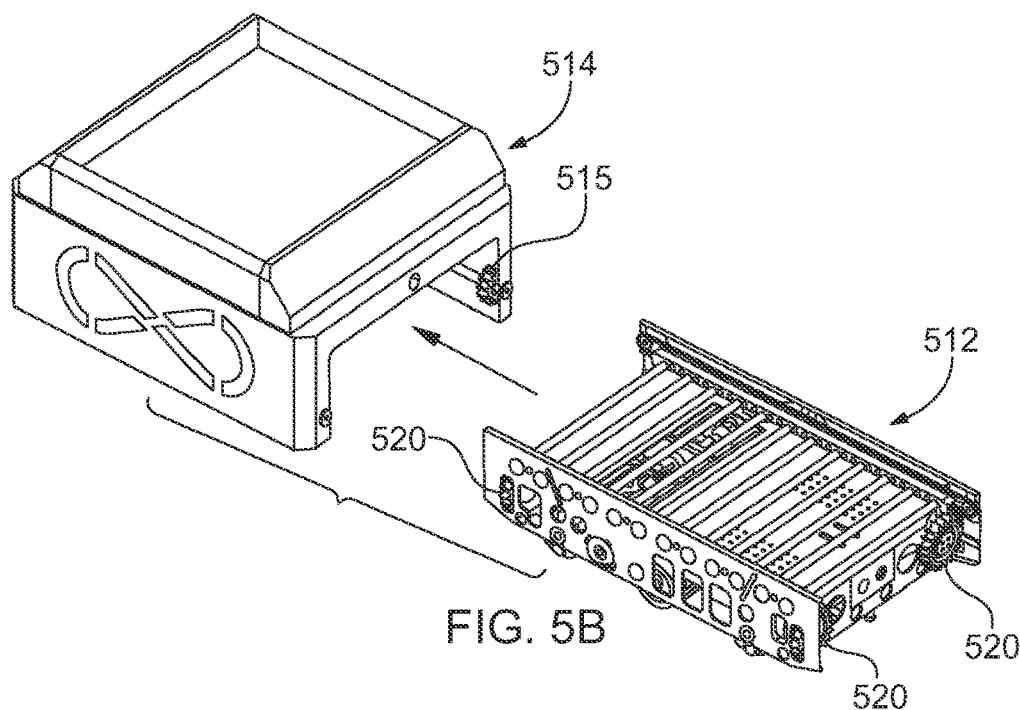
FIG. 5B is a perspective view depicting pre-docking alignment of an automated guided vehicle with a first illustrative base which may be realized either as an integral part of a functional accessory module, as any of the functional accessory modules shown in FIGS. 1A to 1C and 5A, or as a separate functional accessory module serving as an adaptor between the vehicle and at least one of those other types of functional modules, according to respective embodiments.

FIG. 5A is a front perspective view depicting the use of an automated guided vehicle 512 in conjunction with a functional accessory module (FAM) 518 of a first group of functional accessory modules, according to one or more embodiments. FIG. 5B is a perspective view depicting pre-docking alignment of the automated guided vehicle 512 of FIG. 5A, with a first illustrative base 514 which may be realized either as an integral part of a functional accessory module, as any of the functional accessory modules shown in FIGS. 1A to 1C and 5A, or as a separate functional accessory module serving as an adaptor between the vehicle and at least one of those other types of functional modules, according to respective embodiments. Where FAM 518 is expected to accommodate heavy loads, base 514 may incorporate an internal jack mechanism actuated by gears, as gear 515, dimensioned and arranged with the gear wheels 520 of vehicle 512.

Figure 5C:
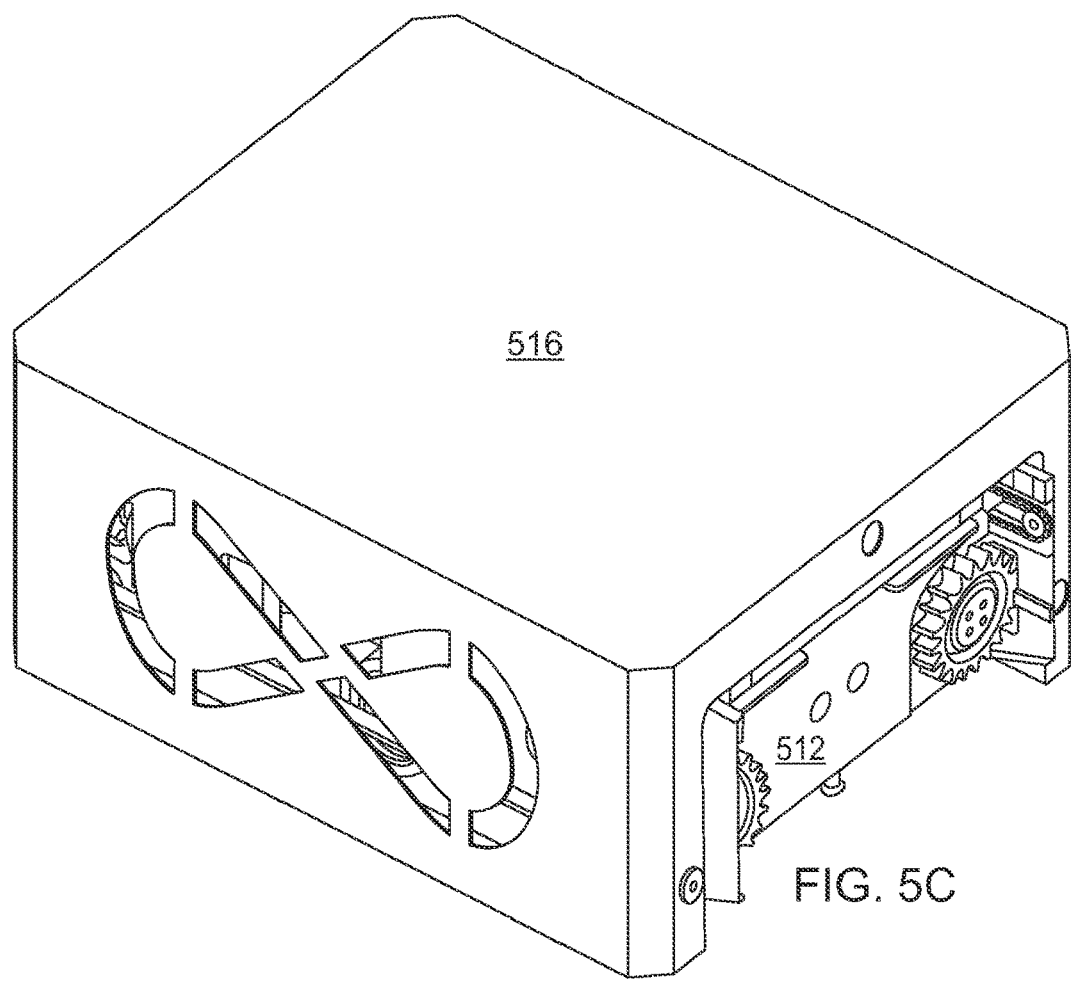
FIG. 5C is a perspective view depicting post-docking alignment of an automated guided vehicle with a second alternative base which may be realized either as an integral part of a functional accessory module, as any of the functional accessory modules shown in FIGS. 1A to 1C and 5A, or as a separate functional accessory module serving as an adaptor between the vehicle and at least one of those other types of functional modules, according to respective embodiments.

FIG. 5C is a perspective view depicting post-docking alignment of an automated guided vehicle 512 with a second alternative base 516 which may be realized either as an integral part of a functional accessory module, as any of the functional accessory modules shown in FIGS. 1A to 1C and 5A, or as a separate functional accessory module serving as an adaptor between the vehicle and at least one of those other types of functional modules, according to respective embodiments.

Figure 5D:
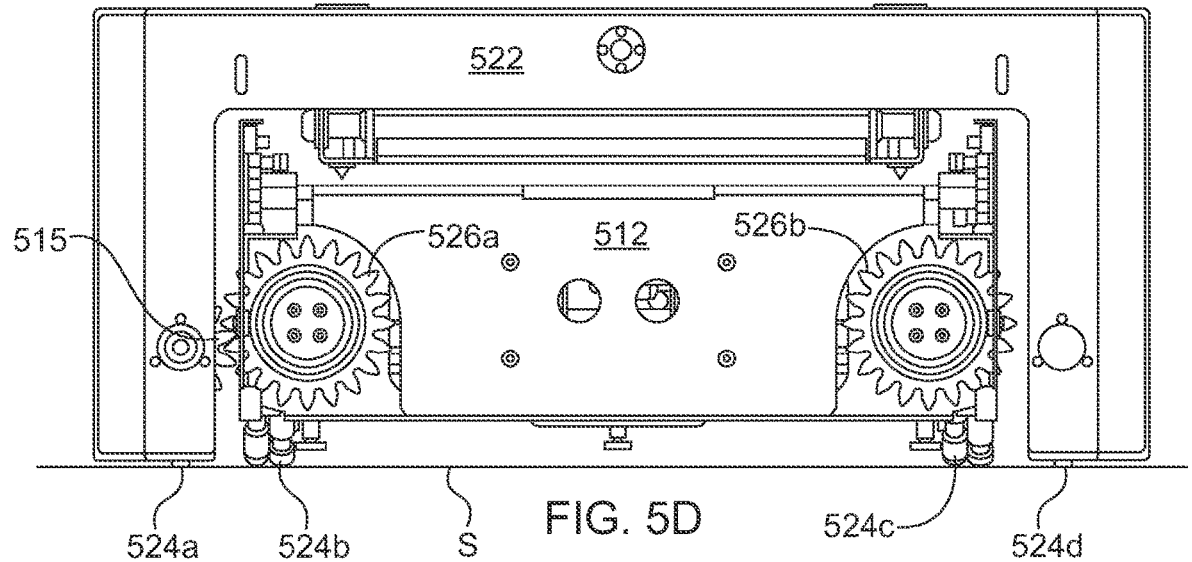
FIG. 5D is a rear elevation view of an automated guided vehicle docked with a base such as depicted in FIG. 5C or 5D, where respective surfaces of each of the base and vehicle are in contact, at multiple points, with an underlying support surface.
Figure 5E:
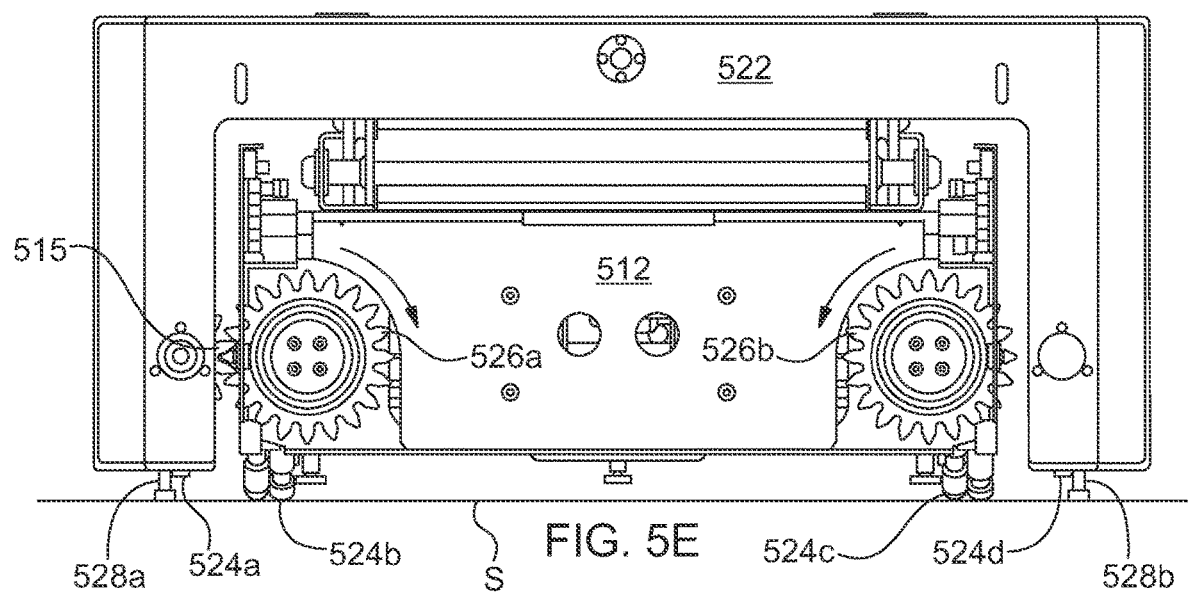
FIG. 5E is a rear elevation view of the docked automated guided vehicle of FIG. 5D, after a first drive system of the vehicle has been actuated to lift the base with which it is docked, such that none of the surfaces of the base are in contact with the underlying support surface.

FIG. 5D is a rear elevation view of an automated guided vehicle 512 docked with a base 522 such as depicted in FIG. 5C or 5D, where respective surfaces of each of the base and vehicle are in contact, at multiple points 524a, with underlying support surface S. FIG. 5E is a rear elevation view of the docked automated guided vehicle 512 of FIG. 5D, after the first drive system of the vehicle, which comprises front and back pairs of geared wheels, as wheels 526a and 526b, has been actuated by rotation of gear wheels 520 in the direction of the arrows, to lift the base with which it is docked, such that none of the surfaces of the base, including surface regions 524a and 524d, are in contact with the underlying support surface S. In this instance, base 514 incorporates an internal jack mechanism that includes linearly extendable legs 528a and 528b which are downwardly displaced as gear wheels 520 are rotated to drive one or more gears of the drive mechanism, as gear 515.

Figure 6A:
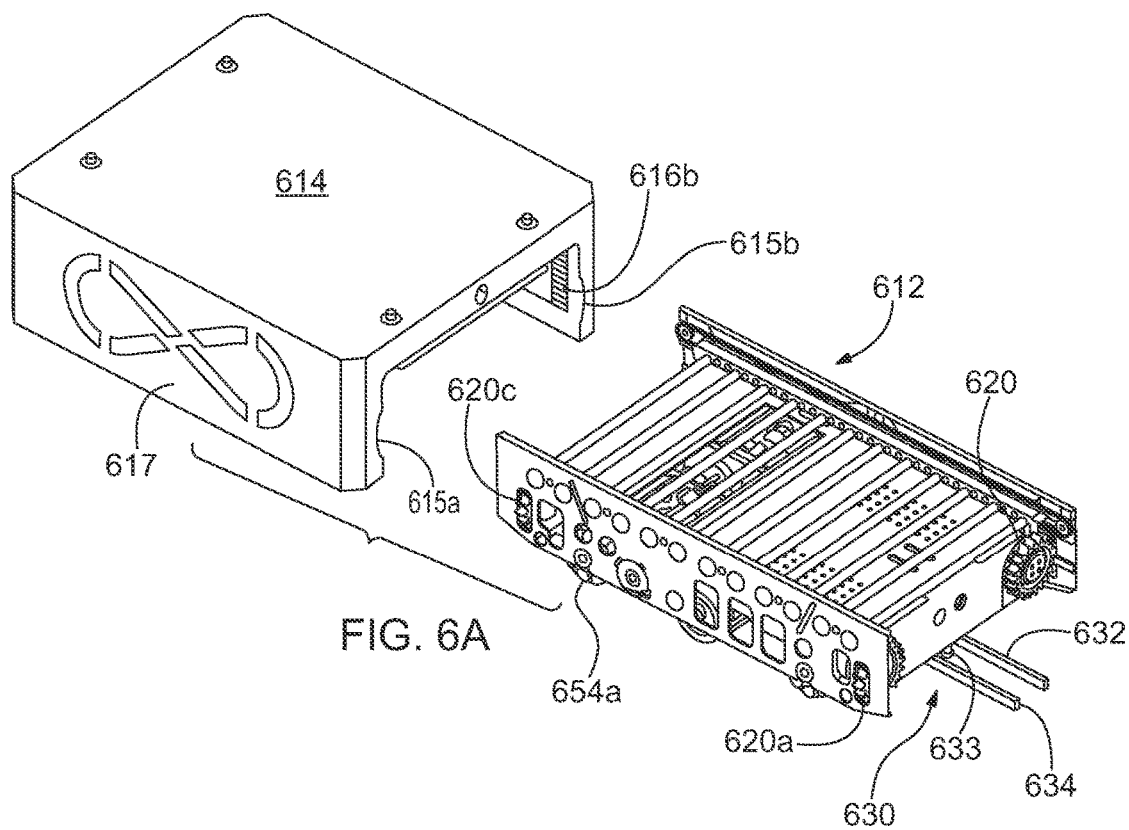
FIG. 6A is a perspective view depicting post-docking alignment of an automated guided vehicle with a third alternative base which may be realized either as an integral part of a functional accessory module, as one or more of the functional accessory modules shown in FIGS. 1A to 1C and 5A, or as a separate functional accessory module serving as an adaptor between the vehicle and at least one or more of those other types of functional modules, according to respective embodiments.
Figure 6B:
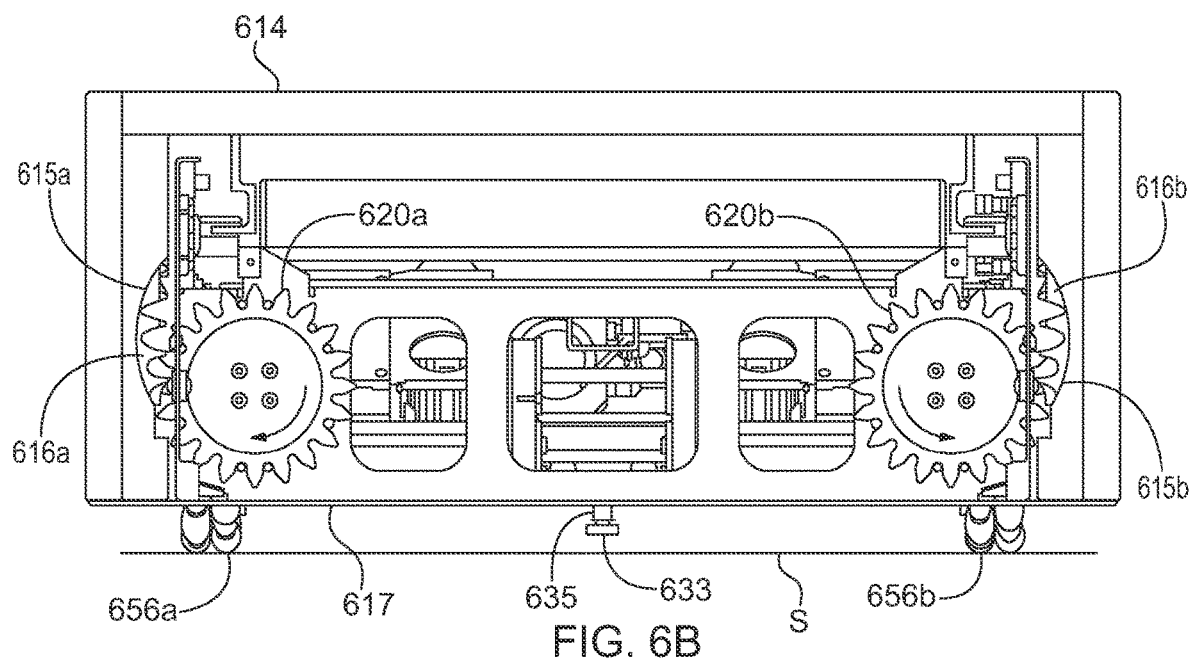
FIG. 6B is a rear elevation view of the docked automated guided vehicle of FIG. 6A, after a first drive system of the vehicle has been actuated to lift the base with which it is docked, such that none of its surfaces are in contact with the underlying support surface.
Figure 6C:
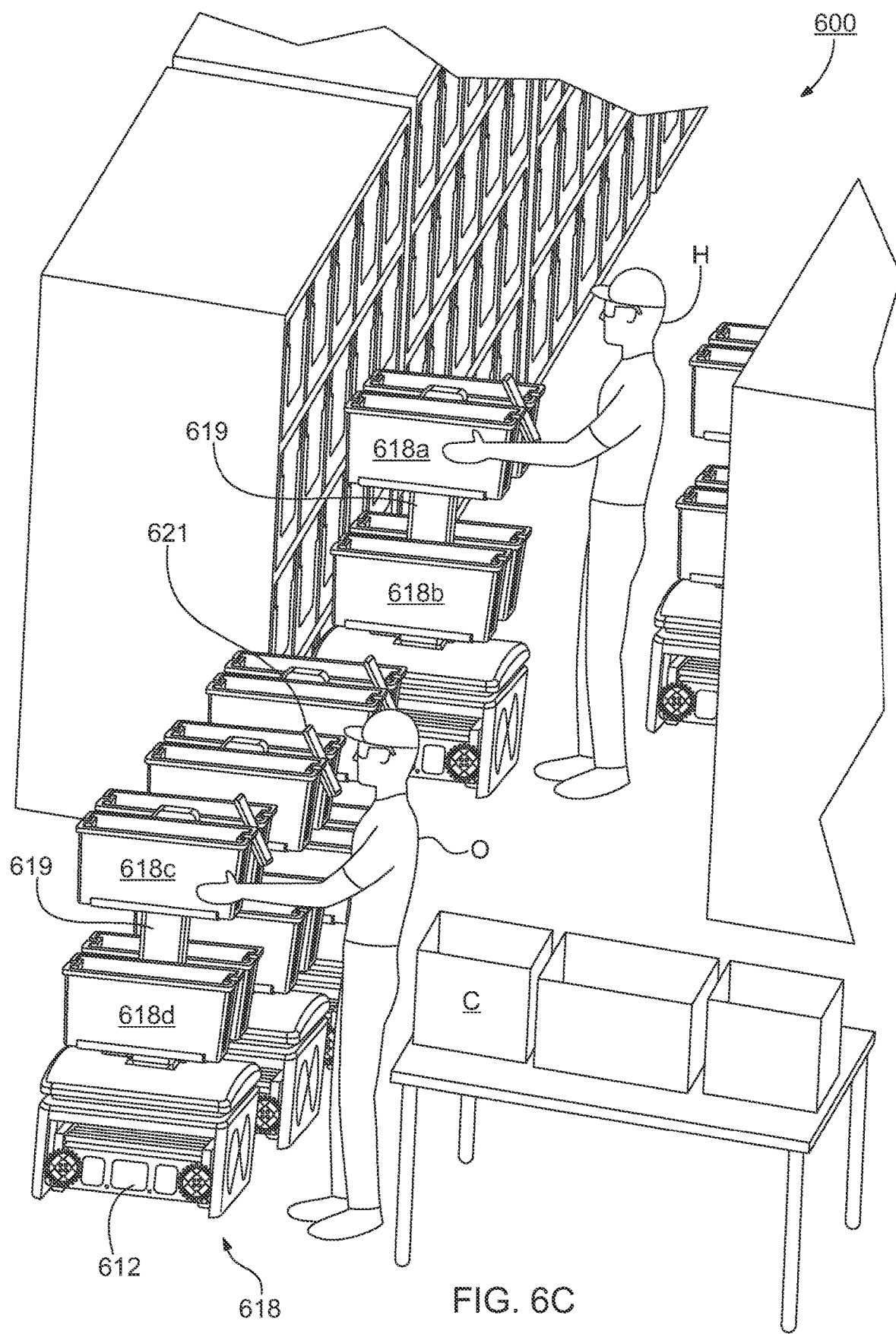
FIG. 6C is a perspective view of an inventory management system, depicting the placement and use of a plurality of functional accessory modules constructed in accordance with any of the embodiments shown in FIGS. 5A to 6B.

FIG. 6A is a perspective view depicting post-docking alignment of an automated guided vehicle 612 with a third alternative base 614 which may be realized either as an integral part of a functional accessory module (FAM) as one or more of the FAMs shown in FIGS. 1A to 1C and 5A, or as an auxiliary (FAM) dimensioned and configured to serve as an adaptor between the vehicle and at least one or more of those other types FAMs, according to respective embodiments. In this instance, base 614 is an auxiliary FAM dimensioned and arranged to permit vehicle 612 to enter, lift, and transport FAM 618 (FIG. 6C).

To accommodate entry of vehicle 612, the base 614 of the auxiliary adaptor defines a central entry opening with lateral recesses, indicated generally at 615a and 615b. As best seen in FIG. 6B, which is a rear elevation view of the docked automated guided vehicle 612 of FIG. 6A, each of the lateral recesses 615a and 615b is aligned with a corresponding segment of track, as track segment 616a and 616b, respectively. The track segments 616a and 616b are affixed to interior surfaces of base 614 and aligned with each other such that both are vertically oriented while the bottom surface 617 of the auxiliary adapter is resting upon a substantially horizontal underlying support surface.

Vehicle 612 may utilize gear wheels and axles which are drawn closer together by an appropriate mechanism (not shown) to accommodate docking with any of the one or more FAM structures which have been and/or will be described herein. In other embodiments consistent with the present disclosure, the distance between gear wheels 620a and 620b remains fixed during the performance of all inventory management tasks—inclusive of all phases of the vehicle alignment, FAM entry and FAM docking procedures. In such embodiments, precise alignment must be maintained between the geared wheels of the vehicle 612, on the one hand, and the track segments, as segments 615a and 615b of the vehicle base, on the other hand.

To this end, one or more FAM embodiments may incorporate defeasible interlock structures such, by way of illustrative example, as protuberances (not shown). For example, the auxiliary FAM of FIGS. 6A and 6B may include protuberances which extend downwardly from the bottom surface of 217, with one or more drive systems of the vehicle 612 being actuated to lower and lift the protuberances into and out of dimensioned depressions formed, as by drilling, into the underlying support surface S. Such an arrangement might alternatively be reversed such that the recesses are defined in bottom surface 617 and the protuberances are affixed, secured or otherwise formed so as to project upwardly from the underlying support surface S.

A defeasible engagement between protuberances and depressions as described above is one way to maintain the position of base 614 against undesirable lateral shifting movements which might otherwise occur, for example, during deceleration of the vehicle and FAM(s), from the application of unexpected impact forces during the docking procedure. Improper alignment between the gear wheels of vehicle 612 and the FAM during docking is one source of potential impact. In that regard, sensors of the vehicle 612 might be employed to initiate a re-alignment procedure by which the vehicle 612 might back up, make a small angular adjustment and attempt re-entry into base 614. In one or more embodiments consistent with the present disclosure, however, vehicles consistent with the present disclosure are configured to utilize an alignment system, to facilitate proper registration of gear wheels of a vehicle, as gear wheel 620a-620c of vehicle 612, and those FAM structures utilizing track segments, as base 614.

Use of an alignment system minimizes the possibility of damaging either of the two structures (gear wheels and track segments) during the docking procedure. In the embodiment of FIGS. 6A and 6B, the alignment system comprises parallel, floor mounted guide rails, as rails 632 and 634. Rails 632 and 634 are spaced apart by a gap dimensioned to receive and guide the linear translation of one or more supports depending downwardly from vehicle 612. That is, rails 632 and 634 are separated along their length by a gap of sufficient width to accommodate entry and passage of a series of guides, indicated generally at 633. Each guide depends from the undercarriage of vehicle 612 by a rod indicated generally at 635 (FIG. 6B).

Turning briefly to FIGS. 2C to 2F, it will be seen that the vehicle 200 also incorporates a series of guides, indicated at 233. In FIG. 2C it can be seen that these guides are arranged along a longitudinal center line L. In embodiments, the guides 233 are arranged along the underside of vehicle 612 in the same manner as that shown for guides 233 in FIG. 2C. With when all guides 633 have entered the gap between rails 632 and 635, proper alignment between vehicle 612 and base 614 (or any other of the FAM and storage structures depicted throughout the present disclosure) can be maintained. In the former regard, it should be noted that the gap between rails 632 and 634 may taper from a larger width dimension (at the point of lead guide entry) to a smaller width dimension in order, for example, to relax the burden upon vehicle 612 to initiate docking with the same tight dimensional tolerance as would be required upon the point of entry at the base 614 of the auxiliary adaptor FAM itself. In some embodiments, the taper may be monotonic in an entry transition zone. That is, the gap may be decrease in width at a constant rate in the direction of vehicle movement toward a FAM with which it is docking, and thereafter the gap between rails may maintain a constant width selected to maintain adequately precise alignment of the vehicle with its point of entry into the FAM. Where the vehicle is equipped with gear wheels, as vehicles 212 and 612, such alignment will be determined by the spacing of corresponding teeth of the FAM guide or jack system with which the gear wheels will interact.

Once vehicle 612 maneuvers into a position of proper alignment with base 614, one or more drive systems of vehicle 612 are operated such that its wheels, including omnidirectional wheels 654a (FIG. 6A) and 656a and 656b (FIG. 6B) cause the vehicle 612 to enter base 614. In embodiments, a motor (not shown) of the first drive system of the vehicle causes rotation of gear wheels 620a and 620b in the direction of the arrows shown. Rotation of the gear wheels against the teeth of the rack segments, as rack segments 616a and 616b, causes the base 614 to be urged upwardly in the direction of arrow F. Once the vehicle 612 has lifted the base 614 with which it is docked, the bottom surface 617 of base 614 is no longer in contact with the underlying support surface S.

FIG. 6C is a perspective view of an inventory management system 600, depicting the placement and use of a plurality of functional accessory modules 618 constructed in accordance with any of the embodiments shown in FIGS. 5A to 6B. In this case, vehicles 612 are shown disposed within bases which are formed as an integral part of each FAM 618. Each FAM 618 includes a plurality of bins, as bins 618a and 618b, which are mounted along a stalk 619 so as to be at the right height above the underlying ground surface for a human operator H to remove items from the nearby storage racks and place them into one of the bin. Thereafter, the operator H may confirm conclusion of the completion of the transaction by entering data via a touch screens terminal, as touchscreen terminal 621. In this instance, a second operator O located at a picking destination, removes items from bin 618c or 618d, and places them in a carton C for shipment.

Figure 7A:
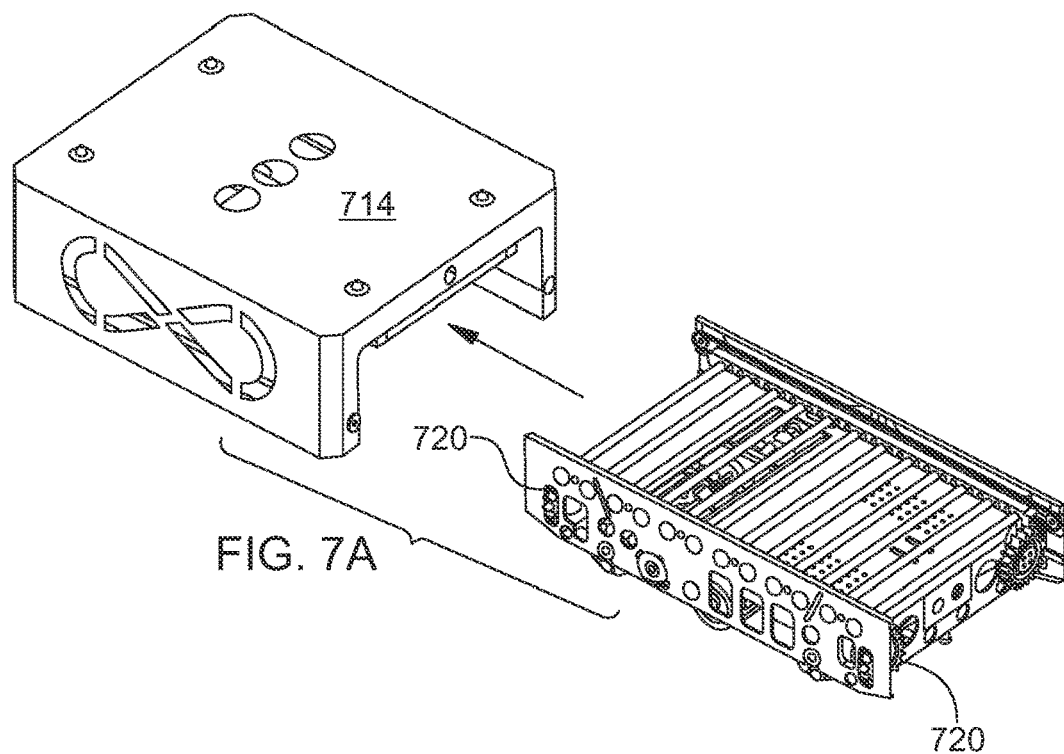
FIG. 7A is a perspective view depicting pre-docking alignment of an automated guided vehicle with a first functional accessory module dimensioned and arranged serve as an adaptor between the vehicle and at least one or more of the other types of functional modules shown in FIGS. 1A to 1C, according to respective embodiments.

With reference now to FIGS. 7A to 7D, it will be seen that FIG. 7A is a perspective view depicting pre-docking alignment of an automated guided vehicle 712 with a first functional accessory module (FAM) 714 in the form of an auxiliary adaptor FAM between the vehicle 712 and at least one or more of the other types of functional modules shown in FIGS. 1A to 1C, according to respective embodiments. As in the above-described exemplary embodiment of FIG. 6A and FIG. 6B, the embodiment of FIGS. 7A and 7B may utilize a defeasible interlock system and alignment system neither of which are shown) to facilitate the docking which must take place between vehicle 712 and auxiliary FAM 714. In furtherance of a function to auxiliary FAM 714, namely the lifting of one or more dynamically deployable FAM structures (as FAM 718 of FIGS. 8A to 8C), the upper surface of FAM 714 may also include a plurality of upwardly extending docking projections, indicated generally at 715. In embodiments, projections 715 are dimensioned and arranged for registration with corresponding structure as recesses 723 of auxiliary FAM structure 718 of FIGS. 8A to 8C, during a docking procedure. When docked, projections 715 of FAM 714 form part of a defeasible interlock with any auxiliary FAM structure while both are being transported across underling support surface S by vehicle 712.

Figure 7B:
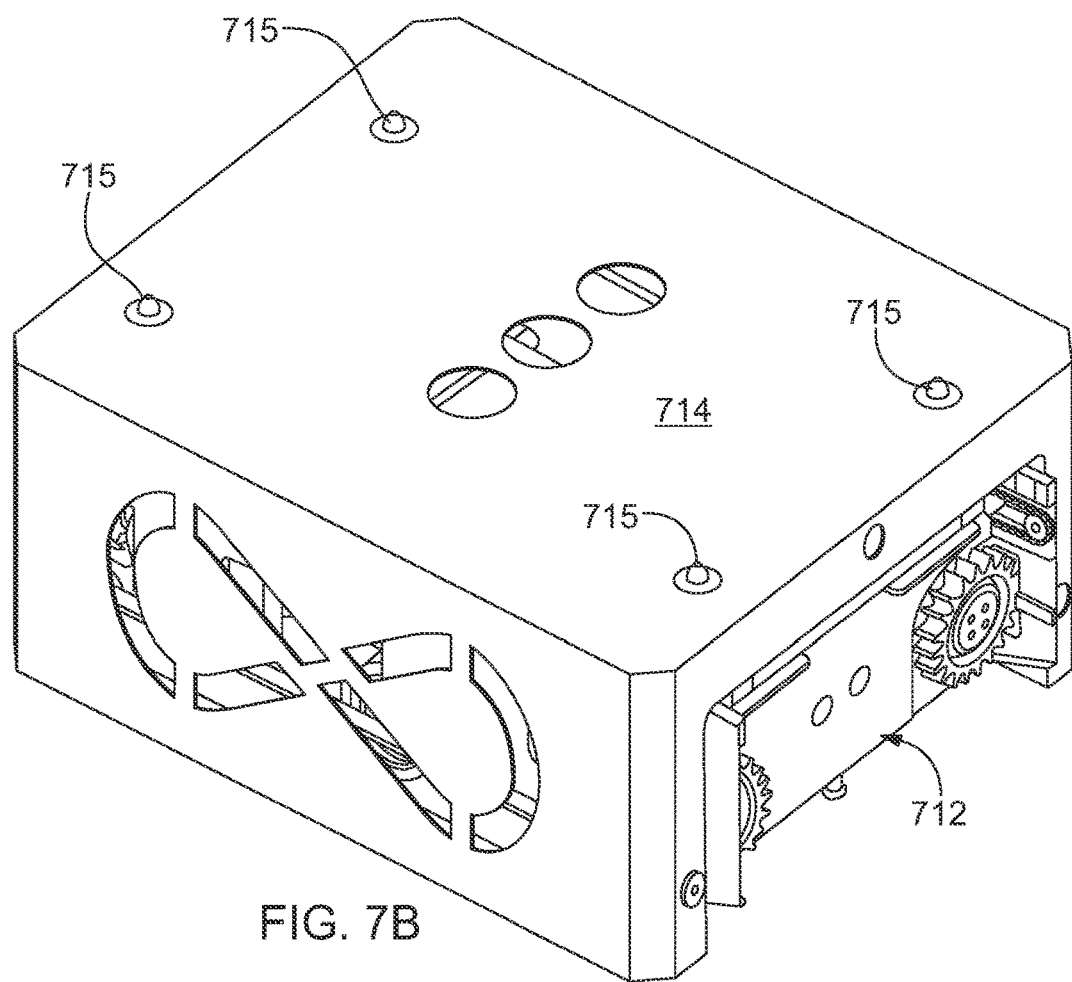
FIG. 7B is a perspective view depicting post-docking alignment between the semi-autonomous vehicle and the first functional accessory module of FIG. 7A.
Figure 7C:
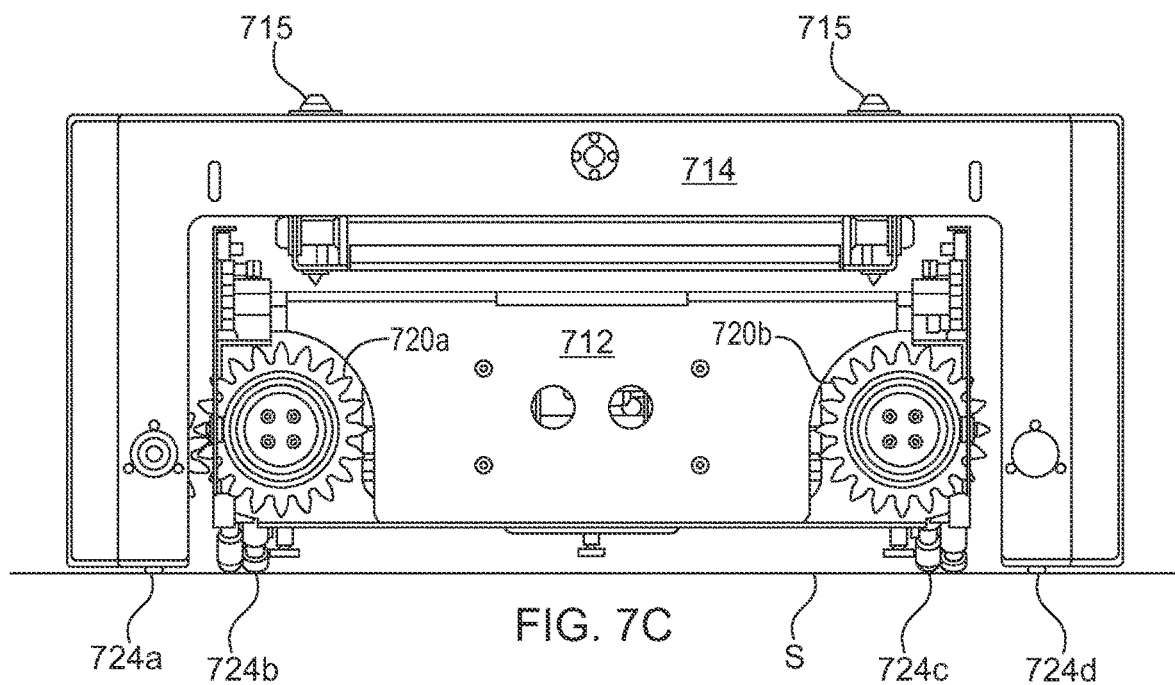
FIG. 7C is a rear elevation view of the docked automated guided vehicle and first functional accessory module of FIG. 7B, where respective surfaces of each of the vehicle and the first functional accessory module are in contact, at multiple points, with an underlying support surface.
Figure 7D:
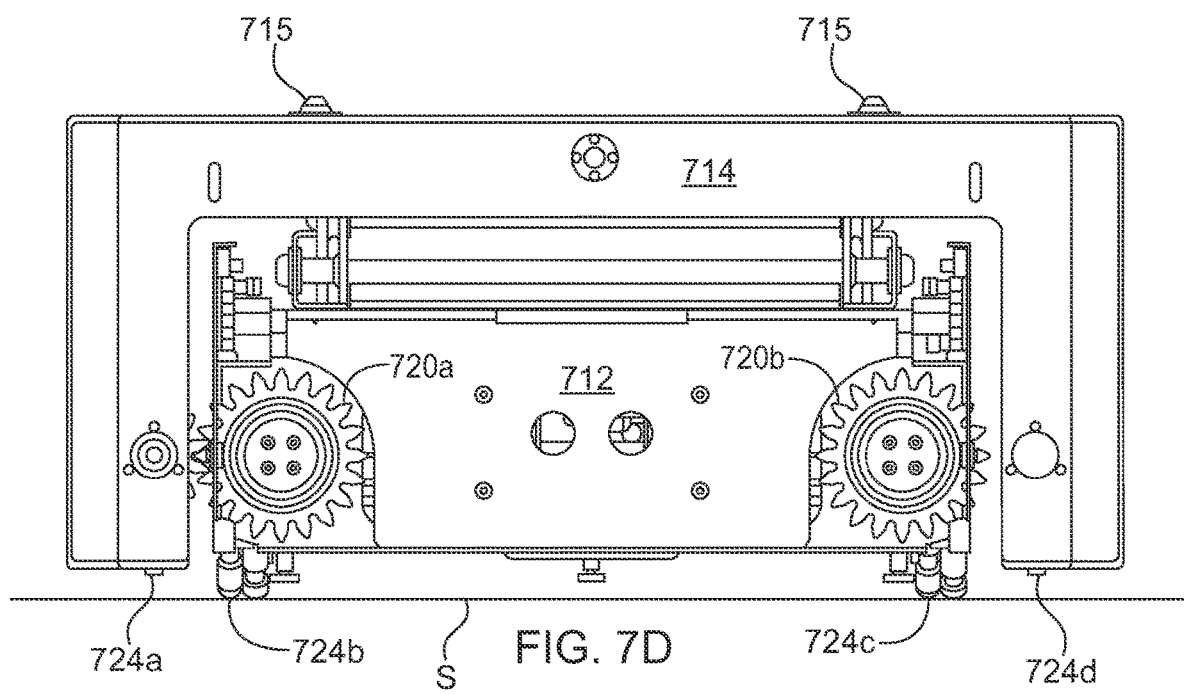
FIG. 7D is a rear elevation view of the docked automated guided vehicle and first functional accessory module of FIG. 7B, after a first drive system of the vehicle has been actuated to lift the first functional accessory module, such that none of the surfaces of the first functional accessory module are in contact with the underlying support surface.

FIG. 7B is a perspective view depicting post-docking alignment between the semi-autonomous vehicle 712 and the functional accessory module 714 of FIG. 7A. FIG. 7C is a rear elevation view of the docked automated guided vehicle 712 and first functional accessory module 714 of FIG. 7B, where respective surfaces of each of the vehicle and the first functional accessory module are in contact, at points 724a, 724b, 724c and 724d, with an underlying support surface S. FIG. 7D is a rear elevation view of the docked automated guided vehicle 712 and first functional accessory module 714 of FIG. 7B, after a first drive system of the vehicle comprising geared wheels 720a and 720b has been actuated to lift the first functional accessory module, such that none of the surfaces of the first functional accessory module 714, including surfaces 724a and 724d, are in contact with the underlying support surface.

Figure 8A:
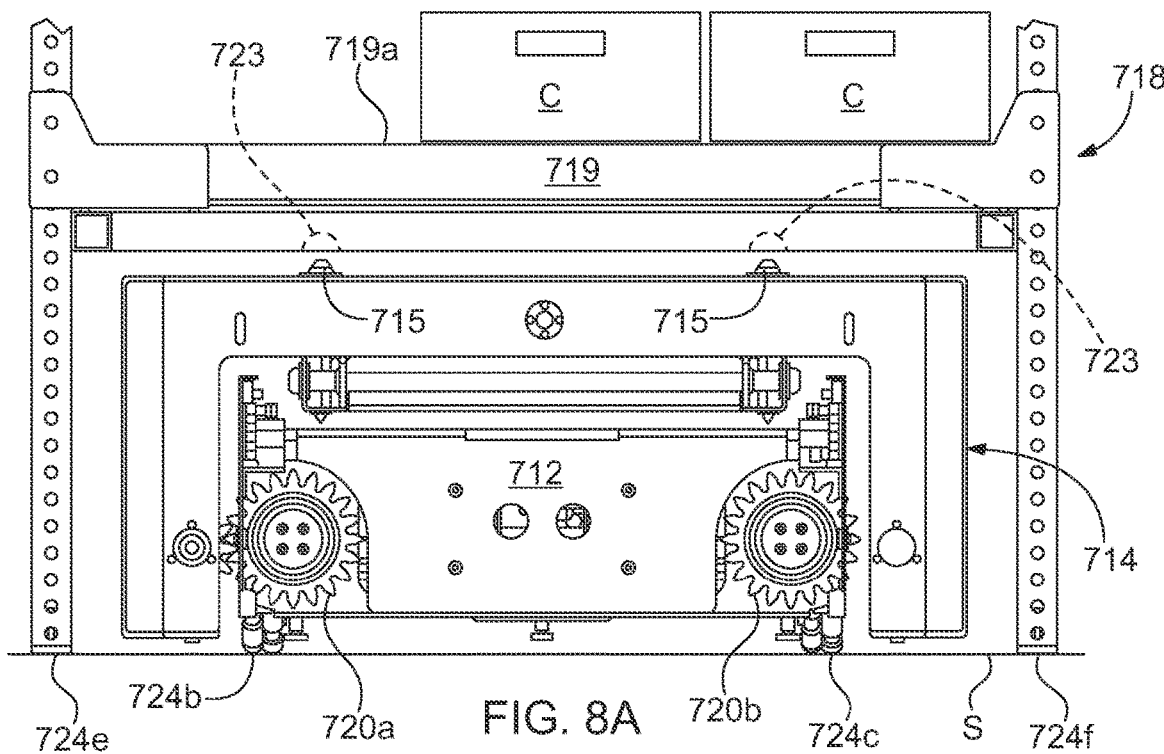
FIG. 8A is a partial elevation view depicting pre-docking alignment of the docked semi-automatic guided vehicle and first functional accessory module of FIG. 7D with a second functional accessory module, the second functional accessory module being realized as a multi-level storage rack having surfaces dimensioned and arranged to support the rack upon the underlying support surface in accordance with one or more embodiments.
Figure 8B:
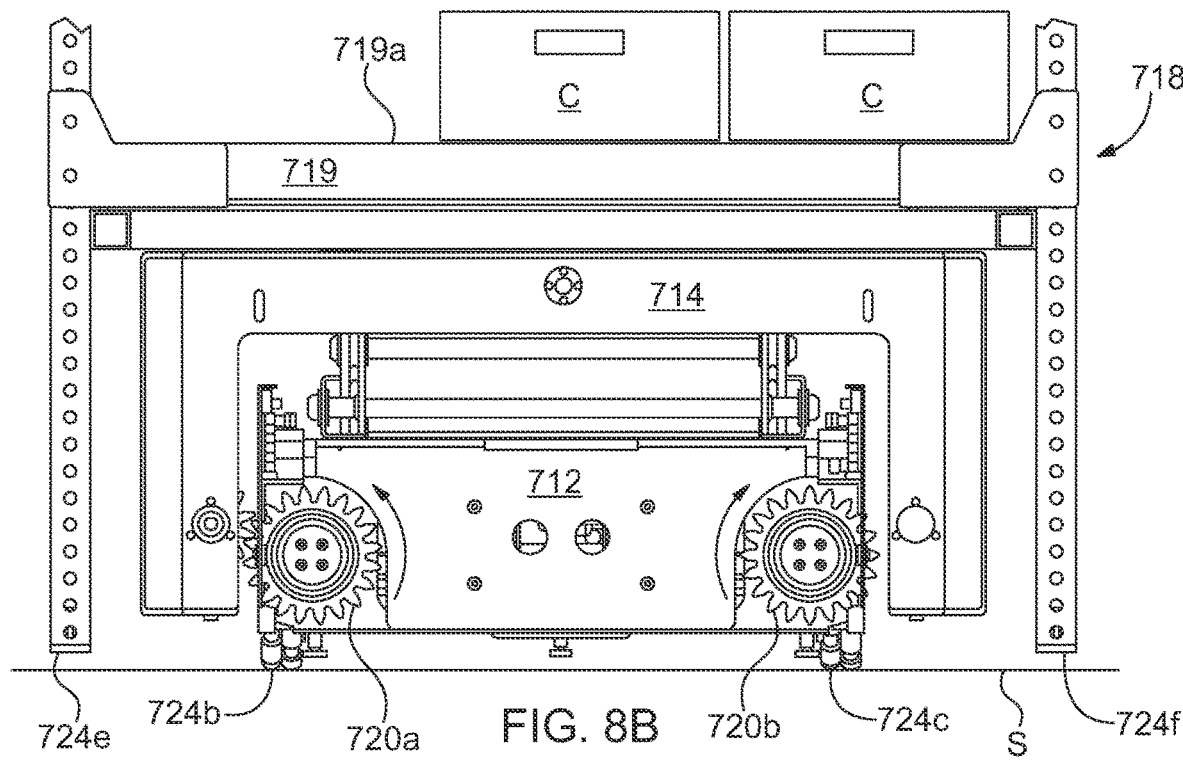
FIG. 8B is a partial elevation view depicting post-docking alignment of the docked automated guided vehicle and first functional accessory module of FIGS. 7D and 8A with the second functional accessory module, after a first drive system of the vehicle has been actuated to further lift the first functional accessory module and also lift the second functional accessory module, such that none of the surfaces of the first or second functional accessory modules are in contact with the underlying support surface.
Figure 8C:
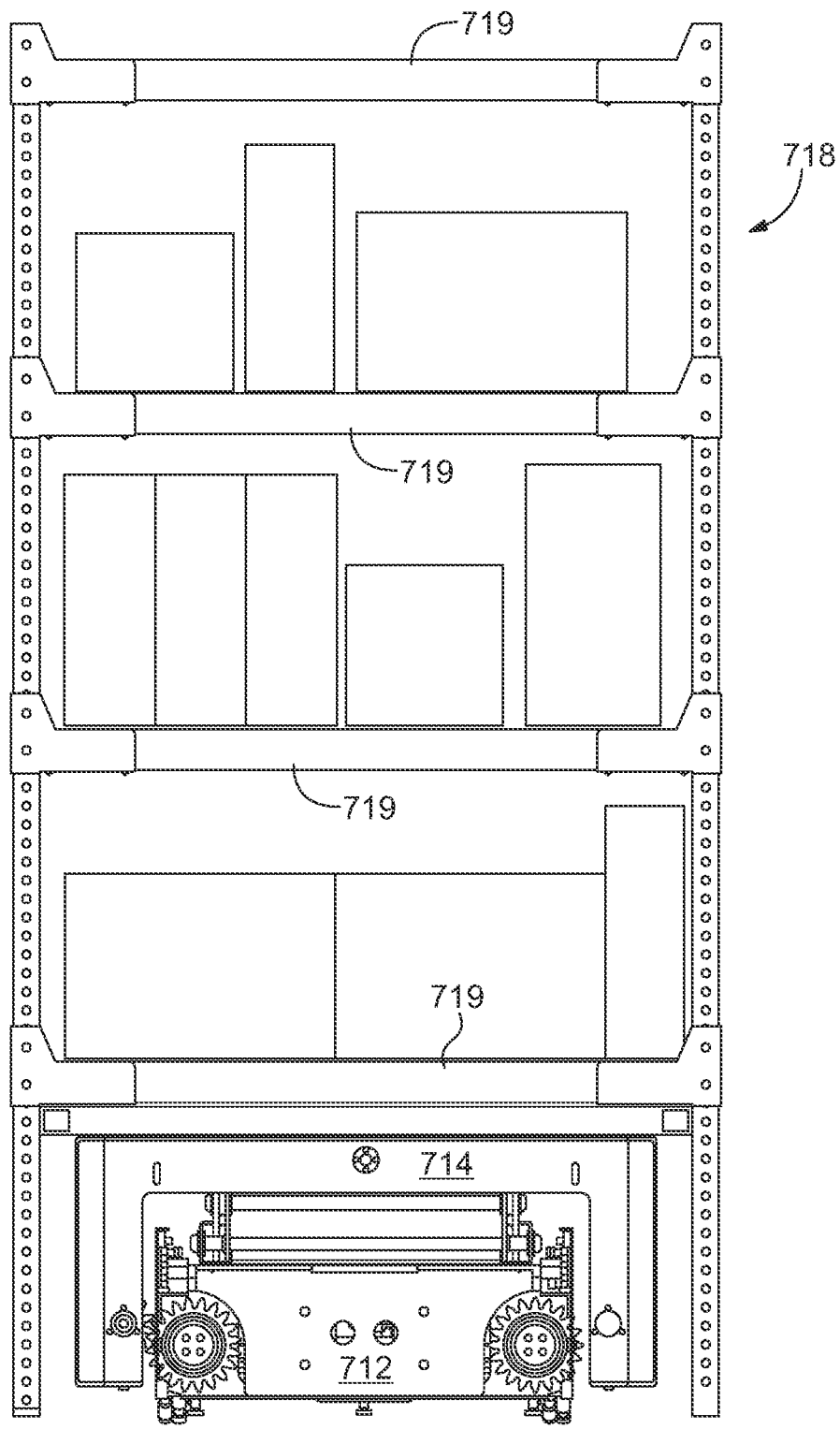
FIG. 8C is a full elevation view depicting relative positions of the docked automated guided vehicle, first functional accessory module, and second functional accessory module following lifting of the second functional accessory module in the manner shown in FIG. 8B.

With reference now to FIGS. 8A to 8C, it will be seen that FIG. 8A is a partial elevation view depicting pre-docking alignment of the docked guided automated vehicle 712 and first or auxiliary functional accessory module (FAM) 714 of FIG. 7D with a second functional accessory module (FAM) 718, the second FAM being realized in this exemplary embodiment as a multi-level storage rack having storage shelves 719. The shelves 719 of FAM 718 define corresponding storage surfaces 719a which accommodate items such as containers C of inventory articles, as shown in FIGS. 8A and 8B, and/or individually boxed inventory items placed directly on surfaces 719a, as shown in FIG. 8C. FAM 718 also defines floor contact surfaces 724e and 724f, which are dimensioned and arranged to support the rack upon the underlying support surface in accordance with one or more embodiments.

FIG. 8B is a partial elevation view depicting post-docking alignment of the docked vehicle 712 and first or auxiliary FAM 714 of FIGS. 7D and 8A with the second FAM 718, after a first drive system of the vehicle comprising gear wheels 720a and 720b has been actuated to further lift the first FAM 714 and also to lift the second FAM 718, such that none of the surfaces of the first or second FAMs are in contact with the underlying support surface S. FIG. 8C is a full elevation view depicting relative positions of the docked guided automated vehicle, first FAM 714, and second FAM 718 following lifting of second FAM 718 and transferring to another location in the manner shown in FIG. 8B.

FAMs as FAM 718 may be required to support and store a collection of heavy items, as shown in FIG. 8C, with the total weight of the FAM 718 and items stored thereon approaching 400 kg or even more. The inventors herein have determined that an extra contact force supplied to the non-omnidirectional drive elements can improve the maneuverability of a vehicle transporting a heavily loaded FAM. Returning briefly to FIGS. 4D to 4G, it will be recalled that vehicles consistent with the present disclosure, as vehicle 200 or vehicle 712, optionally include force imparting members 402. The force imparting members 402 are selectively movable from a first or initial position (FIG. 4D), at which no force is applied by a respective force imparting member 402 to a corresponding drive element of vehicle 200 or 712. From their initial positions, the force imparting members 402 are actuated into a second position (FIG. 4E). In embodiments, the force imparting members 402 are rollers which are freely rotatable within carriers 406 about a respective axis of rotation. When moved into their respective second positions, as shown in FIGS. 4E and 4G, each roller 402 imparts a normal force against the surface of the drive element over which it is positioned. The application of this normal force, in turn, increases the frictional contact between the drive elements and the underlying support surface.

As best seen in FIG. 4E, enough of a force $F_N$ may be imparted as to lift one or more of the omnidirectional wheels so as to create a gap $g_w$ between each wheel and the underlying support surface S. In practice, the gap $g_w$ will fluctuate and be different for each of the omnidirectional wheels at any given instant while the vehicle 200 is transporting a FAM 718. That is, the appearance in FIG. 4E of an equal gap $g_w$ between forward and rear omnidirectional wheels, as to suggest a perfectly balanced load, is merely a transitory condition.

It suffices to say that vehicle 712 need not include force imparting members 402 or similar structure to enhance frictional contact with the underlying support surface, particularly where FAMs carrying many or heavy items, as FAMs 718, will not be utilized in the performance of inventory management tasks. By way of illustrative example, an arrangement such as that depicted in FIG. 1C may omit the FAMs 718 entirely. In the present instance, however, vehicle 712 includes the force imparting members 402 and a first onboard motor is used to independently rotate one of the central drive elements, as drive element 752b, while a second onboard motor is used to independently rotate the other of the central drive elements. Turning in either direction, in such an embodiment, is achieved by rotating the central drive elements in opposite directions or, for a larger turn radius, both in the same direction but one faster than the other. In addition, the omnidirectional wheels on one side, as wheels 754b and 756b may be driven by the same onboard motor(s) being used to drive the central drive element on that side. By way of further example, a single, third onboard motor may be used to drive all of the omnidirectional wheels, as described previously in connection with vehicle 200. In any of the foregoing example, and others, the transfer mechanism may be driven by yet another onboard motor, obviating the need for a clutch mechanism.

Figure 9:
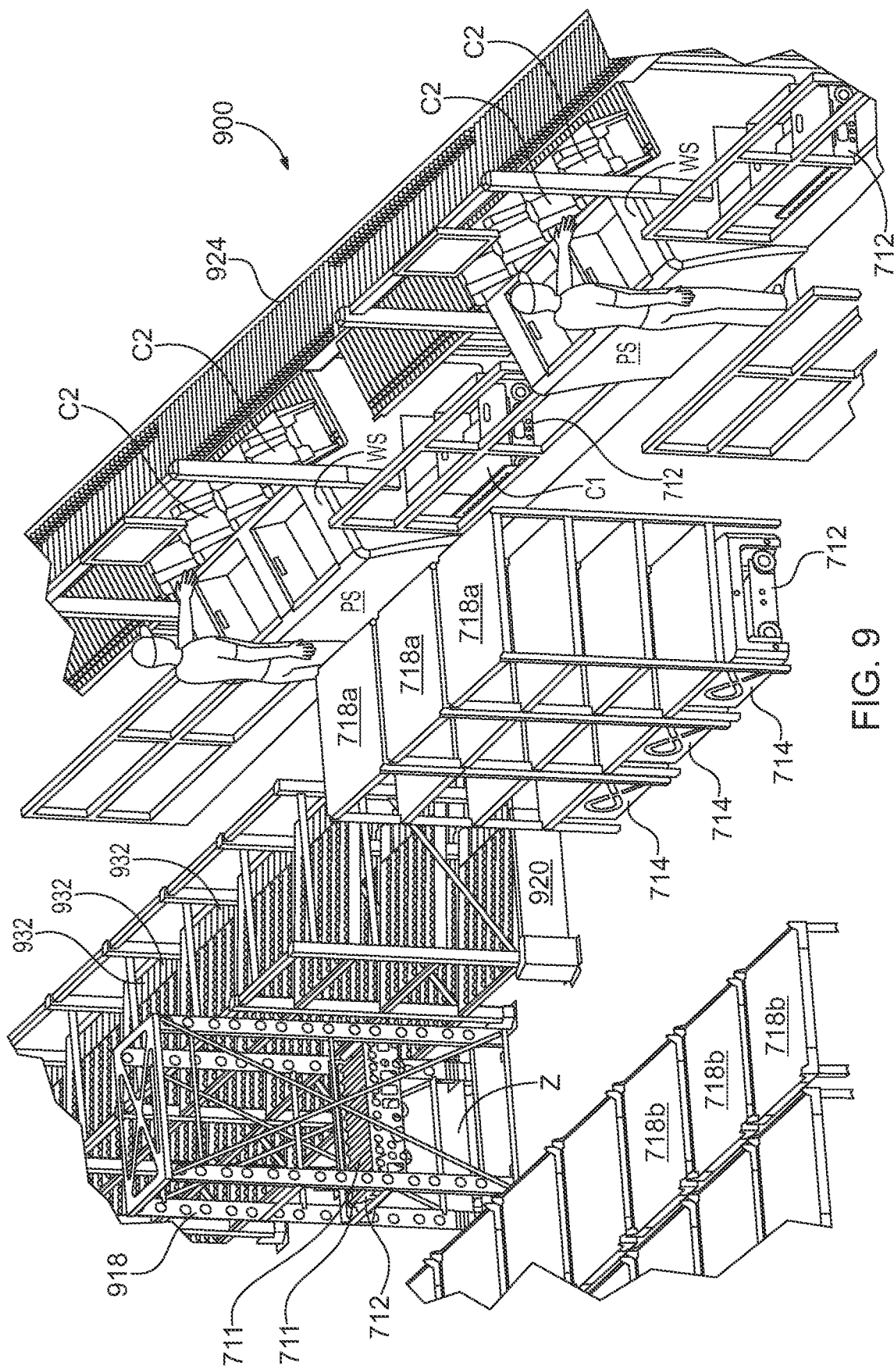
FIG. 9 is a partial perspective view depicting elements of an inventory management system that includes respective groups of the first and second accessory modules with which automated guided vehicles are adapted to cooperate to perform corresponding subsets of inventory management tasks, and also a group of third functional accessory modules with which the automated guided vehicles are adapted to cooperate to perform yet another subset of inventory management tasks, according to one or more embodiments.

FIG. 9 is a partial perspective view depicting elements of an inventory management system 900 that includes respective groups of first FAM modules 714 and second FAM modules 718 with which automated guided vehicles 712 are adapted to cooperate to perform corresponding subsets of inventory management tasks, and also a group of third FAMs 918 with which vehicles 712 are adapted to cooperate to perform yet another subset of inventory management tasks, according to one or more embodiments. Specifically, and in a manner to be described shortly by reference to FIGS. 10A and 10B, the vehicles 712 are further dimensioned and arranged to enter, lift, transport, and move vertically within a task completion zone Z circumscribed by adjacent pairs of columns 929a and 929b of FAMs 918.

Within the task completion zone Z, vehicle 712 is configurable, by operation of the drive systems thereof, to cooperate with the guide system of FAM 918 and thereby elevate for transfer, individual inventory items or, in the alternative, containers, cases, cartons, and/or pallets of supporting multiple items of inventory. By operation of the transfer mechanism, as for example, individually drive rollers as rollers 711 of vehicle 712, such item(s) are transferred to a storage area of a multi-level flow rack structure 920 positioned adjacent to a destination area which includes pick stations PS. In the present instance, and as seen in FIG. 10B, the guide system comprises track segments 926 which are secured or affixed to, or otherwise formed on the inwardly facing surfaces of the columns 929a and 929b.

At a location proximate a pick station PS, one or more flow rack structures as rack structure 920 can supply the pick station operator(s) with those items of inventory which are required, or expected to be required based on a demand forecast, to fulfill inventory management requests in an upcoming inventory management interval (e.g., to satisfy e-commerce or mail orders during one or more upcoming picking cycles). Such rack structures may be served by dynamically movable (and detachable) FAMs 918 as depicted in FIGS. 9 and 10A to 10F. In addition, or by way of alternative, the FAMs 918 may be permanently attached to the rack structure(s) 920 so that the vehicles as vehicles 712 may utilize an already present FAM to accomplish an assigned inventory management task such, for example, as transfer of an item to a delivery zone of rack structure 920.

When not otherwise required for other inventory management tasks, or during times where rack structure 920 is being replenished at a high rate, a subset of the total number of vehicles 712 deployed at a given facility may be reserved for use in one or more of the task activity zones Z of corresponding FAMs 918. Replenishment of items to the storage zone of the rack structure 920, during such times, may be achieved by actuating the transfer mechanism (e.g., rollers 711) of an arriving vehicle 718 to shift the item from the arriving vehicle to the vehicle 718 already disposed within the task activity zone of a FAM 918. Coordination of movements between the arriving and "local" transfer vehicles may be through peer-to-peer communication among the vehicles, or it may be directed by a central controller.

Vehicles and FAMs configured in a manner consistent with the present disclosure may be used with a variety of flow rack structures 920. Some flow rack structures may feed articles to the pick stations PS using unpowered rollers for single direction feeding assisted solely by the force of gravity. Alternatively, and as shown in FIG. 9, rack structure 920 may utilize a bidirectional network of parallel belts 932 or other conveying element(s) in order advance items toward or away from the pick stations PS. In such an embodiment, feeding of articles transferred by one of vehicles 718 to a pick station requires driving one or more of belts 932 in a first direction away from the vehicle and toward the pick station(s).

Conversely, removal of items from rack structure 920 requires a reversal of the aforementioned vehicle-to-rack-structure process. Such a reversal may be warranted, for example, when a different subset of articles are to be stored in rack structure 920 as preparation for a new item picking cycle. In addition or alternatively, items currently stored on the surface of belts 920 may no longer be required during the current and approaching pick cycles at the same picking volume as they were previously. In that regard, a reallocation of items—between areas reserved for fast moving inventory items as exemplified by the placement of flow rack structure 920 in FIG. 9—and those remote areas better suited for slower moving inventory items, may be advantageous in order to maintain an acceptably low average travel time per picker. For example, during non-peak times, when fewer agents are available to retrieve items for picking from remote storage areas, greater efficiency can be achieved by temporarily bringing some slower moving items into the rack structure 920 via vehicles 718. Such action provides agents with access to these items during one or more non-peak inventory management interval. In preparation for a subsequent interval where, for example, more pick and place agents are available, the slower moving items are moved back into a remote storage zone.

In one or more embodiments, vehicles 718 incorporate a discharge assistant (not shown) which is operated in coordination with the transfer mechanism of a vehicle so as to align an item being transferred from the vehicle to a target area of rack structure 920. To transfer an item from one of the vehicles 718 to a specific subset of belts 932 of flow rack structure 920, the controller of the vehicle is configured to operate the discharge assistant so as to urge the item to be transferred in a direction transverse to the direction in which the transfer mechanism of the vehicle advances that item toward that subset of belts 932, thereby establishing and maintaining the requisite alignment. As an illustrative example, the discharge assistant comprises a pusher bar (not shown) dimensioned and arranged to project from one of the two sidewalls of the vehicle 718, above the support plane defined by the uppermost surfaces of rollers 711.

As an extension of the dynamic inventory allocation utilizing vehicles and FAMs consistent with the present disclosure, and with continuing reference to FIG. 9, it will be appreciated that other inventory items may be stored on the shelves of that first subset of FAMs 718, indicated at 718*a*, which is closest to the picking station. Items which are less frequently needed than those stored in FAMs 718*a* and/or flow rack structure 920, but for which access will be needed at some point during the current or an approaching inventory management cycle, may be stored in a second subset of FAMs 718, indicated at 718*b*, which are somewhat more remote from the picking stations PS. Still other subsets of FAMs 718 (not shown), used for the storage of items not needed during a current or an approaching inventory management cycle, may be located still further away than FAM subsets 918*a* and 918*b*.

Also shown in FIG. 9 is an additional vehicle 712 carrying a container C1 directly away from a pick station operator after its contents have been removed and transferred to one of the shipping cartons C2 being moved by outfeed conveyors 922 and 924, respectively. In some embodiments, cartons C1 are lifted by vehicle 712 after maneuvering into positions underneath the work surfaces WS which are in front of the operators. To that end, aligned, inwardly facing track segments (not shown) are provided for the vehicles to enter and move upwardly, by rotation of the gear wheels in a first direction which brings the cartons C1 into the positions shown in front of the operators. Once the desired quantity of item(s) has been removed from a carton C1, the gear wheels of a vehicle are operated in the reverse direction, lowering the vehicle so that it can be deployed for the next scheduled inventory management task that has been assigned to it.

It suffices to say that using vehicles and FAMs configured in accordance with embodiments of the present disclosure enables a diverse plurality of inventory storage modalities, and the inventory therein, to be dynamically employed and repositioned over the course of each inventory management window. This is true whether the window extends across an entire inventory management cycle (which may be from six hours to entire 24 hour day inclusive of picking and replenishment operations) or whether the window is subdivided into multiple intervals so as to better match fluctuations in both demand for specific inventory items and availability of manpower resources to process them. As well, those same vehicles may retrieve and return items to statically positioned storage areas, further enhancing the efficiency of a warehouse facility over the course of an inventory management cycle.

Figure 10A:
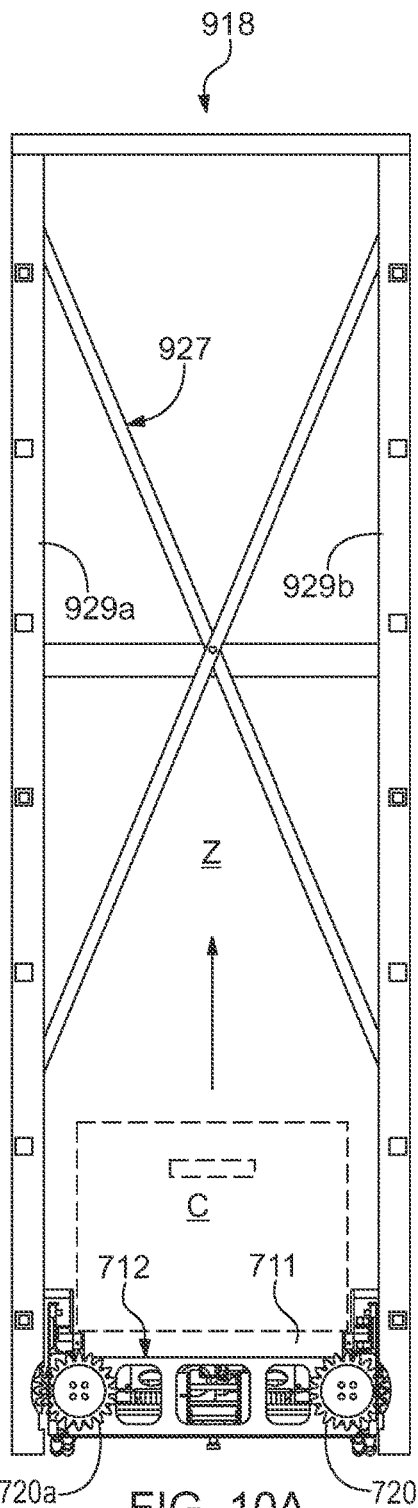
FIGS. 10A and 10B are elevation view depicting docked alignment between an automated guided vehicle and one of the functional accessory modules from the third group, but prior to activation of the first drive system of the automated guided vehicle according to some embodiments.
Figure 10B:
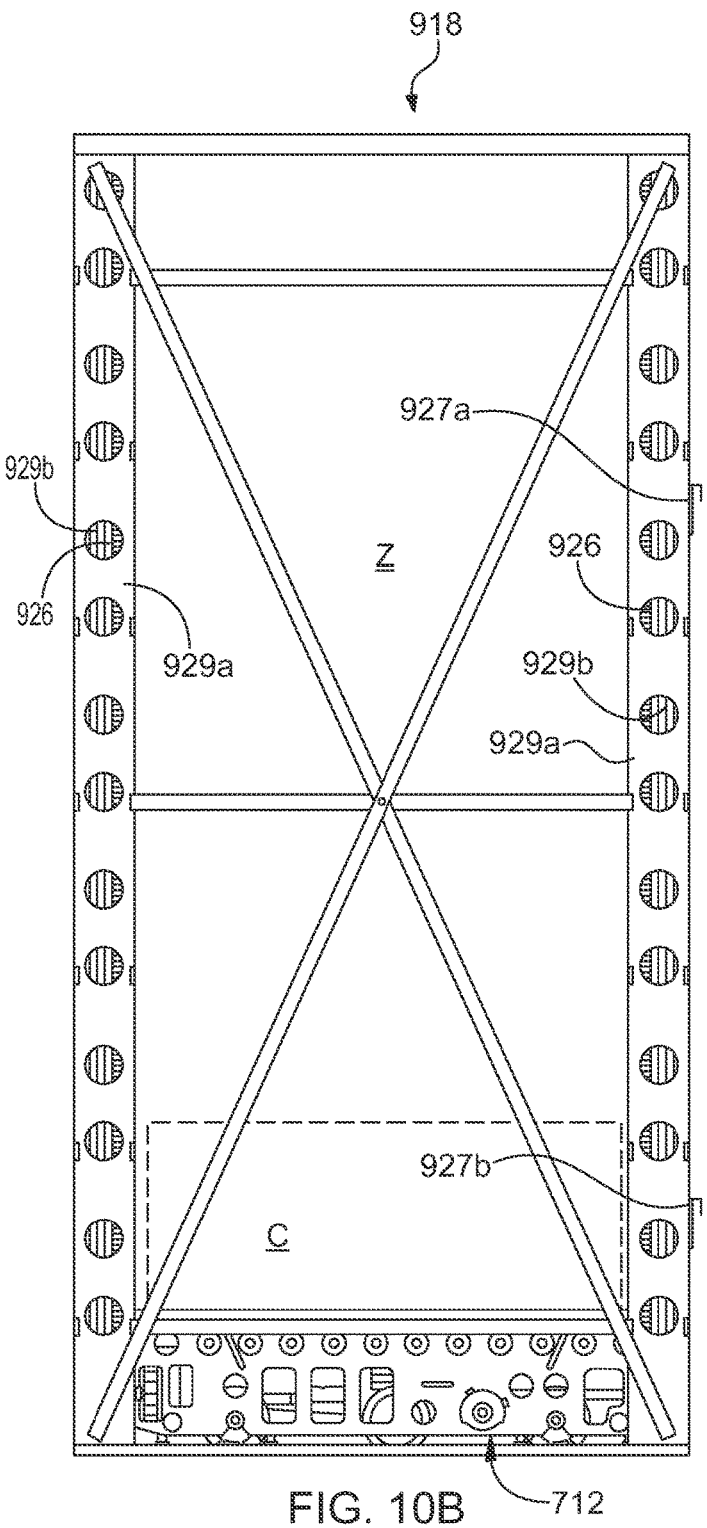

FIGS. 10A and 10B are elevation views depicting docked alignment between an automated guided vehicle 712 and one of the FAMs 918, but prior to activation of the first drive system which in the illustrative embodiment of FIGS. 10A and 10B comprises gear wheels 720*a* and 720*b* according to some embodiments. To maintain the FAM 918 in a position of registration with a flow rack structure as, for example, depicted FIG. 9, and as best seen in FIG. 10B, one or more embodiments of FAM 918 include(s) upper and lower docking clips, indicated generally at 927*a* and 927*b*, respectively. When FAM 918 has been aligned with a rack structure, it is lowered into position by vehicle 712, which brings the docking clips into engagement with corresponding clips secured to or otherwise formed on the flow rack structure.

Figure 10C:
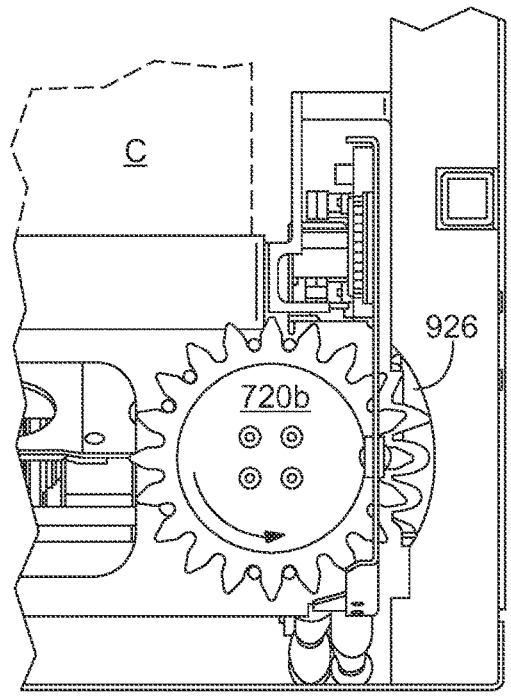
FIG. 10C is an enlarged, partial elevation view taken from the perspective of FIG. 10A and depicting facing alignment of a rotary element of the first drive system with a corresponding portion of the guide system of a functional accessory module from the third group of accessory modules, according to one or more embodiments.

FIG. 10C is an enlarged, partial elevation view taken from the perspective of FIG. 10A and depicting facing alignment of a rotary element as gear wheel 720*b* of the first drive system with a corresponding portion of the guide system of FAM 918. In the instant case, the guide system of functional accessory module 918 comprises inwardly facing tracks as tracks 926. Once vehicle 712 has entered the interior space defined between the vertical columns 929 of FAM 918, the gear wheels of the vehicle are rotated such that the drive system wheels engage with the guide system of FAM 918 which, in the present instance, comprise inwardly facing pairs of tracks 926 which engage with gear wheels 720*a* and 720*b*. Rotated one way, the FAM 918 is lifted above the underlying support surface and the FAM can be transported by the vehicle 712. Once in a position of alignment, the gear wheels of vehicle 712 are rotated in the opposite direction to lower FAM 918 such back onto the underlying support surface. In the process, the aforementioned docking clips 927*a* and 927*b* are engaged. Lifting of the FAM 918 by vehicle 712 for transport is depicted in FIG. 10C to FIG. 10E.

As will be appreciated by reference to FIGS. 10A and 10B, the procedure by which a vehicle consistent with the present disclosure, as vehicle 712, aligns with and enters a FAM as FAM 918 can be performed without regard to whether a FAM 918 is already engaged in the transport of an item to a destination area. Indeed, an advantageous feature of some embodiments consistent with the present disclosure is that each vehicle is configured to complete some or all assigned inventory management tasks without the use of an accessory module, such as the retrieval of an item C from a storage area 110 of a vertical array of such storage areas as depicted in FIG. 1C, the transfer of an item C from one storage area 110 to a different storage area 110, the delivery of an item as container C to a picking station, or any combination of these, according to a first mode of operation. In embodiments such as those depicted in FIGS. 9 and 10A-12, the same vehicle is also configured to complete other tasks by acquiring and utilizing a single or multiple FAMs in order to complete one or more additional inventory management tasks, according to a second mode of operation. FIGS. 10C to 10E, for example, illustrate a vehicle 712 configured according to a second mode of operation to enter FAM 918, to lift that FAM while carrying a container, to horizontally displace the FAM 918 to a different location, and to lower that FAM at the different location. As shown in FIG. 10F, vehicle 712 is further configured to climb within the FAM 918 in furtherance of an inventory management task.

Figure 10D:
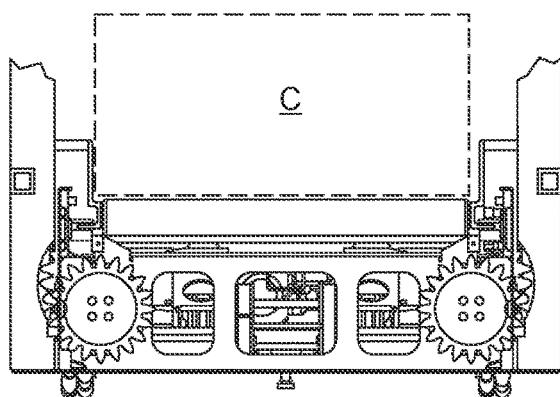
FIG. 10D is an enlarged partial elevation view taken from the same perspective as FIGS. 10A and 10C, but after actuation, in a first direction, of respective rotary elements of the first drive system of the vehicle with corresponding facing portions of the guide system of the functional accessory module for lifting thereof, according to one or more embodiments.
Figure 10E:
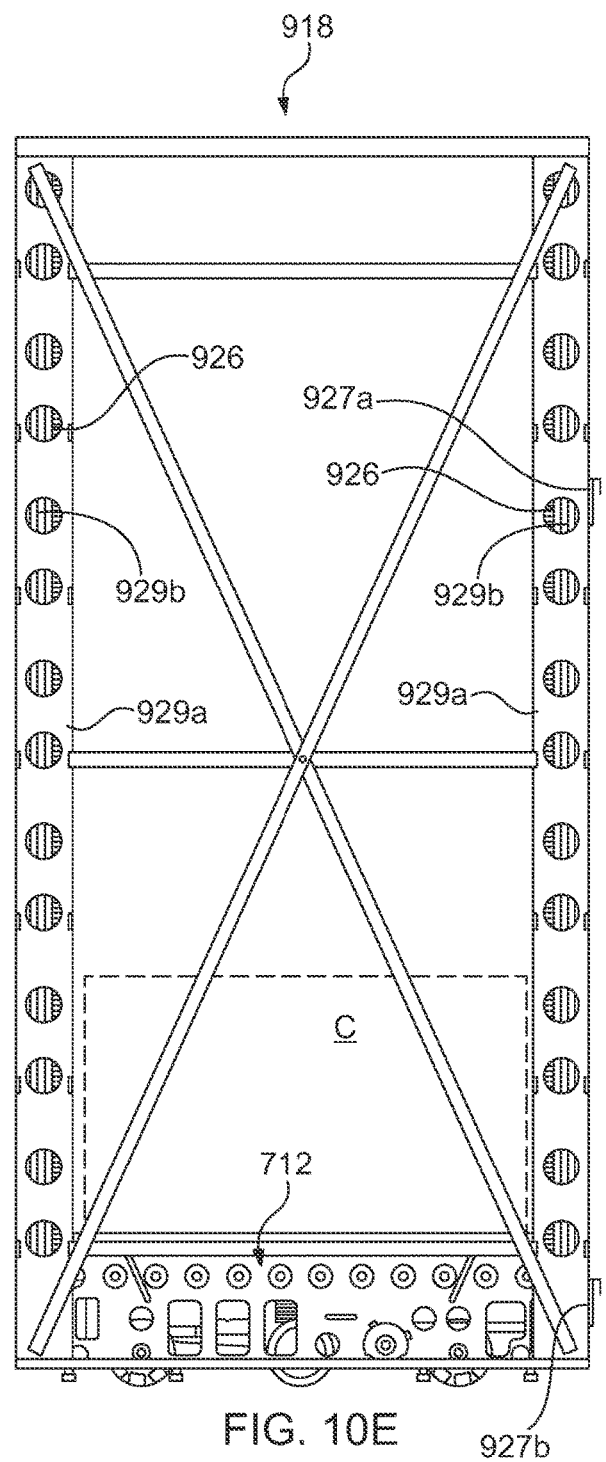
FIG. 10E is an elevation view taken from the same perspective as FIG. 10B, but after actuation, in the first direction, of the rotary elements of the first drive system with corresponding facing portions of the guide system of the functional accessory module for lifting thereof, according to one or more embodiments.
Figure 10F:
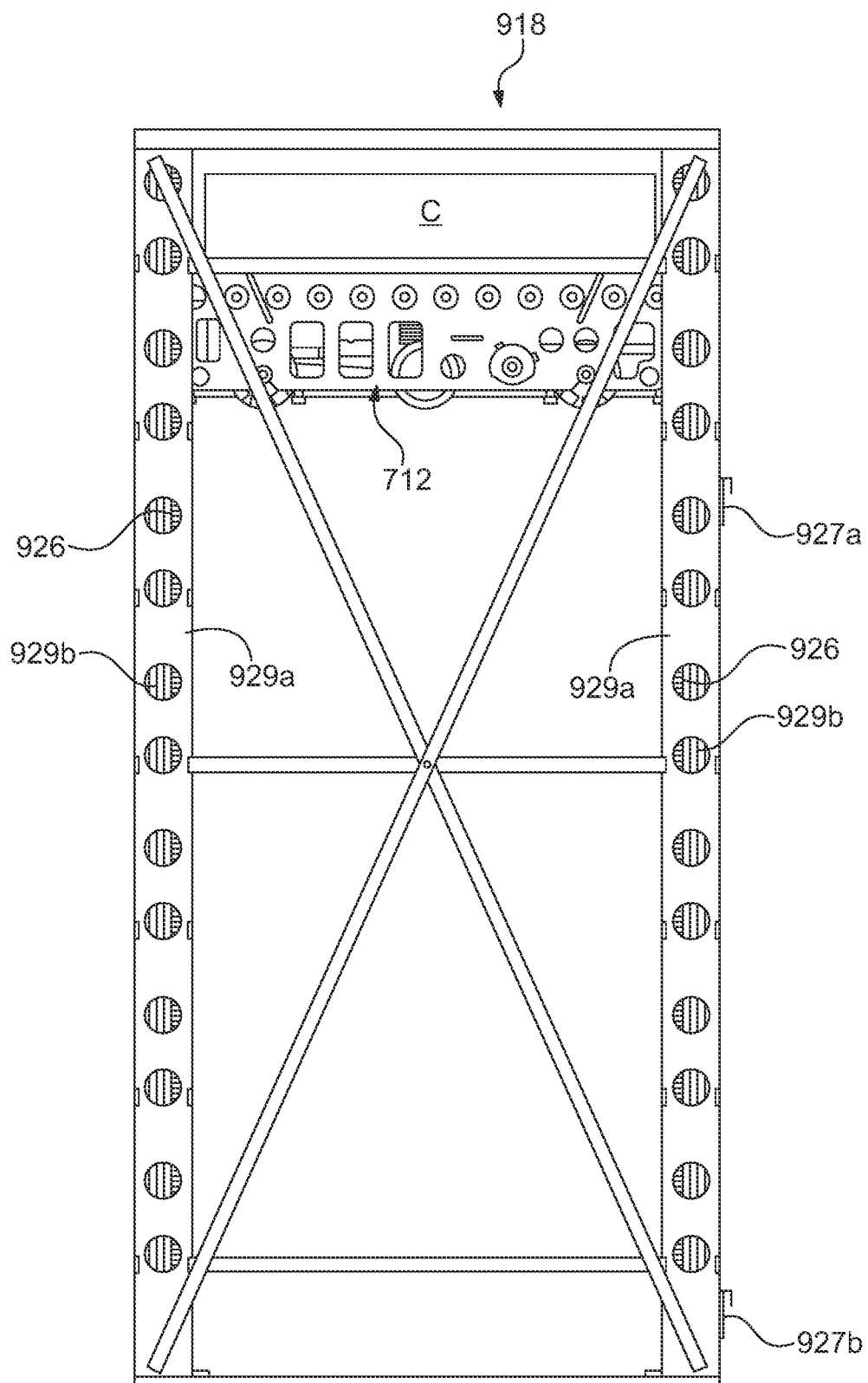
FIG. 10F is an elevation view taken from the same perspective as FIGS. 10B and 10E, but after actuation, in a second direction, of respective rotary elements of the first drive system of the vehicle with corresponding facing portions of the guide system of the functional accessory module for setting the functional accessory module upon an underlying support surface and, as shown, thereafter elevating the vehicle within the functional accessory module, according to one or more embodiments.

FIG. 10D is an enlarged partial elevation view taken from the same perspective as FIGS. 10A and 10C, but after actuation, in a first direction, of respective rotary drive elements, as gear wheels 720a and 720b of the first drive system of the vehicle 712 with corresponding facing track portions 926 of the guide system of the functional accessory module 918, which serves to lift FAM module 918 above the surface in the manner shown in FIG. 10D, according to one or more embodiments. FIG. 10E is an elevation view taken from the same perspective as FIG. 10B, but after actuation, in the first direction, of the rotary elements of the first drive system with corresponding facing portions of the guide system of the functional accessory module for lifting thereof, according to one or more embodiments. FIG. 10F is an elevation view taken from the same perspective as FIGS. 10B and 10E, but after actuation, in a second direction, of respective rotary elements of the first drive system of the vehicle with corresponding facing portions 926 of the guide system of the functional accessory module for setting the functional accessory module upon an underlying support surface and, as shown, thereafter elevating the vehicle 712 within the functional accessory module 918, according to one or more embodiments.

Figure 11A:
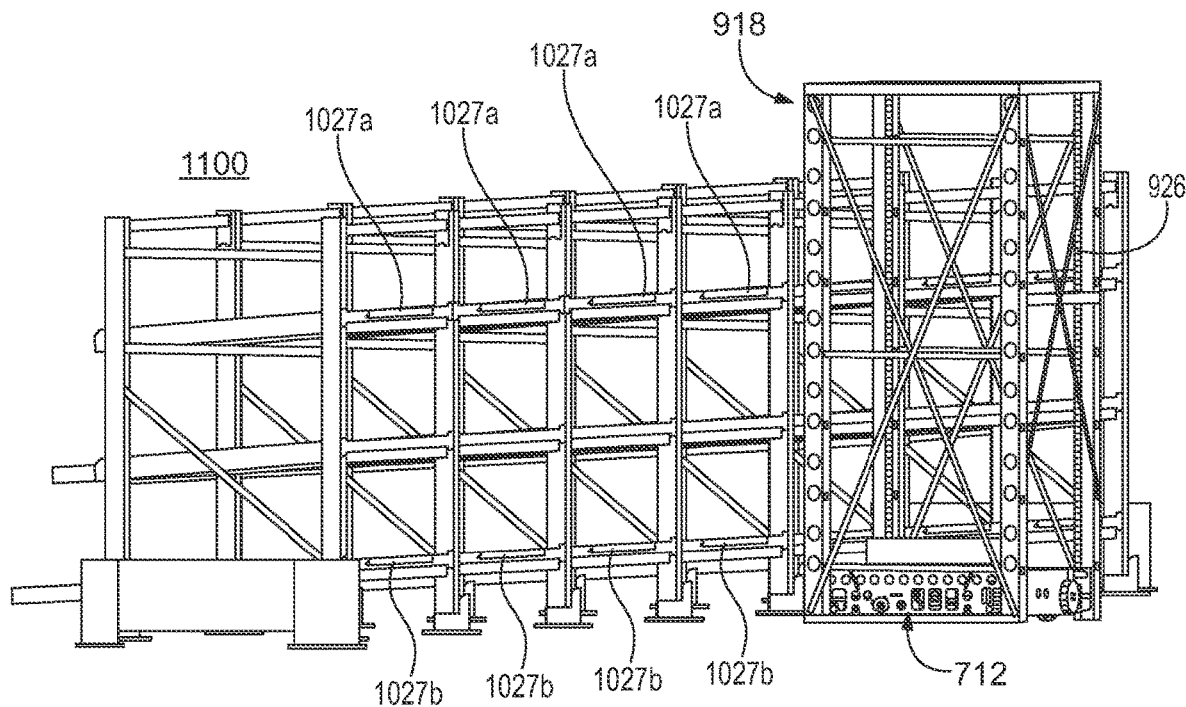
FIG. 11A is a rear perspective view depicting deployment of a functional accessory module, such as the exemplary module depicted in FIGS. 10A to 10F, to a flow rack structure dimensioned and arranged to supply items such as fast moving commercial goods in a goods-to-picker inventory management system, according to an illustrative embodiment.
Figure 11B:
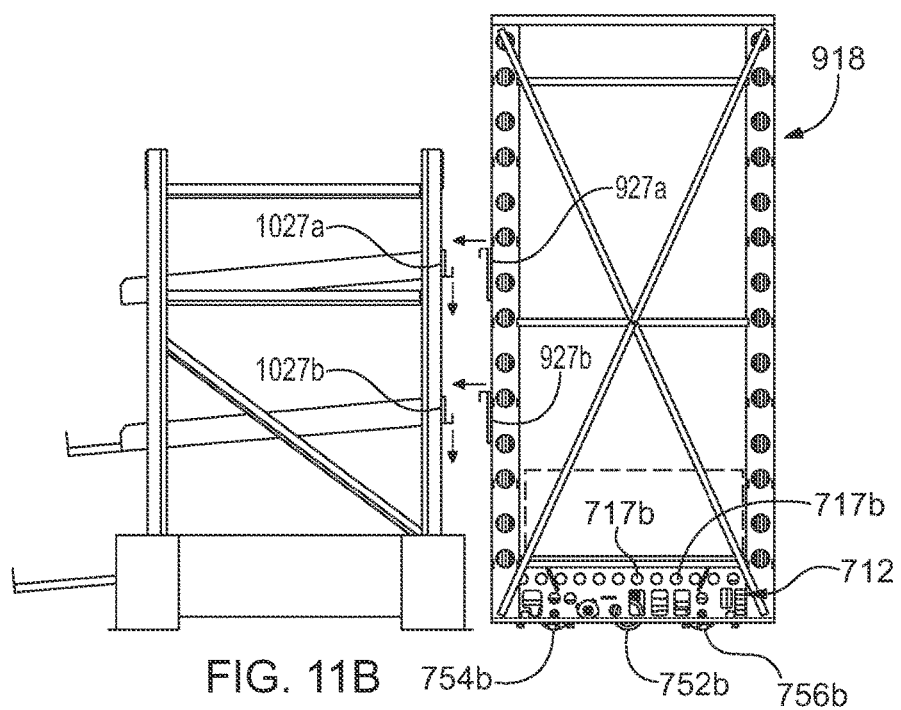
FIG. 11B is a side elevation of the illustrative embodiment of FIG. 11B, just prior to docking of the functional accessory module with the flow rack structure in accordance with one or more embodiments.

FIG. 11A is a rear perspective view depicting deployment of a functional accessory module, such as the exemplary FAM 918 depicted in FIGS. 10A to 10F, with a flow rack structure 1120 dimensioned and arranged to supply items such as fast moving commercial goods (not shown) in an inventory management system 1100, according to an illustrative embodiment. It will be recalled, with reference to FIGS. 10A to 10F, that dynamically deployable FAMs as FAM 918 may include one or more docking or retention clips, as upper and lower docking clips indicated generally at 927a and 927b, respectively. FIG. 11B is a side elevation of the illustrative embodiment of FIG. 11B, just prior to docking of the functional accessory module 918 with the flow rack structure 1120 in accordance with one or more embodiments. In this instance, flow rack structure 1120 includes a corresponding pair of upper and lower docking clips, indicated generally at 1027a and 1027b, with these being dimensioned and arranged to receive and retain a portion of clips 927a and 927b.

To bring the respective pairs of upper and lower docking clips into interlocking alignment, the first and/or second drive system(s) of vehicle 712 is/are operated to move FAM 918 in the direction of the horizontal arrow. When the two structures are as close to one another as depicted in FIG. 11A, gear wheels of vehicle 712 are driven in the direction opposite to the direction required to lift the FAM 918, during which the FAM 918 moves in the direction of the vertical arrow. This rotation is continued until surfaces of FAM 918 are supported by the underlying support surface. The resulting interlock between complementary pairs of docking clips secures FAM 918 against flow rack structure 720 in the position shown in FIG. 11A. It should be borne in mind that other mechanisms may be employed to defeasibly interlock FAM 918 and rack structure 1120, without departing from the spirit and scope of the present disclosure.

In some embodiments, and as noted previously, structures performed the functions of FAMs 918 may be integrally formed as part of the rack structures 1120 or attached to the rack structured 1120 using fasteners, clamps, and the like such that coupling/decoupling and separation is not performed by coordinated movements of the vehicle 712. It suffices to say that any such rack structure need only define task activity zones into which the vehicles, as vehicle 712, can enter, climb, align with a storage surface, and perform an item exchange between a surface of the rack structure and the transfer platform of the vehicles.

Figure 11C:
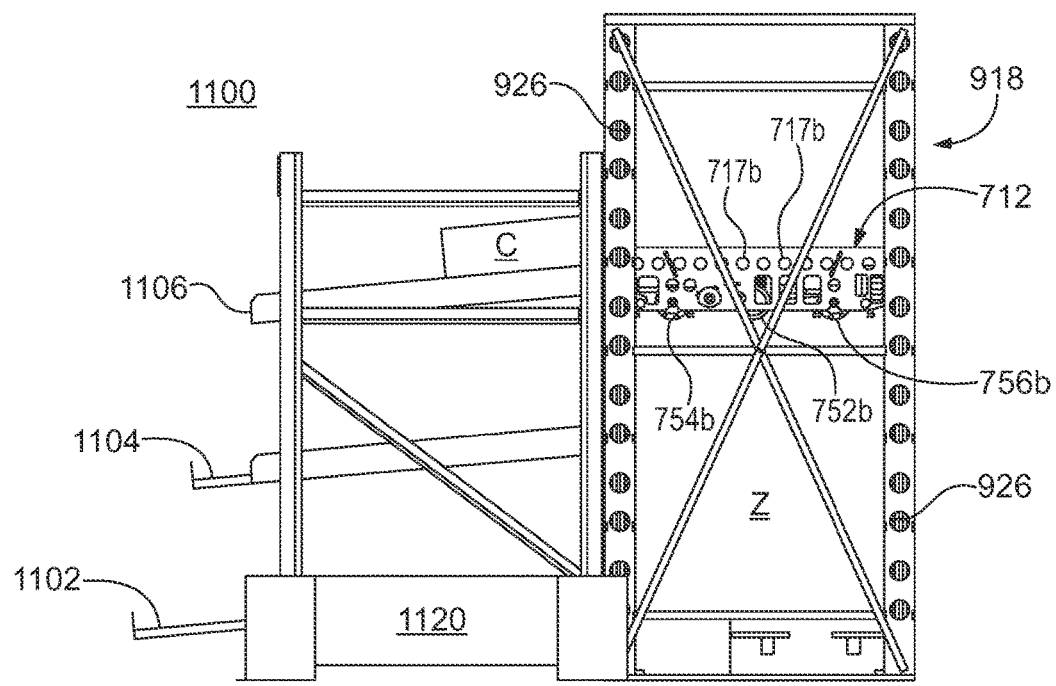
FIG. 11C is a side elevation of the illustrative embodiment of FIGS. 11A and 11B, subsequent to docking of the functional accessory module with the flow rack structure and elevation of the vehicle within the functional accessory module into a position for transferring an item from the vehicle to a target surface of the flow rack, according to one or more embodiments.

In any event, and turning now to FIG. 11C, there is shown a side elevation of the illustrative embodiment of FIGS. 11A and 11B, subsequent to docking of the FAM 918 with the flow rack structure 1120 and elevation of the vehicle 712 within the task activity zone Z. As depicted, the illustrative rack structure includes three tiers of storage locations, indicated generally 1102, 1104 or 1106, respectively. The vehicle 712 is shown as having reached a vertical elevation within task activity zone Z of FAM 918 that is aligned with the uppermost storage tier 1106, and the rollers 711 of the vehicle transfer mechanism have already been activated to advance container C onto a target surface of rack structure 1120.

In some embodiments consistent with the present disclosure, the clutch mechanism utilized in, for example, the vehicle 200 depicted in FIGS. 2A to 2I, may be omitted. In one such embodiment, a first onboard motor is used to independently rotate one of the central drive elements, as drive element 752b, while a second onboard motor is used to independently rotate the other of the central drive elements. Turning in either direction, in such an embodiment, is achieved by rotating the central drive elements in opposite directions or, for a larger turn radius, both in the same direction but one faster than the other. In addition, the omnidirectional wheels on one side, as wheels 754b and 756b may be driven by the same onboard motor(s) being used to drive the central drive element on that side. By way of further example, a single, third onboard motor may be used to drive all of the omnidirectional wheels, as described previously in connection with vehicle 200. In any of the foregoing example, and others, the transfer mechanism may be driven by yet another onboard motor, obviating the need for a clutch mechanism.

In one or more other embodiments of inventory management system 1100, vehicle 712 incorporates the clutch mechanism-equipped second drive system (FIGS. 3A to 4C) and transfer mechanism (FIGS. 2D to 2I) features of vehicle 200. In such embodiments, an onboard motor (not shown) of vehicle 712 is operated to cause vehicle 712 to climb within activity zone Z. In the present instance, gear wheels of vehicle 712 rotate against teeth of track 926. As a result, forward omnidirectional wheels, as wheel 754b, and rear omnidirectional wheels, as wheel 756b, leave their respective positions of support upon the underlying support surface. In addition, pivotable carriers (not shown) drop the second drive elements, of which only second drive element 752b is shown and, at the same time, one or more clutch mechanism(s) (not shown) are engaged. Engagement of the clutch mechanism(s), in turn, enables rotation of the sprockets 717b. Rotation of one or more additional motors drives endless carrier 714b and cause the transfer mechanism to advance the container C onto surface 1106 of the storage structure 1120.

With continuing reference to FIG. 11C, it should be noted that if the pitch angle of the storage tiers is sufficient, it may be possible for containers C to advance solely by action of gravity in for example, a passive roller or a chute configuration. In the embodiments exemplified by FIGS. 11D to 11G, however, the multi-level rack structure (s 1120 of inventory management system 1100 includes a discharge assistant at each level. In some embodiments, and as already described in connection with FIG. 9, the discharge assistant comprises a plurality of parallel belts 1128 and, optionally, sensors for determining the timing for advancing inventory items deposited by vehicles, as vehicle 712, toward the end closest the picker(s).

Figure 11D:
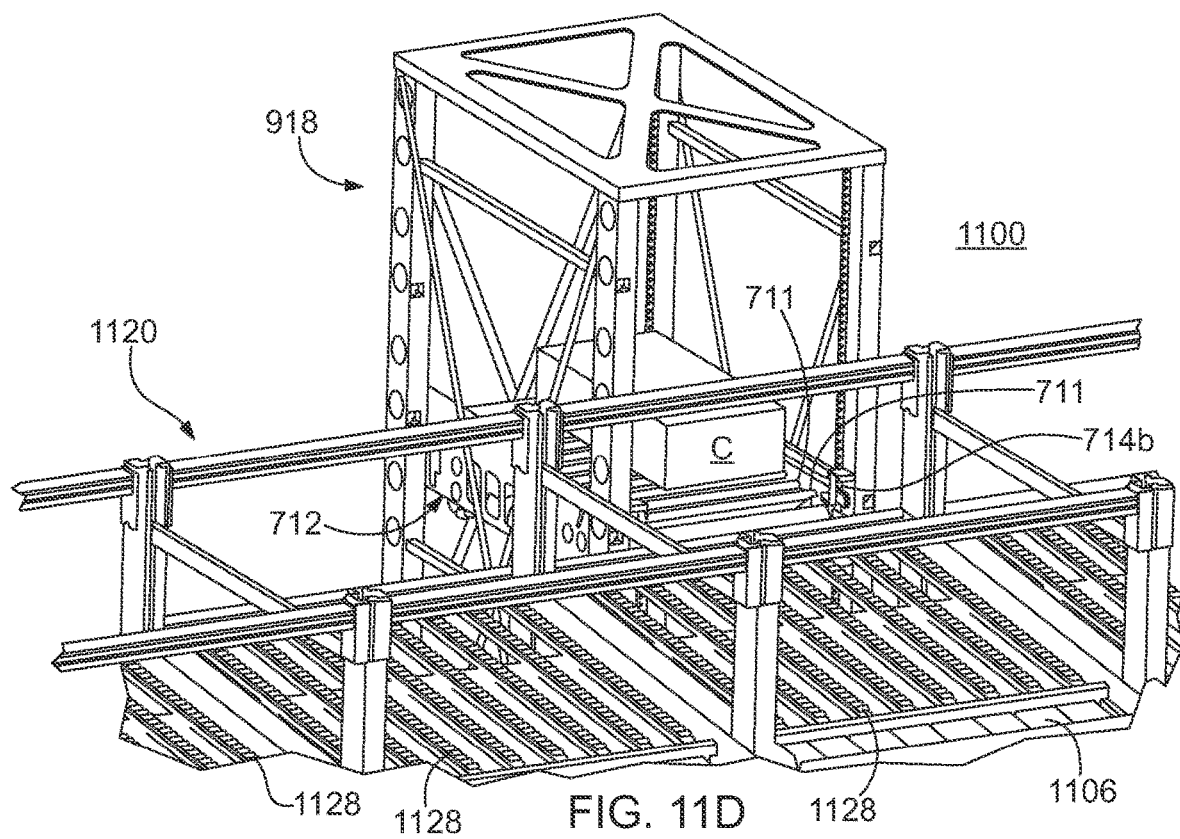
FIG. 11D is a front perspective view of the illustrative embodiment of FIGS. 11A to 11C, depicting elevation of the vehicle within the functional accessory module into the position shown in FIG. 11C, according to one or more embodiments.
Figure 11E:
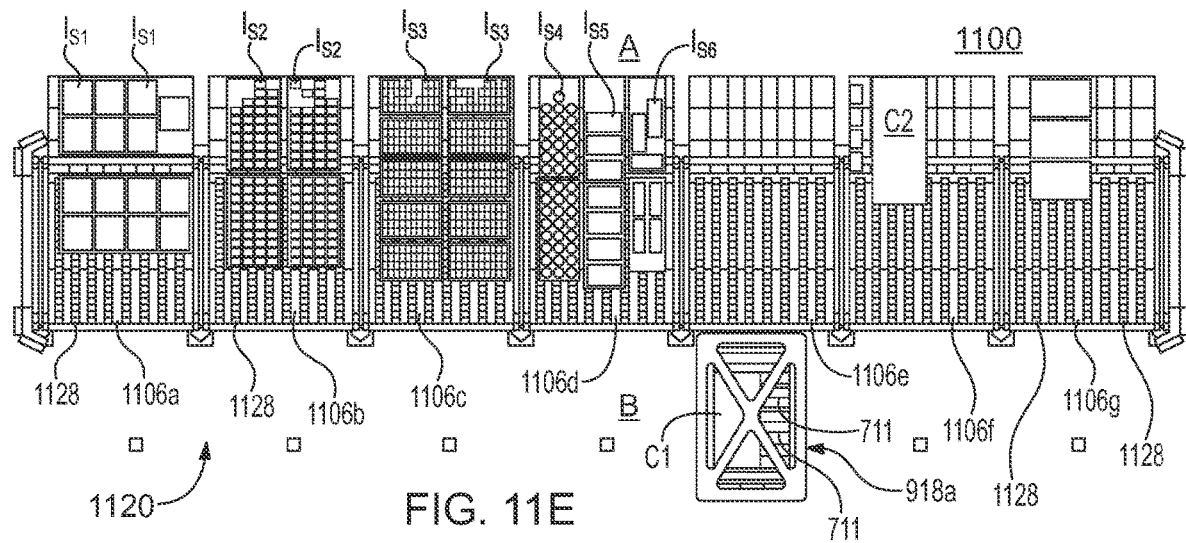
FIG. 11E is a top plan view of the illustrative embodiment of FIGS. 11A to 11D, depicting elevation of the vehicle within the functional accessory module into the position shown in FIGS. 11C and 11D, according to one or more embodiments.
Figure 11F:
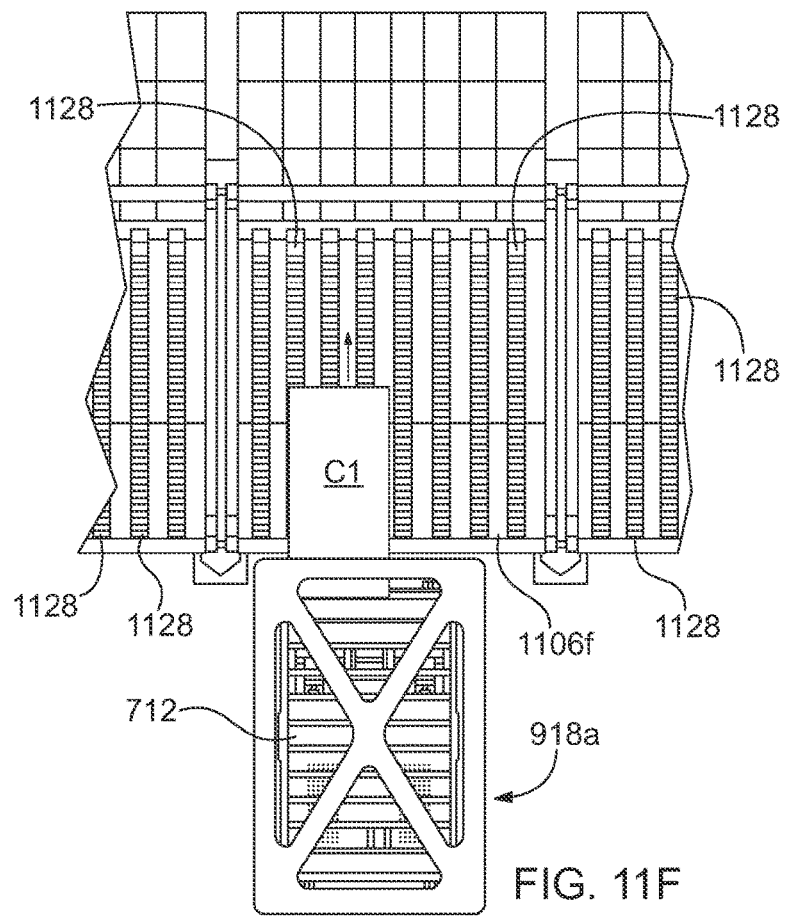
FIG. 11F is an enlarged top plan view of the illustrative embodiment of FIGS. 11A to 11E, during transfer of an container from a surface of the flow rack structure of FIG. 11E to the platform of the elevated vehicle, as part of a dynamic reallocation of inventory in accordance with one or more embodiments consistent with the present disclosure.

FIG. 11D is a front perspective view of the illustrative embodiment of FIGS. 11A to 11C, depicting elevation of the vehicle 712 within a functional accessory module 918 into the position shown in FIG. 11C, according to one or more embodiments. FIG. 11E is a top plan view of an inventory management system 1100 consistent with the embodiment of FIGS. 11A to 11D, depicting elevation of the vehicle 712 within the task activity zone of functional accessory module 918. FIG. 11F is an enlarged, partial top plan view of the illustrative embodiment of FIGS. 11A to 11E, subsequent to transfer of container C1 from the transport platform of the elevated vehicle 712 to target surface 1106f of the rack structure 1120, according to one or more embodiments.

By way of illustrative example, inventory management system 1100 is deployed in an order fulfillment facility according to an e-commerce application. Vehicle 712 supplies containers, as containers C1 and C2 which may contain a plurality of individual inventory items. In this instance, a warehouse management system (WMS) of the facility has determined that subsets of inventory items, indicated generally at $I_{S1}$, $I_{S2}$, $I_{S3}$, $I_{S4}$, $I_{S5}$, and $I_{S6}$, will be needed at sufficient volumes during the current or an approaching inventory management interval as to justify their continued placement in rack structure 1120. In embodiments, dynamic placement of inventory items utilizing vehicles and FAMs as FAM 918 reduces the time needed to retrieve items so that they can be packaged for shipment as part of an e-commerce operation. By way of illustrative example, a human operator moves between a packing station and the item transfer area A proximate rack structure 1120, which isolates them from vehicle 712 operating in item transfer area B.

With reference to FIGS. 11E and 11F, it will be seem that vehicle 712 has discontinued its ascent within the task management zone of the FAM 918a, having stopped at the transfer position associated with a plurality of third tier locations indicated generally at 1106a to 1106g which are also collectively identified at numeral 1106 in FIGS. 11C and 11D.

At least some subsets of the items, as subsets $I_{S1}$ to $I_{S5}$, as well as the contents of the container C1 and those containers in storage area 1100g continue to be needed at sufficient volumes—during a current or an approaching inventory management interval—as compared to other items processed by the facility, to flow rack structure 1120. In this instance, the WMS has determined that other items stored in rack structure 1120—such as those items stored at location 1106f in container C2 for retrieval during an earlier phase of the current inventory management interval (and/or during a preceding one)—no longer have sufficient priority as to be present in the same quantity, or at all, in rack structure 1120. In embodiments consistent with the present disclosure, the same vehicle 712 and FAM 918a, or a different vehicle-FAM pair, may be used to replace container C2 with a different container. An exemplary sequence of such a replacement operation will be described by reference to FIGS. 11G to 11I.

Figure 11G:
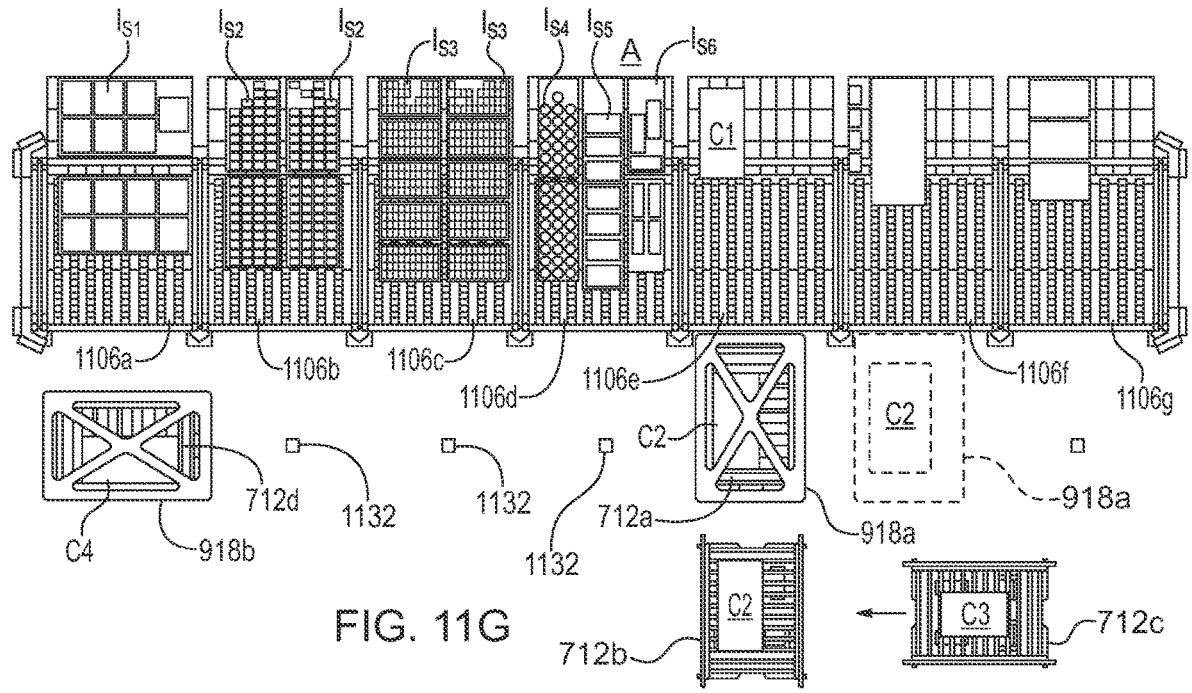
FIG. 11G is a top plan view depicting of the illustrative embodiment of FIGS. 11A to 11F, depicting the transfer of items from one vehicle to another vehicle using FAMs, as part of a dynamic allocation of inventory according to one or more embodiments consistent with the present disclosure.

FIG. 11G is a top plan view depicting of the illustrative embodiment of FIGS. 11A to 11F, depicting temporary deployment of FAM 918a into a position of interlocked alignment with storage location 1106f of rack structure 1120. While in this position, the vehicle 712a is elevated within task activity zone of FAM 918a to retrieve container C2 in a manner as previously described, and then the vehicle 712a returns to the underlying surface. Further operation of the gear wheels causes lifting of FAM 918a from the underlying support surface, and the vehicle 712a relocates the FAM 918a to the solid line position shown in FIG. 11G. In the illustrative embodiment of FIG. G, movements of the vehicle 712a, as well as those of vehicles 712b to 712d shown in FIG. 11G, are guided by a grid of fiducial markings, indicated at 1132, which are sensed by one or more imaging sensors (e.g., cameras) of each vehicle (not shown). It should, however, be understood that other position tracking systems and techniques may be utilized without departing from the spirit and scope of the present disclosure.

Figure 11H:
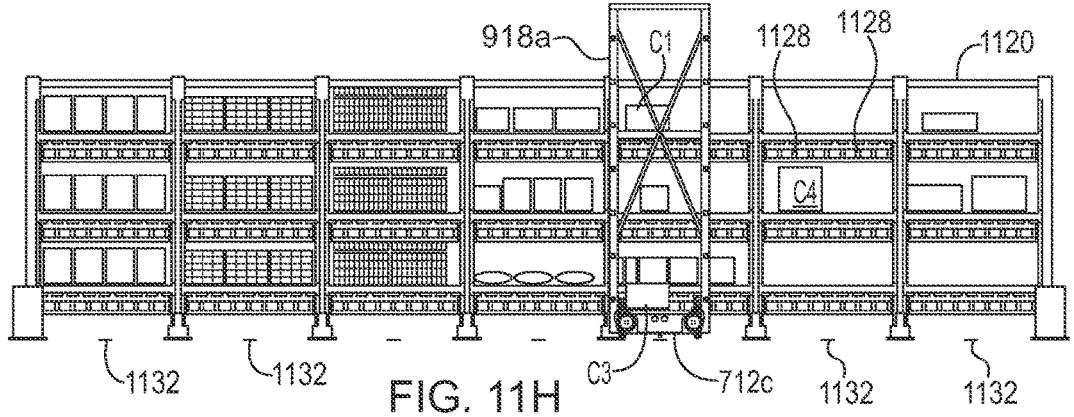
FIG. 11H is a rear elevation view depicting the completion of one or more inventory management tasks, by vehicles and at least one FAM, to realize a dynamic allocation of inventory, according to one or more embodiments.
Figure 11I:
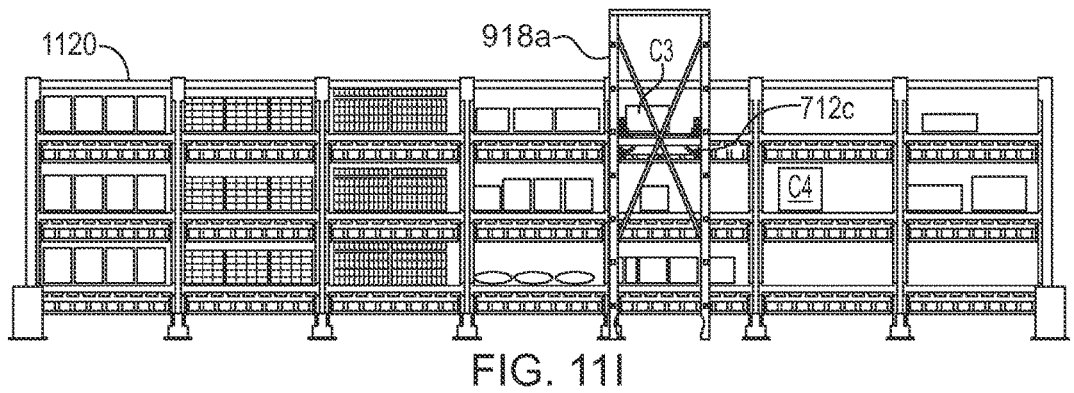
FIG. 11I is a rear elevation view showing, after the functional accessory module has docked with the flow rack, elevation of the vehicle within module to a position suitable for transfer of an item, according to one or more embodiments.

In one or more embodiments, vehicles 712 utilize capacitors which must be periodically charged. In some embodiments, the vehicles return to a charging station remote from rack structure 1120 while in others, electrical charging ports (not shown) are present in situ, proximate the track structure such that the vehicle 712a need not exit the task activity zone of FAM 918a. FIGS. 11H and 11I are rear elevation views of the rack structure 1120 of inventory management system 1100, subsequent to the transfer of item C2 from vehicle 712a to vehicle 712b described above. In this instance, vehicles 712a and 712b have each returned to a charging station for restoration of power prior to assignment of further inventory management task(s). As such, FIG. 11H depicts vehicle 712c as having entered FAM 918a, while FIG. 11I depicts vehicle 712c has having elevated item C3 within the task management zone of FAM 918a whereupon a transfer of item C3 to storage area 1106e (FIG. 11G) is completed by operation of the transfer mechanism of vehicle 712c.

FIG. 12 is a partial perspective view depicting a part of an inventory management system 1200, which may form part of the system shown in FIG. 1C and utilizes autonomous vehicles 1212 to transfer containers 1202 of inventory items back and forth between a picking area and a vertical array of storage locations indicated generally at 1220, according to one or more embodiments. In this instance, material handling system incorporates all of the elements of the system 900 shown in FIG. 9, but further utilizes vehicles 1212 and the array of storage locations 1120 as elements of an automated storage and retrieval system (AS/RS). So that dynamically deployable FAM structures 718a and 718b may be utilized alongside the structure which defines the vertical array of storage locations 1220, the vehicles 1212 may be configured in the same manner as the previously vehicles 200 and 712. However, it should be borne in mind that where such compatibility is not required, as for example, would be the case for embodiments which rely on flow rack structures 1120 and storage locations 1220, then those features of the vehicles which are directed to maintaining maneuverability under heavy load need not be incorporated.

In any event, and turning now to FIGS. 13A to 13E, an process for storage and retrieval of items within an array of storage locations as locations 1220 of FIG. 12 will now be described in detail. Turning first to FIG. 13A, there is shown a front elevation view depicting a plurality of automated guided vehicles 1212a to 1212e being operated within or about a rack structure 1300. As in previously described embodiments, the vehicles perform various item replenishment and/or item retrieval tasks and in this instance, some of those tasks involve retrieving containers from or returning the containers (or totes) to storage locations 1315a, 1315b, 1315c and 1315d.

As seen FIGS. 13A and 13B, Vehicles 1212b and 1212d are depicted as being supported by an underlying support surface as they maneuver within areas Z1 and Z2 directly below the storage locations. In embodiments, areas Z1 and Z2 are maneuvering zones which permit the vehicles to conveniently move into or out of the rack structure 1300. For example, in FIG. 13A, vehicle 1212a is seen entering the structure 1300 and passing under the support surfaces 1322 of a first vertical array of storage locations. The support surfaces 1320 and 1322, in this instance, are defined by shelving channels which are supported by a plurality of vertical support columns of which support columns 1304a, 1306a, 1308a and 1310a are depicted in FIG. 13A. The vehicle 1212b is shown having executed a 90 to 270 degree turn in order to continue traveling upon the substantially horizontal support surface underlying the maneuvering zone Z1. Vehicle 1212c, on the other hand, has entered the column within which it will ascend. In embodiments, vehicle 1212c ascends in the same manner as vehicle 1212e, which is shown as having already ascended within a drive column behind the drive column occupied by vehicle 1212c. More particularly, each of vehicles 1212a and 1212e move within their respective drive column by actuation of a drive system which, as in previous embodiments, may include gear wheels having teeth for engaging complementary teeth defined by inwardly facing track segments formed along the four support columns. Vehicle 1212d is shown traveling along the support surface underlying zone Z2 having, for example, entered zone Z2 from a location external to structure 1300 or being now ready to exit.

Figure 13B:
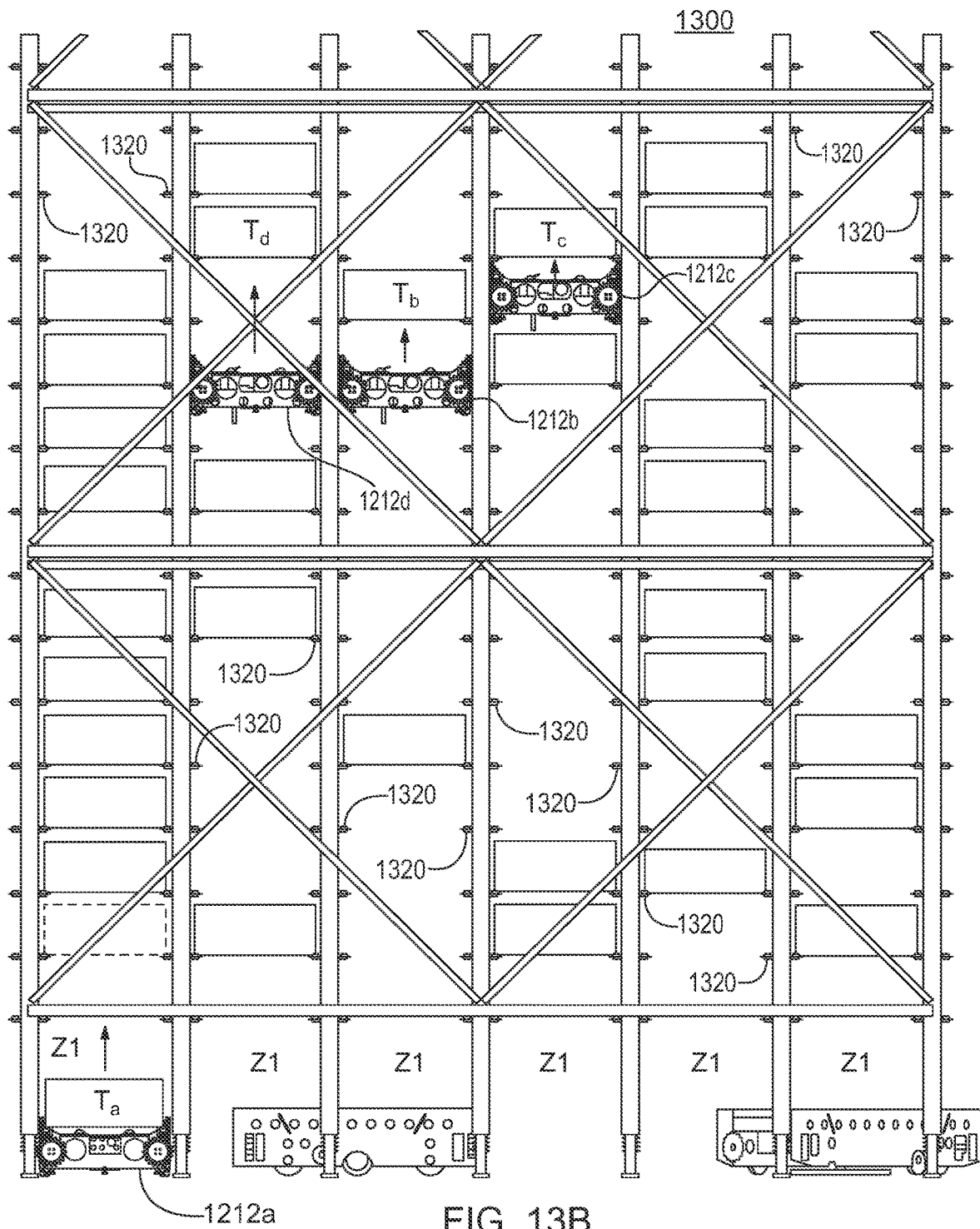
FIG. 13B is a side elevation view depicting a plurality of automated guided vehicles being operated to perform various item replenishment and/or item retrieval tasks as part of the inventory management system of FIG. 12, according to one or more embodiments.
Figure 13C:
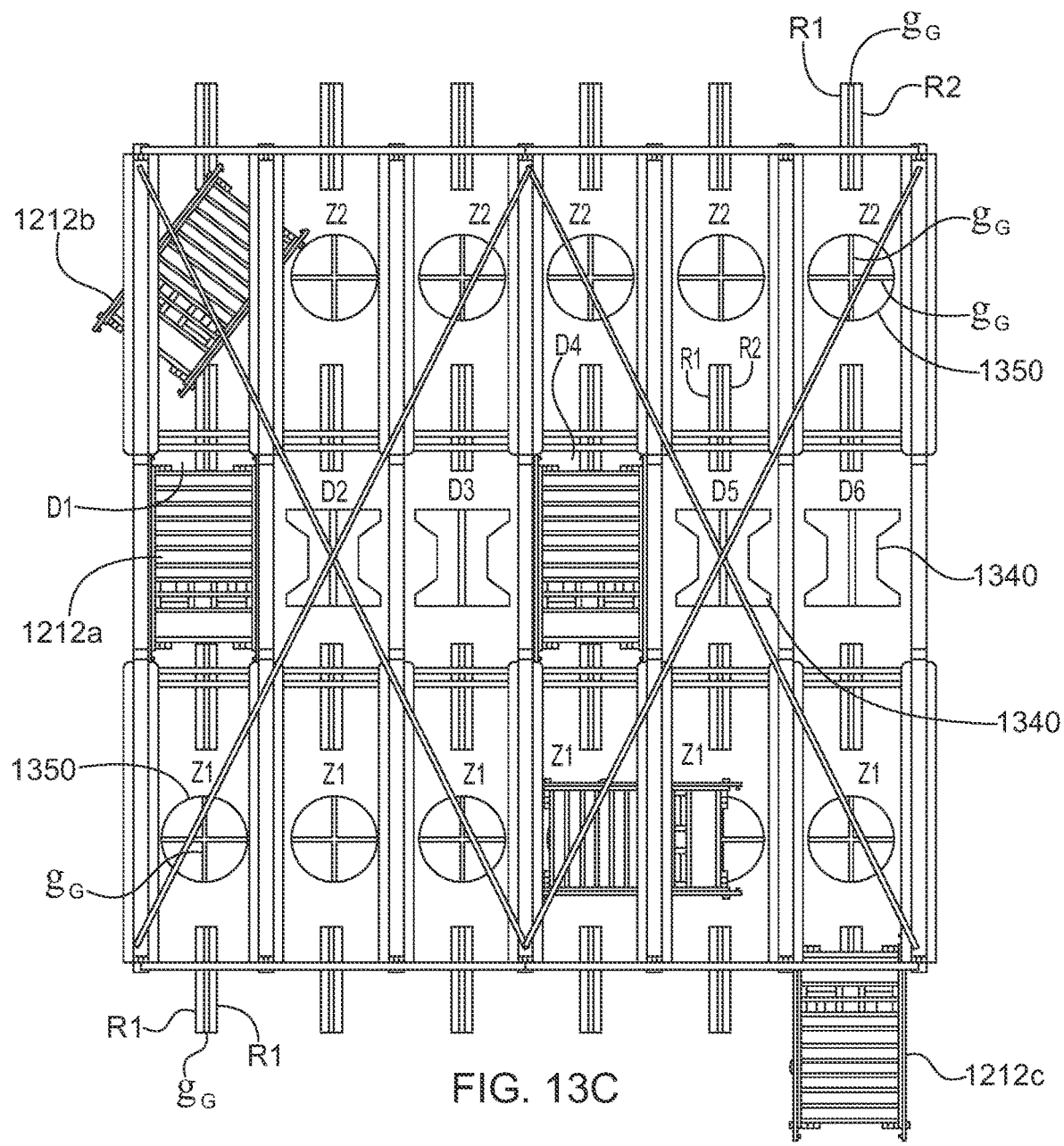
FIG. 13C is a top plan view depicting a plurality of automated guided vehicles being operated to perform various item replenishment and/or item retrieval tasks as part of the inventory management system of FIG. 12, according to one or more embodiments.

FIG. 13B is a side elevation view depicting the rack structure 1300 populated within a number of containers or totes, including totes $T_a$, $T_b$, $T_c$ and $T_d$. a plurality of vehicles operating to perform various item replenishment and/or item retrieval tasks as, for example, part of the inventory management system 1200 of FIG. 12, according to one or more embodiments. Here again, tote 1212a is shown having entered the leftward most drive column, indicated at D1, via maneuvering zone Z1. In this regard, and with reference now to FIG. 13C, it will be seen that the structure 1300 may incorporate an array of parallel guide rails, as rails R1 and R2, which define a gap $g_G$ between them. The gap is dimensioned and arranged to receive corresponding alignment structures on the vehicles so as to enable entry, exit and reorientation of the vehicles without damage to each other and the rack structure. Such structures have already been described in connection with the vehicle 200 and such details are omitted herein in the interest of clarity and ease of description. It suffices to say that to the extent such structures are present on the vehicle, additional alignment structures incorporating one or more gaps may be included to guide the vehicles. For example, as seen in FIG. 13C, a second floor mounted alignment system 1350 incorporates a circular shaped, plate-like member having an intersecting pattern of gaps. In this instance, vehicle 1212b can be seen using alignment system 1250 to reorient itself angularly as, for example, in preparation of a right turn for travel within zone Z2.

As yet another exemplary alignment structure, embodiments consistent with the present disclosure may include a third floor mounted alignment system 1340 which consists of a pair of plate members separated by gap $g_G$. In this instance, the gap defined by alignment system 1340 is oriented with those defined by alignment system 1350 so as to permit a vehicle to quickly and easily traverse the entire width of the structure—from zone Z1 to zone Z2, but angular reorientation within the drive columns D1 to D6 is prevented.

Figure 13E:
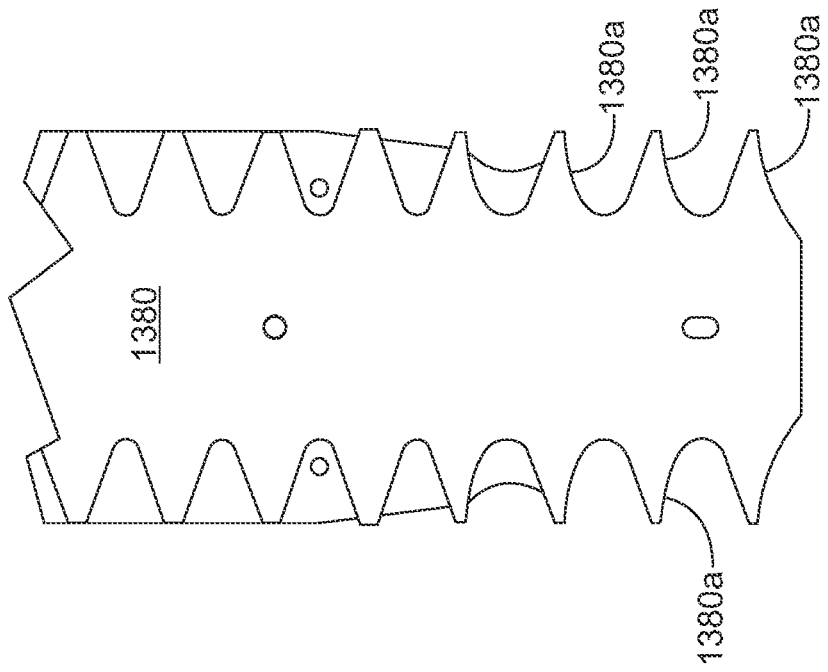
FIG. 13E is an enlarged elevation view depicting a guide system segment for use in rack structures according to one or more embodiments.
Figure 13D:
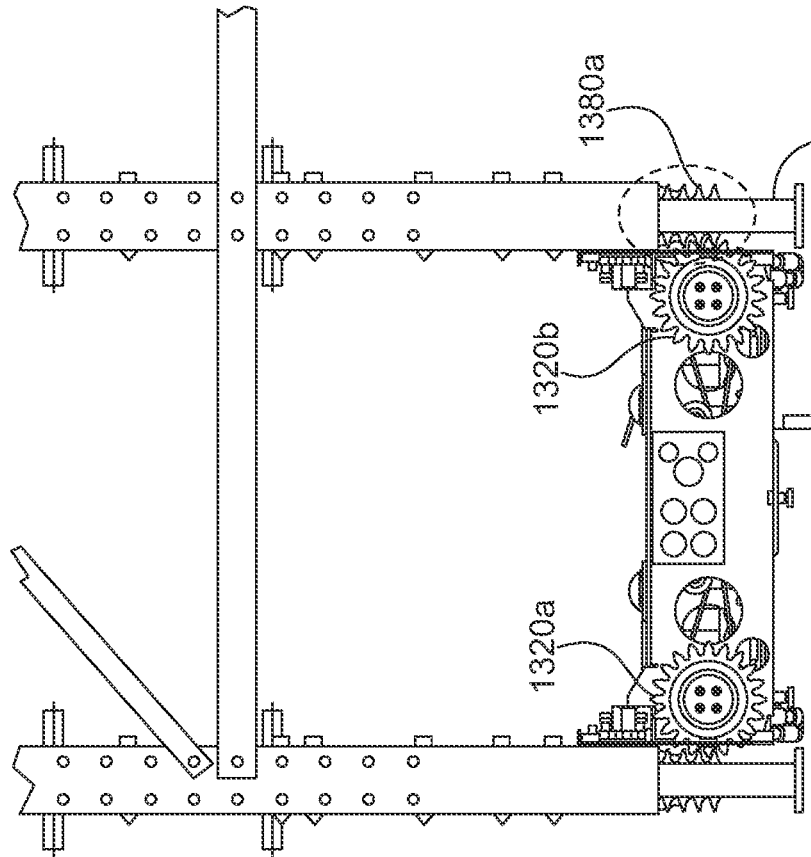
FIG. 13D is an enlarged side elevation view of the structure of FIG. 13B, depicting an exemplary vertical support and guide system according to one or more embodiments.

As mentioned above, structure 1300 is dimensioned and arranged such that the vehicles may enter and exit from various locations beneath the storage locations, allowing for flexibility in the installation of picking and/or replenishing stations. With particular reference to FIGS. 13D and 13E, the rack structure 1300 may employ a network of reduced cross-section support sections, indicated generally at 1370, relative to the support columns which support the storage locations, as support columns 1304, 1306a, 1308a, and 1310a of FIG. 13A. In some embodiments the reduced cross section supports 1370 are telescopingly received and affixed at a desired location by fasteners, welding or the like.

In one or more embodiments, retractable guide wheels may be omitted without subjecting the vehicles from damage. With particular reference to FIG. 13E, it will be observed that the guide system 1380 of the rack structure 1320 includes a specially contoured (relaxed tolerance) transition zone indicated generally at 1380a. The guide system 1380, inclusive of the transition zone 1380a, is mounted on opposite sides of support 1370 but not on the other two sides. Within the transition zone, gaps are formed between the teeth of the track, such that the teeth of the vehicle gear wheels can freely pass by without damage. This guide system arrangement enables the vehicles to drive directly into the drive columns without first having to reduce the spacing between guide wheels 1320a and 1320b, but it also enables the vehicles to move up and down within immediately adjacent columns, as best shown in FIG. 13B.

Figure 14A:
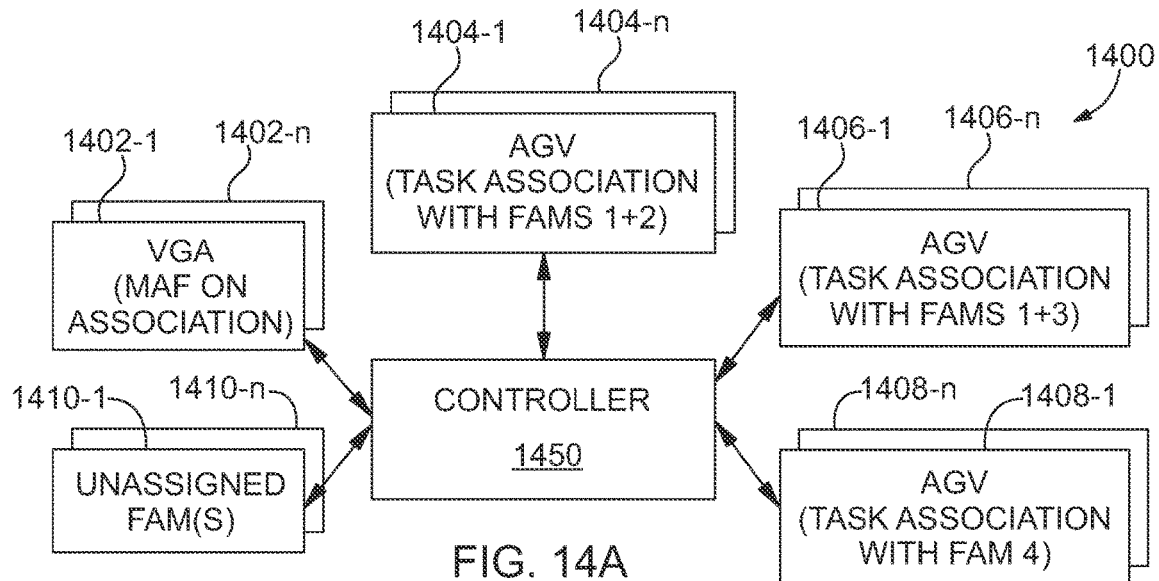
FIG. 14A is a block schematic view depicting the allocation of FAM-assisted inventory management tasks among a plurality of vehicles, by a controller, according to one or more embodiments.

FIG. 14A is a block schematic view depicting the allocation of FAM-assisted inventory management tasks among a plurality of vehicles, by a controller, indicated generally at reference numeral 1450. Controller 1450 organizes a plurality of automated guided vehicles into respective groups of one or more vehicles. A first of the groups of vehicles, indicated at 1402-1 to 1402-n, has no FAM association. As will be recalled by reference to FIGS. 1A to 1C, FIG. 9, and FIG. 12, not all tasks require the use of a FAM. In addition, after having terminated a FAM association, a vehicle may return to a charging station and during this time, be ineligible to receive an inventory management task assignment from controller 1450. A second of the groups of vehicles, indicated generally at 1404-1 to 1404-n, may be associated with FAMs selected from a first category or group of FAMs and a second category or group of FAMs. By way of example, FAM category 1 may include an auxiliary adapter as the previously described FAM 714, while a FAM category 2 may include the displaceable rack FAMs indicated at 718. A third of the groups of vehicles, indicated generally at 1406-1 to 1406-n, may include the auxiliary FAMs 614 as well as the bin transporting FAMs 618. A fourth of the groups of vehicles, indicated at 1408-1 to 1408-2 may include the FAMs 918, used to allocate inventory to (and optionally from) flow rack modules, as depicted in FIG. 9. Finally, controller 1450 also tracks the locations of any FAMs which are presently unassigned.

Figure 14B:
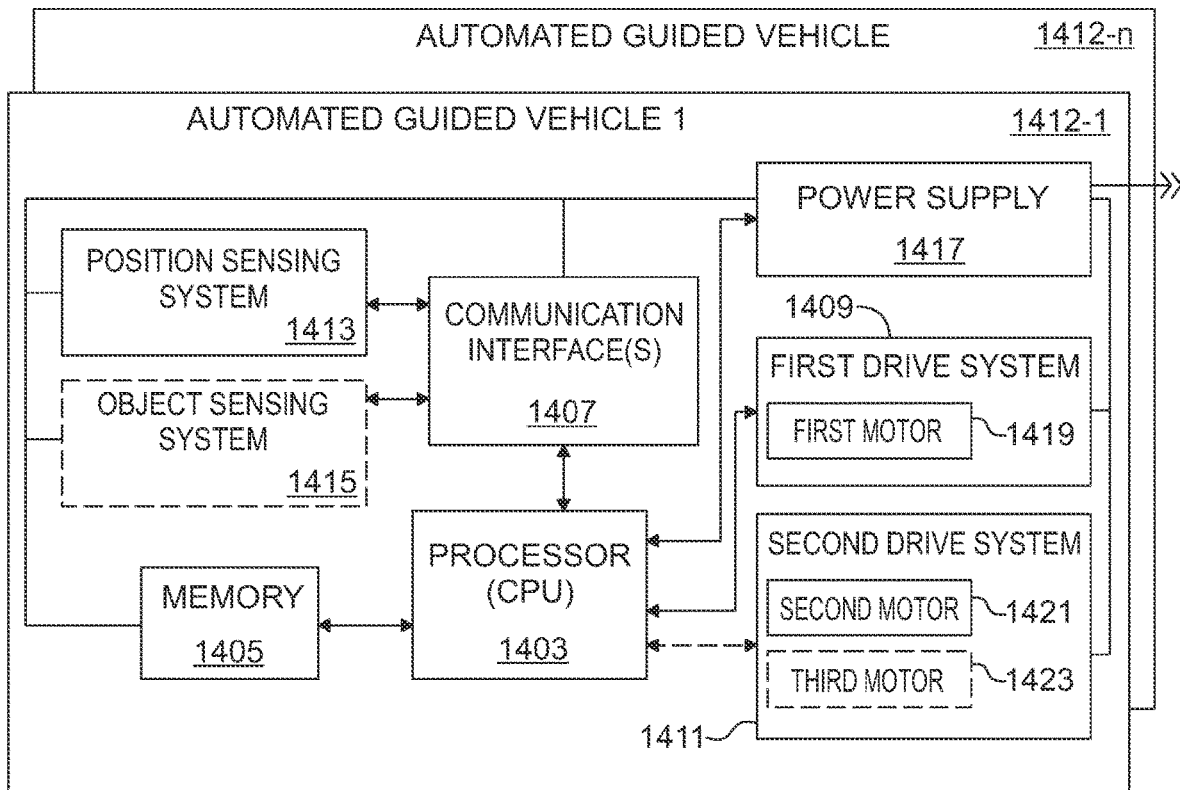
FIG. 14B is a block diagram depicting the subsystems of a plurality of guided vehicles according to one or more embodiments.

FIG. 14B is a block diagram depicting the subsystems of a plurality of guided vehicles 1412-1 to 1412-n, according to one or more embodiments. Each vehicle, as vehicle 1412-1 comprises a controller comprising a Central Processing Unit (CPU) 103, a memory 105, and communication interfaces 1407. In some embodiments, the communication interfaces comprise one or more wireless transceivers compliant with corresponding wireless transmission protocol(s) such as IEEE 802.11, with the interfaces of a vehicle being used to communicate with other vehicles, as in a peer-to-peer topology, or with a central controller. In the latter regard, vehicles 1412-1 to 1412-n may include position sensors, indicated at 1413, and object sensors 1415 and use the interfaces to communicate sensed information with a master controller, as controller 1450 of FIG. 14A. The position sensors, in one or more embodiments, include onboard imaging sensors for determining when the vehicle has passed over a fiducial marking positioned on an underlying support surface. Alternatively, however, the vehicles 1412-1 to 1412-n may utilize signal triangulation and/or any other conventional technique for determining their respective locations relative to one another or enabling the controller to do so.

With continued reference to FIG. 14B, it will be seen that each AGV, as AGV 1412-1 includes a power supply 1417 which may, for example, be a rechargeable power supply comprising ultracapacitors, one or more batteries, or a combination of these. In one or more embodiments, the power supply drives a first motor 1419 of first drive system 1409. First drive system 1409 may further include gear wheels driven by the first motor and used, for example, to drive the vehicle vertically within a FAM as FAM 918, or within the AS/RS rack structure 1320. In the present instance, the power supply 1417 also supplies power to a second drive system 1411, which includes a second motor 1421 and, optionally, a third motor 1423.

The CPU 1403 may comprise one or more commercially available microprocessors or microcontrollers that facilitate data processing and storage. Various support circuits facilitate the operation of the CPU 1403 and include one or more clock circuits, power supplies, cache, input/output circuits, and the like. The memory 1405 comprises at least one of Read Only Memory (ROM), Random Access Memory (RAM), disk drive storage, optical storage, removable storage and/or the like.

Figure 14C:
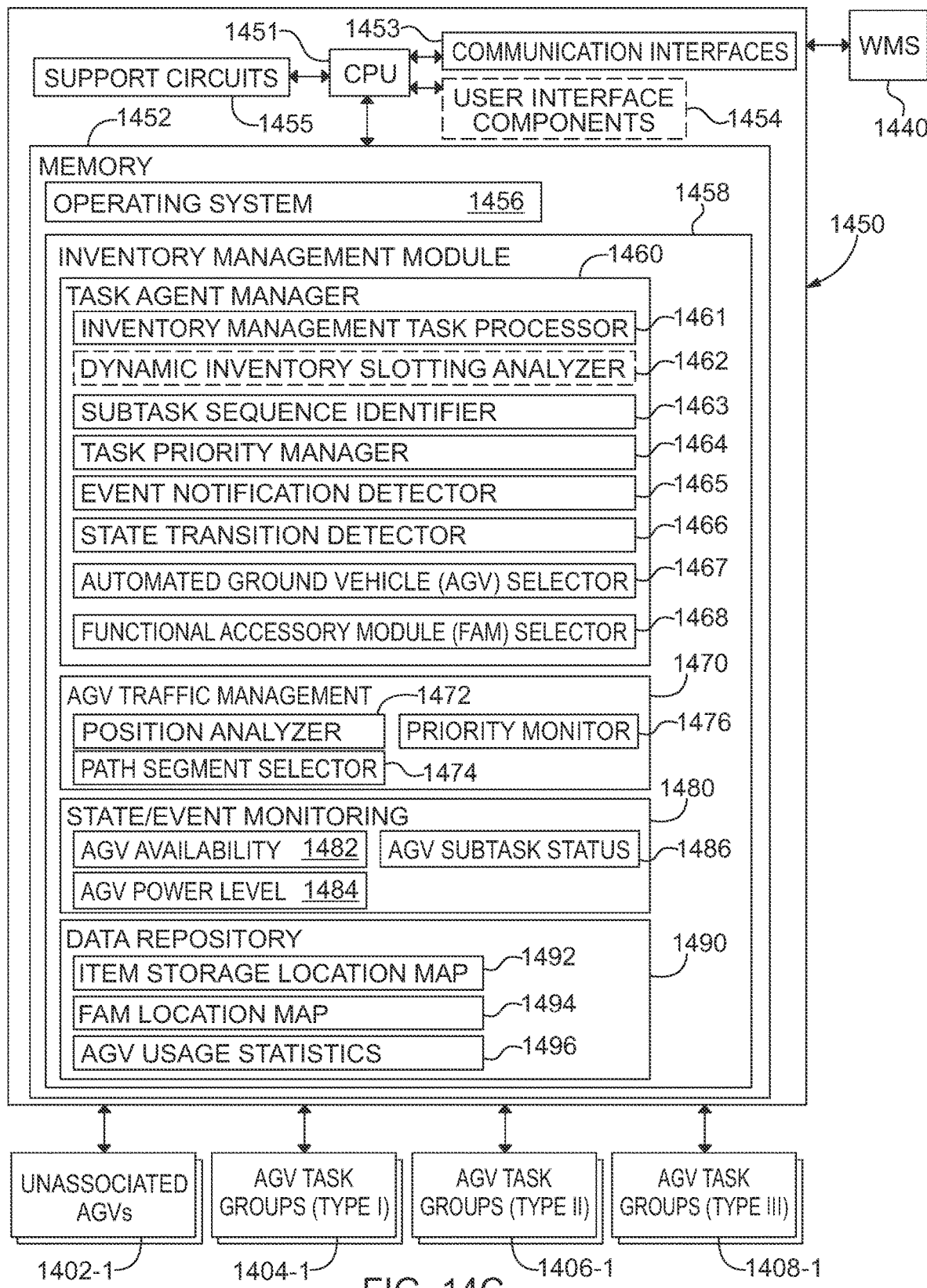
FIG. 14C is a block schematic diagram of a controller which may be used to coordinate the assignment and performance of inventory management task activities by a plurality of vehicles and FAMs, in accordance of one or more embodiments consistent with the present disclosure.

FIG. 14C is a block schematic diagram of a controller 1450 which may be responsive to instructions received from a warehouse automation system (WMS) 1440 to coordinate the assignment and performance of inventory management task activities by a plurality of vehicles and FAMs, such as those assigned to AGV task groups 1402-1, 1404-1, 1406-1 and 1408-1. The controller 1450 comprises a Central Processing Unit (CPU) 1451, support circuits 1455, a memory 1452, user interface components 1454 (which may include, for example, a display with touch sensitive screen or a separate keyboard), and communication interfaces 1453. In some embodiments server 1450 comprise one or more wireless transceivers compliant with corresponding wireless transmission protocol(s) such as IEEE 802.11.

The CPU 1451 may comprise one or more commercially available microprocessors or microcontrollers that facilitate data processing and storage. The various support circuits 1455 facilitate the operation of the CPU 1451 and include one or more clock circuits, power supplies, cache, input/output circuits, and the like. The memory 1452 comprises at least one of Read Only Memory (ROM), Random Access Memory (RAM), disk drive storage, optical storage, removable storage and/or the like. In some embodiments, the memory 1452 comprises an operating system 1456 and one or more inventory management applications. In some embodiments, the inventory management applications include a task agent manager module 1460, an AGV traffic management module 1470, a state/event monitoring module 1480, and a data repository 1490.

In one or more embodiments, the task agent manager 1460 is configured with an inventory management task processor 1461, a dynamic inventory slotting analyzer 1462, a subtask sequence identifier 1463, a task priority manager 1464, an event notification detector 1465, a state transition detector 1466, an AGV selector 1467, and a FAM selector 1468. The inventory management task processor 1461, through execution of instructions by CPU 1451, processes inventory management task requests received from the WMS 14440. A list of the subtasks associated with received task requests includes, for example, those subtasks listed in the following table:

| Sub Task | Description |
| --- | --- |
| 1 | Relocate AGV to Charging Area |
| 2 | Relocate AGV to specified location (of FAM 1) |
| 3 | Dock AGV with FAM 1 |
| 4 | Relocate AGV + FAM 1 to specified location (of FAM 2) |
| 5 | Dock AGV/FAM 1 with FAM 2 |
| 6 | Relocate AGV + FAM 1/FAM 2 to specified location |
| 7 | Decouple FAM 2 at specified location |
| 8 | Relocate AGV + FAM 1 to specified location (of FAM 3) |
| 9 | Dock AGV/FAM 1 with FAM 3 |
| 10 | Relocate AGV + FAM 1/FAM 3 to specified location |
| 11 | Decouple AGV from FAM 1/FAM 3 at specified location |
| 12 | Relocate AGV to specified location (of FAM 4) |
| 13 | Dock AGV with FAM 4 |
| 14 | Relocate AGV + FAM 4 to specified location |
| 15 | Relocate AGV to specified location (of storage area) |
| 16 | Operate transfer mechanism of AGV at specified location (for retrieval) |
| 17 | Relocate AGV to storage area (for replenishment) |
| 18 | Relocate AGV from storage area to destination (for transfer) |

Dynamic inventory slotting analyzer 1462, in one or more embodiments, allocates inventory items among different storage areas, based on available manpower resources, distance between where those resources are stationed, and respective pools of storage locations, and the known or forecast demand for items over the current and at least one subsequent inventory management interval (e.g., 60 to 120 minutes). Subtask sequence identifier allocates the subtasks comprising each inventory management task among one or more vehicles and FAMs. By way of example, a first AGV may lack sufficient power resources to complete all subtask elements of an entire task. In such event, the first AGV may be directed by the controller to transition an inventory item and/or FAM to a second AGV, with the timing being sufficient to enable the first AGV to return to a charging station and recharge, before returning to the pool of task-eligible AGVs. To facilitate such functionality, task agent manager 1460 further includes an event notification detector 1465 to determine when a critical power level threshold has been crossed as well as a state transition notification detector 1466 to determine when other AGV and FAM assets have returned to task-eligibility status.

The AGV and FAM selectors, 1467 and 1468, respectively, utilize available position, power and remaining subtask data to select an appropriate utilization of AGV and FAM resources to complete any subtasks which would otherwise remain unfinished by another AGV, and where possible, to ensure tasks are assigned to those AGVs and FAMs which have the resources to complete them. The AGV and FAM selectors may rely upon information received from the position analyzer 1475 and priority monitor 1476.

In some embodiments, traffic management of the AGVs is performed by traffic management module 1470 of controller 1450. In such cases, position, speed and direction data is collected from the vehicles at regular intervals by the controller. The position data is analyzed, and path segment selector 1474 selects paths for each vehicle over the next control interval to ensure that there are no collisions with other vehicles, with personnel, or with fixed structures. The updated instructions corresponding to the path selections, inclusive of heading and direction, are transmitted by the controller back to the vehicles. In other embodiments, however, the vehicles do not rely on the controller for relative positioning instructions, but rather solely for destination and task assignments, with the vehicles instead relying on internal data gathering and spatial analysis capabilities.

To facilitate the aforementioned operations, the controller 1450 of FIG. 14C includes a data repository which reflects an up to date location of all inventory items for which management and allocation responsibility has been assigned by the WMS, as well as a map of the FAM locations within the facility. In addition, to facilitate the scheduling of preventive maintenance procedures, usage statistics are collected for all AGVs and FAMs having moving parts, so that at regular intervals, parts can be inspected, lubricated, and/or replaced.

From the above description, it will thus be appreciated that in some embodiments, a first type of rack structure within which vehicles are configured to operate according to the first mode of operation defines a plurality of vertical arrays of storage locations separated by aisles of columns within which the vehicles climb. Such rack structures are exemplified by the embodiment of FIGS. 13A to 13E wherein the guide system comprises parallel tracks dimensioned and arranged such that vehicles can enter a climbing column not from an end of the corresponding aisle within which the column is disposed but, rather, from the side of the column. That is, the vehicles are configured to move upon a support surface portion which is directly below the storage locations of the array, such that they may enter any climbing column from a direction transverse to the longitudinal axis of the aisle of climbing columns. Thus, more than two vehicles can enter and/or leave respective climbing columns of the same aisle at the same time.

In some embodiments, the depth of the space allocated to the storage locations and, consequently, to the paths along underlying support surface upon which the vehicles travel to enter and exit a climbing column, are of sufficient length to enable two vehicles to turn and travel along paths parallel to one another (whether in the same or in opposite directions).

In some embodiments, a second type of rack structure within which the vehicles are configured to operate according the first mode of operation defines a plurality of feed flow surfaces which are served by an aisle of climbing columns along which parallel tracks of a guide system are vertically arranged. Such embodiments are exemplified by FIGS. 11A-11H. In one such embodiment, the feed flow surfaces are defined by a plurality of non-driven rollers which are dimensioned and arranged to feed inventory items unidirectionally by gravity, as they are received from a vehicle within one of the climbing columns. Additionally, or alternatively, at least some of the feed flow surfaces are defined by a plurality of driven rollers configured to advance the items in a first direction, away from a vehicle within one of the climbing columns as for retrieval by one or more fulfillment station operators and to advance the items in a second direction opposite the first, as for transfer of an item to a vehicle in a climbing column during a replenishment operation. In an alternate example, the feed flow surfaces may be defined by a plurality of horizontally oriented belts driven in the first and second directions to serve the same retrieval and replenishment functions as the drive rollers described previously. Although the climbing columns in the case of FIGS. 11A to 11H are depicted as being vertically and horizontally displaceable by the vehicles according to the second mode of operation, in other embodiments consistent with the present disclosure, these are stationary.

Figure 15:
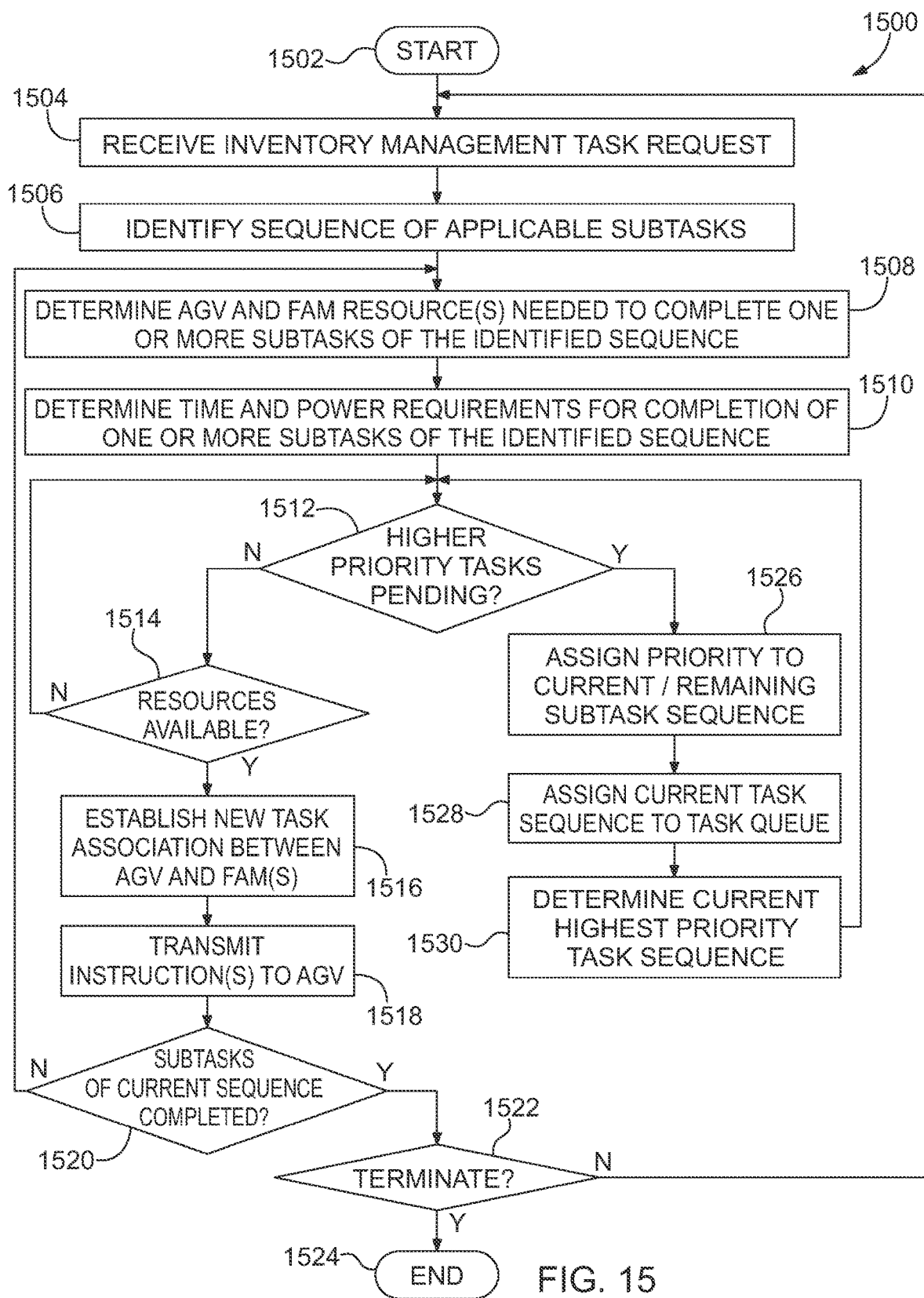
FIG. 15 is a flow chart depicting a process by which inventory management tasks may be assigned to one or more vehicles and FAMs, according to one or more embodiments.

FIG. 15 is a flow chart depicting a process 1500 by which inventory management tasks may be assigned to one or more vehicles and FAMs. The process 1500 is entered at 1502 and proceeds to 1504 where an inventory management task request is received. The process 1500 proceeds to 1506 where the process identifies the sequence of subtasks which are applicable to the task requested at 1504. From 1506, the process 1500 proceeds to 1508, where the process determines which AGV and FAM resources are needed to complete one or more of the subtasks identified at 1506. From 1508, the process 1500 proceeds to 1510, where the process determines the time and power requirements for completion of the one or more subtasks identified at 1508. The process 1500 proceeds to decision block 1512.

At decision block 1512, the process determines whether there are any currently pending tasks having a higher priority than the task request received at 1504. If not, the process proceeds to decision block 1514, where the process determines whether the needed AGV and FAM resources are available for assignment to the task request specified at 1504. If not, the process returns to decision block 1512, but if so, then the process proceeds to 1516 and the process establishes a new task association between the AGV and one or more FAMs. From 1516, the process proceeds to 1518, where the process transmits instructions to the AGV(s) identified at 1514. The process proceeds to decision block 1520. At decision block 1520, the process determines whether or not all assigned subtasks have been completed. If not, the process returns to 1508 for allocation of additional resources. If so, the process proceeds to 1522 and determines whether the inventory management cycle is still active and open, if so, the process returns to 1504. If not, the process proceeds to 1524 and terminates.

In the event the process 1500 determines at 1512 that higher priority tasks are pending, then the process proceeds to 1526 and assigns a priority to the task request received at 1504 and the process proceeds to 1528. At 1528, the process assigns the current task sequence to a task queue. In this regard, it should be noted that there may be many such task queues. Of the tasks remaining in the assigned task queue, the process determines which has the current highest priority and the process returns to decision block 1512.

Figure 16:
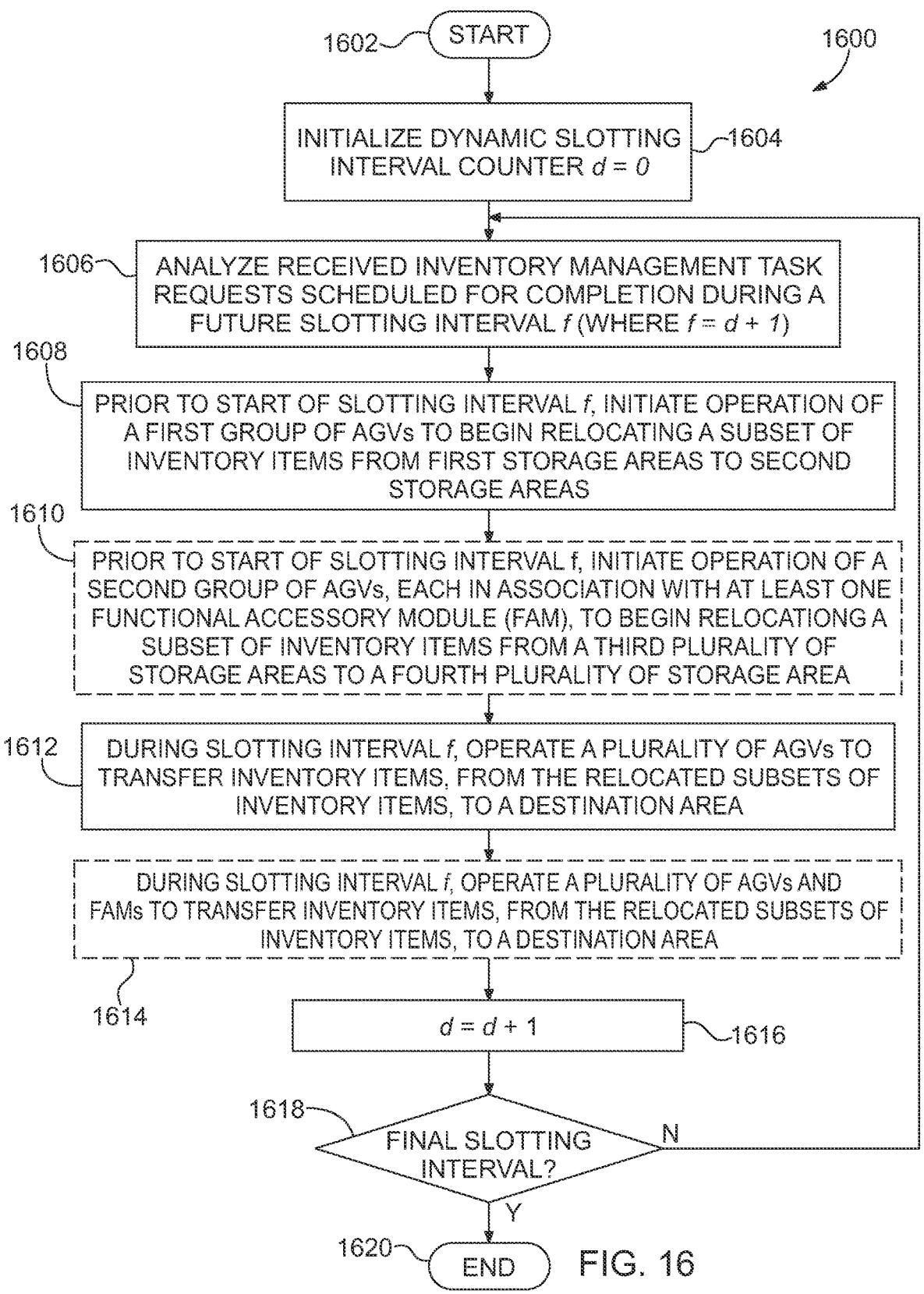
FIG. 16 is a flow chart depicting a process by which inventory items may be dynamically allocated among various storage areas over a series of consecutive inventory management intervals, according to one or more embodiments.

FIG. 16 is a flow chart depicting a process 1600 by which inventory items are dynamically allocated among various storage areas over a series of consecutive inventory management intervals, according to one or more embodiments consistent with the present disclosure. The process 1600 is entered at start block 1602 and proceeds to 1604, where a dynamic slotting interval counter is initialized. In some embodiments, a facility may be operate over two 8 hour shifts or 16 hours. In this instance, slotting intervals of one hour are used such that the process advances to 1606 and increments by 1 to signify each slotting interval. At 1606, received inventory management tasks scheduled for completion during a current or approaching slotting interval are analyzed, and a determination is made as to which inventory items should be placed in first storage areas reserved for faster moving goods and which may be relocated to second storage areas appropriate for slower moving goods. The process assigns inventory items of a first subset to the first storage areas and inventory items of a second subset to the second storage areas. The process proceeds to 1608.

At 1608, the process 1600 initiates operation of a first group of AGVs to begin relocating a first subset of inventory items from the second storage areas to the first storage areas, and at 1610, initiates operation of a second group of AGVs to begin relocating a second subset of inventory from the first storage areas to the second storage areas. The process proceeds from 1610 to 1612. At 1612, the process operates a plurality of AGVs to transfer at least some inventory items from at least a first of the relocated first subsets of inventory items, to a destination area. From 1612, the process proceeds to 1614 where the process operates a plurality of FAMs and AGVs to transfer inventory items from at least the first of the relocated subsets of inventory items, to a destination area. The process proceeds to 1616.

At 1616, the process increments the dynamic slotting interval counter by one and proceeds to 1618 for determination of whether there are any remaining increment cycles remaining in the current inventory management cycle. If so, the process returns to 1606 and performs analysis for a subsequent slotting window. If not, the process proceeds from decision block 1618 to termination block 1620, and ends.

Figure 17:
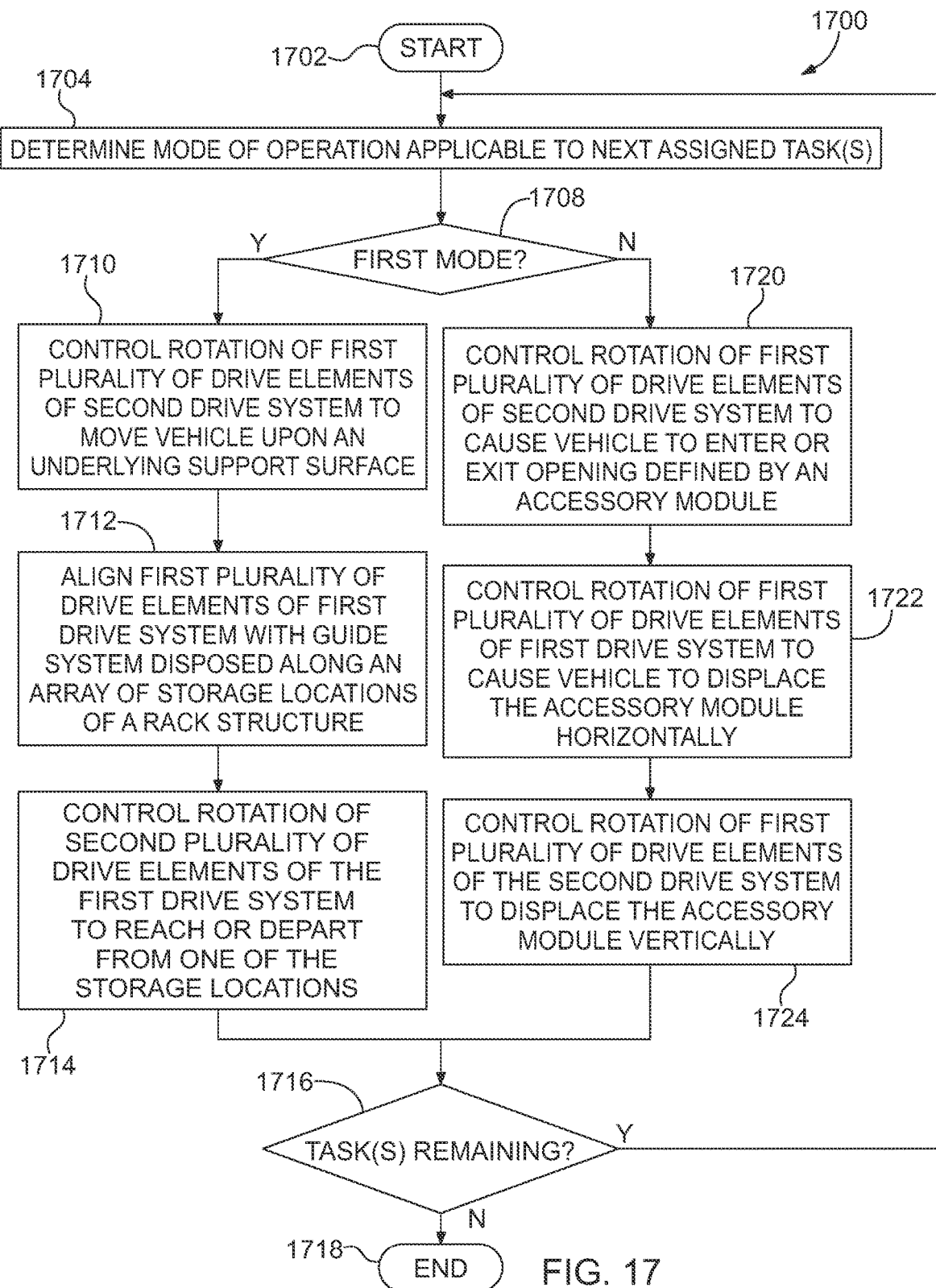
FIG. 17 is a flow chart depicting a process by which an automated guided vehicle performs inventory management tasks using only the onboard resources and capabilities of the vehicle, according to a first mode of operation and, according to a second mode operation, supplements the resources of the vehicle using the additional resources and capabilities of one or more FAMs.

FIG. 17 is a flow chart depicting a process 1700 according to one or more embodiments consistent with the present disclosure. A controller of an automated guided vehicle executing process 1700 operates the vehicle to perform inventory management tasks using only the onboard resources and capabilities of the vehicle, according to a first mode of operation and, according to a second mode operation, using additionally the resources and capabilities of one or more FAMs. The process 1700 is entered at 1702 and proceeds to 1704 where the method 1700 determines the mode of operation needed to perform an inventory management task. The process 1700 proceeds to 1708 where the process identifies if the first mode of operation applies and, if so, process 1700 proceeds to 1710.

At 1710, according to a first mode of vehicle operation, method 1700 controls rotation of a first plurality of drive elements of a second drive system of the vehicle, and advances to 1712 where method 1700 aligns a first plurality of drive elements of a first drive system with a guide system disposed along an array of storage locations of a rack structure. From 1712, method 1700 advances to 1714 where method 1700 controls rotation of the second plurality of drive elements of the first drive system to displace the vehicle vertically to reach one of the storage locations or, alternatively, to depart from one of the storage locations. Regardless of whether method 1700 is performing a task by which an item is being retrieved from a storage location of the rack structure, rather than to the storage location, method 1700 performs 1710 through 1712 two times—the first time first to enter the rack structure and reach the target storage location for operation of an onboard transfer mechanism of the vehicle to retrieve or deposit the item and the second time reversing the order to leave the target storage location and exit the rack structure.

In some embodiments, method 1700 is performed using vehicles in which the first plurality of drive elements of the first drive system are maintained at a fixed distance from one another and corresponding to a spacing between parallel tracks of a guide system, the execution of method 1700 does not require such a configuration. In alternate embodiments consistent with the present disclosure, for example, the alignment of 1712 may be achieved by performing additional steps of utilizing an additional drive mechanism to move the first plurality of drive elements of the first drive system toward one another before entering an opening defined in the rack structure aligned with the parallel tracks and then moving the first plurality of drive elements of the first drive system away from one another to bring respective engagement surfaces into positions where rotation of first plurality of drive elements initiates the vertical displacement of 1714.

In any event, and with continued reference to FIG. 17, process 1700 proceeds from 1714 to decision block 1716, whereupon the process 1700 determines whether additional tasks remain and, if so, the process returns to 1704. Method 1700 is additionally and alternatively configured to proceed from 1708 to 1720, where according to a second mode of operation, method 1700 controls rotation of the first plurality of drive elements of the second drive system to cause the vehicle to enter or exit an opening defined by an accessory module. Method 1700 proceeds from 1720 to 1722 where the method controls rotation of the first plurality of drive elements of the second drive system to displace the vehicle and accessory module horizontally. Method 1700 proceeds from 1722 to 1724 where the method controls rotation of the first plurality of drive elements of the first drive system to displace the accessory module vertically.

It should be borne in mind that the order in which 1720 to 1722 are performed depends upon the particular task assigned. For example, the transfer of an accessory module from one location of an inventory management facility to another is accommodated by performing 1724 a first time, after the vehicle enters the accessory module at the first location, before step 1722 is performed. Once method 1700 performs 1724 to lift the vehicle at the first location, step 1722 is performed to relocate the lifted accessory module. 1724 is re-performed to lower the accessory module onto the underlying support surface at the second or target location, and step 1720 is again performed to withdraw the vehicle from the accessory module.

In some embodiments, such as where a first accessory module serves as an adapter to lift a second accessory module, steps 1720 through 1724 are performed by method 1700 to retrieve and relocate the first accessory module to the location of the second accessory module, and then steps 1720 and 1724 are re-performed by the vehicle first accessory module pair entering, lifting, and horizontally displacing the second accessory module.

Although the invention has largely been described and illustrated in the context of the movement of inventory in a warehouse, a fulfillment center, or a distribution center, the invention should also be understood as being directed to the transport of other types of articles and for various purposes including the aggregation of parts in a manufacturing operation, or the like. Moreover, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The order of methods described herein may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Accordingly, while the foregoing is directed to embodiments of the present invention, other and further embodiments of the invention may be devised without departing from the basic scope thereof, and the scope thereof is determined by the claims that follow.

The invention claimed is:

1. A method of operating an automated vehicle in an inventory management system having a rack structure defining a plurality of destination areas and a guide system, the method comprising:
   operating a first motor to control rotation of a first plurality of drive elements of the automated vehicle to move the automated vehicle upon an underlying support surface and into a pre-climb position wherein a second plurality of drive elements of the automated vehicle are aligned with and engage the guide system;
   operating a second motor to control rotation of the second plurality of drive elements to advance the automated vehicle vertically along the guide system and into an elevated position of alignment with a first destination area of the plurality of destination areas; and
   engaging a clutch mechanism of the automated vehicle while operating the first motor to transmit power from the first motor to a transfer mechanism of the automated vehicle and thereby transfer a container of inventory items from the first destination area onto a support surface of the automated vehicle.

2. The method of claim 1, wherein the clutch mechanism of the automated vehicle is engaged by operating the second motor to cause climbing of the automated vehicle until the first plurality of drive elements no longer contact the underlying support surface.

3. The method of claim 2, further including operating the second motor to reverse a direction of rotation of the second plurality of drive elements to thereby cause descent of the automated vehicle into the pre-climb position and disengagement of the clutch mechanism, whereby operation of the first motor no longer transmits power to the transfer mechanism.

4. The method of claim 3, further including operating the first motor to control rotation of the first plurality of drive elements and move the automated vehicle upon the underlying support surface and away from the pre-climb position.

5. The method of claim 4, wherein the first plurality of drive elements includes a first pair of omnidirectional wheels, a second pair of omnidirectional wheels, and a third pair of wheels, the method further comprising driving a first wheel of the third pair of wheels with a first motor and a second wheel of the third pair of wheels with a third motor.

6. The method of claim 5, further including steering the automated vehicle comprising operating the first motor to rotate the first wheel of the third pair of wheels in a first direction of rotation and operating the second motor to rotate the second wheel of the third pair of wheels in a second direction of rotation opposite to the first direction of rotation.

7. The method of claim 6, further including selectively operating first and second actuators to exert a respective normal force upon each wheel of the third pair of wheels to thereby enhance frictional contact and steering of the automated vehicle.

8. A method of operating an automated vehicle in an inventory management system having a rack structure defining a plurality of destination areas and a guide system, the method comprising:
   operating a first motor to control rotation of a first plurality of drive elements of the automated vehicle to move the automated vehicle upon an underlying support surface and into a pre-climb position wherein a second plurality of drive elements of the automated vehicle are aligned with and engage the guide system;
   operating a second motor to control rotation of the second plurality of drive elements to advance the automated vehicle vertically along the guide system and into an elevated position of alignment with a first destination area of the plurality of destination areas; and
   engaging a clutch mechanism of the automated vehicle while operating the first motor to transmit power from the first motor to a transfer mechanism of the automated vehicle and thereby transfer a container of inventory items from a support surface of the automated vehicle into the first destination area.

9. The method of claim 8, wherein the clutch mechanism of the automated vehicle is engaged by operating the second motor to cause climbing of the automated vehicle along the guide system until the first plurality of drive elements no longer contact the underlying support surface.

10. The method of claim 9, further including operating the second motor to reverse a direction of rotation of the second plurality of drive elements to thereby cause descent of the automated vehicle into the pre-climb position and disengagement of the clutch mechanism, whereby operation of the first motor no longer transmits power to the transfer mechanism.

11. The method of claim 10, further including operating the first motor to control rotation of the first plurality of drive elements and move the automated vehicle upon the underlying support surface and away from the pre-climb position.

12. The method of claim 8, wherein the first plurality of drive elements includes a first pair of omnidirectional wheels, a second pair of omnidirectional wheels, and a third pair of wheels, the method further comprising driving a first wheel of the third pair of wheels with a first motor and a second wheel of the third pair of wheels with a third motor.

13. The method of claim 12, further including steering the automated vehicle comprising operating the first motor to rotate the first wheel of the third pair of wheels in a first direction of rotation and operating the second motor to rotate the second wheel of the third pair of wheels in a second direction of rotation opposite to the first direction of rotation.

14. The method of claim 13, further including selectively operating first and second actuators to exert a respective normal force upon each wheel of the third pair of wheels to thereby enhance frictional contact and steering of the automated vehicle.

* * * * *